(12) United States Patent
Matsuoka

(10) Patent No.: US 7,116,441 B1
(45) Date of Patent: Oct. 3, 2006

(54) SIGNAL PROCESSING APPARATUS IMAGE PROCESSING APPARATUS AND THEIR METHODS

(75) Inventor: Hirochika Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/467,984

(22) Filed: Dec. 21, 1999

(30) Foreign Application Priority Data

| Dec. 21, 1998 | (JP) | ............................................ 10-363526 |
| Jul. 27, 1999 | (JP) | ............................................ 11-212726 |
| Sep. 17, 1999 | (JP) | ............................................ 11-263904 |

(51) Int. Cl.
G06K 15/00 (2006.01)
G06K 9/00 (2006.01)

(52) U.S. Cl. ............................ 358/1.9; 382/166; 382/167
(58) Field of Classification Search .................. 358/500, 358/518, 519, 520, 523, 530, 1.9, 2.1, 504; 382/162, 166, 167
See application file for complete search history.

(56) References Cited

U.S. PATENT DOCUMENTS

| 5,060,060 A | | 10/1991 | Udagawa et al. ............... 358/80 |
| 5,426,517 A | * | 6/1995 | Schwartz ...................... 358/520 |
| 5,657,068 A | | 8/1997 | Ohta ............................. 347/232 |
| 5,659,672 A | * | 8/1997 | Yutaka ......................... 395/130 |
| 5,712,925 A | | 1/1998 | Ohga ............................. 382/167 |
| 5,724,450 A | * | 3/1998 | Chen et al. .................. 388/518 |
| 5,760,782 A | * | 6/1998 | Yutaka ......................... 345/429 |
| 5,875,260 A | | 2/1999 | Ohta ............................. 382/162 |
| 5,933,252 A | | 8/1999 | Emori et al. ................. 358/500 |
| 6,043,909 A | * | 3/2000 | Holub .......................... 358/504 |
| 6,115,022 A | * | 9/2000 | Mayer, III .................... 345/112 |
| 6,157,735 A | * | 12/2000 | Holub .......................... 382/167 |
| 6,362,808 B1 | * | 3/2002 | Edge ............................ 345/153 |

* cited by examiner

Primary Examiner—Jerome Grant, II
(74) Attorney, Agent, or Firm—Fitzpatrick, Cella, Harper & Scinto

(57) ABSTRACT

A color gamut that has been mapped from a monitor gamut into a printer gamut by gamut mapping is narrower than the printer gamut. Hence, an image to be output, which is corrected by gamut mapping, has low contrast and poor vividness. Hence, a gamut enlargement correction unit (1208) maps an intermediate mapped gamut into the printer gamut with reference to the intermediate mapped gamut obtained by mapping the monitor gamut, and the printer gamut, thus obtaining a mapped gamut for gamut mapping.

19 Claims, 50 Drawing Sheets

SIGNAL PROCESSING APPARATUS IMAGE PROCESSING APPARATUS AND THEIR METHODS

BACKGROUND OF THE INVENTION

1. Field of the Invention

The present invention relates to a signal processing apparatus, image processing apparatus, and their methods and, for example, to a signal processing apparatus, image processing apparatus, and their methods for converting or transforming (gamut-mapping) a signal in a given color space into that in another color space.

2. Description of Related Art

A computer system or video printer, which has a color monitor and color printer, a color image created and/or processed on a monitor, or a color image received by an image receiving device, is often printed out.

As is known, a color monitor that expresses a color image by emitting light in a specific wavelength range using a phosphor has a quite different color gamut from that of a color printer that expresses a color image by absorbing light in a specific wavelength range using ink or the like, and using remaining reflected light. Furthermore, color monitors have different color gamuts depending on their types, i.e., a monitor that uses liquid crystal, a monitor using an electron gun type cathode ray tube, a monitor using a plasma system, and the like. Similarly, color printers have different color gamuts depending on different paper qualities, different ink consumption amounts, and the like.

For this reason, it is impossible to calorimetrically match the colors of an image displayed on a given color monitor, an image output by a given color printer, and color images output using a plurality of types of printers and a plurality of types of recording sheets. Hence, when a person sees color images displayed (formed) on individual output media, he or she experiences large tincture or color appearance differences among images.

Gamut mapping or color matching is known as an image processing technique for absorbing such perceptual tincture differences of displayed (formed) color images among output media having different color gamuts and perceptually matching their tinctures with each other.

According to one image processing technique, gamut mapping is done by computing the square sum of differences between color signals for all colors used in a color monitor and those used in a color printer, and minimizing the square sum. However, this technique can obtain a satisfactory result within the color gamuts of the two devices, but considerably impair image information for color signals falling outside the ranges due to losses of grayscale characteristics or the like. For this reason, when an image has color signals falling outside the color gamuts of the two devices, it is observed to have quite different colors when it is displayed or formed by these devices.

Also, various gamut mapping techniques have been developed under the condition that grayscale information is preserved as much as possible, in consideration of the aforementioned problem relating to tone reproduction. However, in these techniques, since the amplitude of a difference signal between a color signal of a color monitor and that of a color printer upon expressing a given color becomes large for all colors, images displayed or formed by these devices are observed to have considerably different colors.

In this manner, a gamut mapping technique that can simultaneously solve these two problems is demanded.

As personal computers and workstations prevail, desktop publishing (DTP) and computer-aided design techniques are used in many occasions. In such situation, a color reproduction technique that reproduces colors expressed on a monitor by a computer using actual color agents is important. For example, in case of DTP, a color image is created, edited, processed, and so forth on a color monitor, and is output via a color printer. For this reason, it is strongly demanded that the colors of an image displayed on the color monitor (to be referred to as a "monitor image" hereinafter) perceptually match those of the image printed out (to be referred to as a "print image" hereinafter).

However, perceptual color matching between the monitor and print images encounters difficulty for the aforementioned reasons.

As a technique for absorbing perceptual color differences among output media having different color gamuts and perceptually matching the colors of images formed, gamut mapping for mapping a given color gamut into another color gamut is known. Gamut mapping performs, e.g., linear mapping in the lightness-saturation plane in units of hues in a uniform calorimetric system. According to this technique, the color gamut of a monitor shown in the graph of FIG. 19A is mapped into the color gamut of a printer shown in the graph of FIG. 19B.

However, as shown in FIG. 19B, the mapped color gamut indicated by the solid curve is narrower than the printer color gamut indicated by the one-dashed chain curve. An image that has been corrected by such gamut mapping and is printed out normally has low contrast and poor vividness.

SUMMARY OF THE INVENTION

The present invention has been made to solve the aforementioned problems, and has as its object to provide a signal processing apparatus and method, which can convert a color signal so that colors formed and/or displayed by different devices and/or different recording media are perceived as closely resembling colors.

It is another object of the present invention to provide an image processing apparatus and method which can implement gamut mapping capable of obtaining a vivid output image with high contrast.

In order to achieve the above objects, a preferred embodiment of the present invention discloses an image processing method for mapping an input color of an input color gamut to an output color of an output color gamut, the method comprising the steps of:

inputting an input color signal of the input color gamut, which includes a signal indicating brightness and a signal indicating tincture; and mapping the signal indicating brightness and the signal indicating tincture on the basis of the input and output color gamuts, wherein the mapping maps the signal indicating brightness using a mapping condition which is computed in accordance with highlight portions of the input and output color gamuts, and increases a degree of mapping of the highlight portion compared to middle lightness.

A preferred embodiment of the present invention discloses an image processing apparatus for mapping an input color of an input color gamut to an output color of an output color gamut, comprising:

inputting means for inputting an input color signal of the input color gamut, which includes a signal indicating brightness and a signal indicating tincture; and mapping means for mapping the signal indicating brightness and the signal indicating tincture on the basis of the input and output color gamuts, wherein the mapping maps the signal indicating tincture using a mapping condition which is computed in accordance with high-saturation portions of the input and output color gamuts at a predetermined hue, and increases a degree of mapping of the high-saturation portion compared to a low-saturation portion.

It is still another object of the present invention to provide an image processing apparatus and method, which can satisfactorily absorb shape differences of the color gamuts of input and output devices, and can obtain a high-quality output image.

In order to achieve the above object, a preferred embodiment of the present invention discloses an image processing method for mapping an input color of an input color gamut to an output color of an output color gamut, said method comprising the steps of:

executing a first mapping process for the input color gamut in accordance with the input and output color gamuts; and executing a second mapping process for a mapped color gamut obtained by the first mapping process in accordance with the mapped color gamut and output color gamut.

A preferred embodiment of the present invention discloses an image processing apparatus for mapping an input color of an input color gamut to an output color of an output color gamut, comprising:

first mapping means for executing a first mapping process for the input color gamut in accordance with the input and output color gamuts; and second mapping means for executing a second mapping process for a mapped color gamut obtained by the first mapping process in accordance with the mapped color gamut and output color gamut.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of a signal processing apparatus, image processing apparatus, and their methods according to the present invention will be described in detail hereinafter with reference to the accompanying drawings.

First Embodiment

[System Arrangement]

Figure 1:
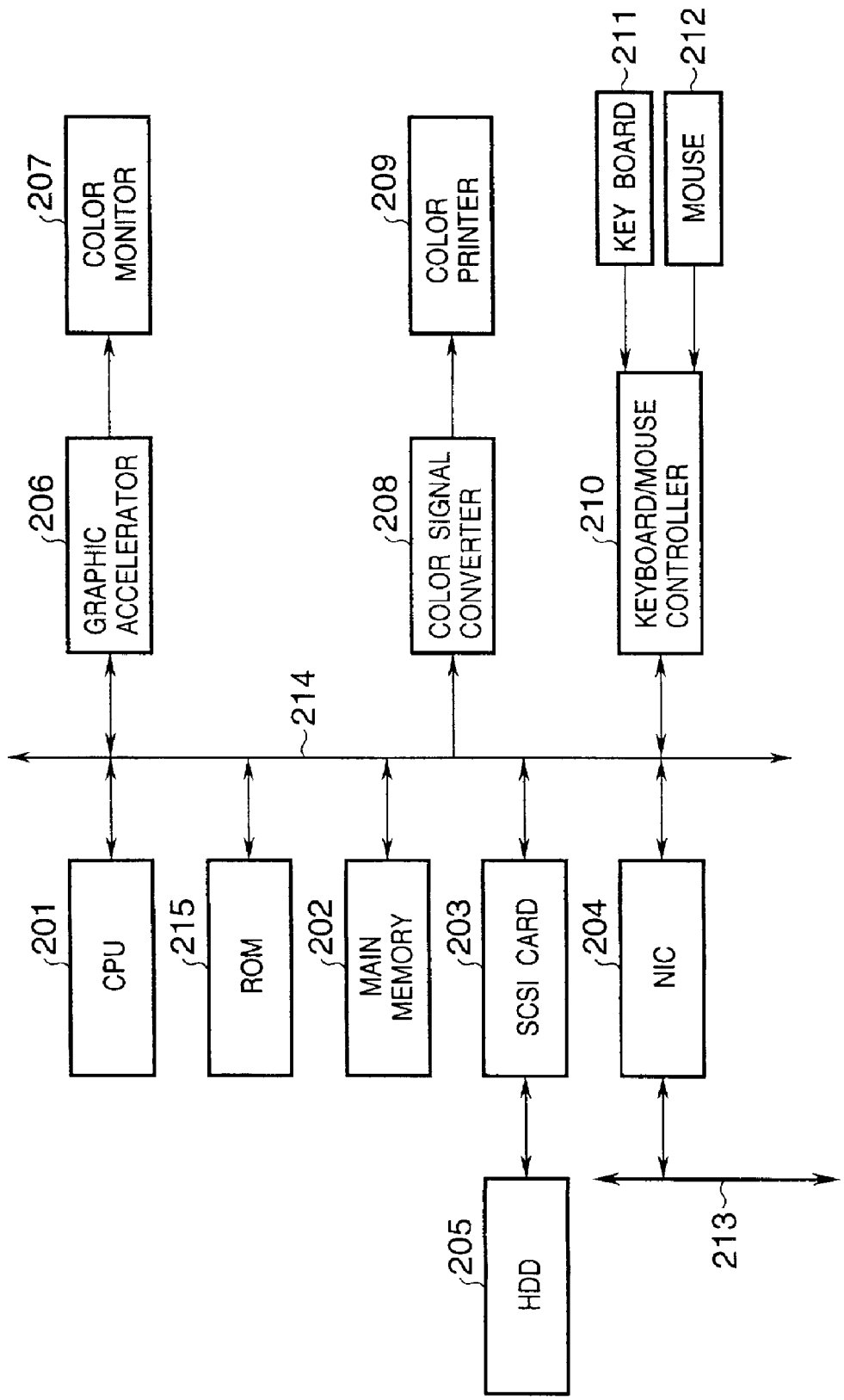
FIG. 1 is a block diagram showing the system arrangement of a color signal conversion apparatus according to the first embodiment of the present invention.

FIG. 1 is a block diagram showing the system arrangement of a color signal conversion apparatus according to the first embodiment of the present invention.

Referring to FIG. 1, reference numeral 201 denotes a microprocessor (CPU); 202, a main memory comprising a RAM or the like; 203, a Small Computer Standard Interface (SCSI) card; 204, a network interface card (NIC); 205, a hard disk drive (HDD); 206, a graphic accelerator card; 207, a color monitor such as a CRT, LCD, or the like; 208, a color signal converter with a parallel interface such as Centronics for connecting a printer; 209, a color printer; 210, a keyboard/mouse controller; 211, a keyboard; 212, a pointing device such as a mouse or the like; 213, a local area network (LAN); and 214, a Peripheral Component Interconnect (PCI) bus. Note that the CPU 201 implements various processes (to be described later) in accordance with an Operating System (OS), image processing program, and data stored in a ROM 215 and/or the HDD 205.

In the above arrangement, image data stored in the HDD 205 is transferred to the main memory 202 via the SCSI card 203 and PCI bus 214 in accordance with a command from the CPU 201. Image data stored in a server connected to the LAN 213 or image data on the Internet is transferred to the main memory 202 via the NIC 204 and PCI bus 214 in accordance with a command from the CPU 201. The image data held in the main memory 202 is transferred to the graphic accelerator card 206 via the PCI bus 214 in accordance with a command from the CPU 201. The graphic accelerator card 206 digital-to-analog (D/A) converts the image data if necessary, and then sends the image data to the color monitor 207 via a display cable. Hence, an image corresponding to the image data is displayed on the color monitor 207.

Upon receiving an instruction for printing an image held in the main memory 202 by the color printer 209 (print command) from the user at the keyboard 211 or mouse 212, the CPU 201 transfers color gamut information of a given color monitor and that of a given color printer from the HDD 205 to the main memory 202, and then transfers the two pieces of color gamut information to the color signal converter 208. Image data held in the main memory 202 is transferred to the color signal converter 208 via the PCI bus 214 in accordance with a command from the CPU 201. The color signal converter 208 performs color signal conversion of the input image data, and sends the image data as the conversion result to the color printer 209. The color printer 209 then prints an image corresponding to the image data on a recording sheet.

The user selects the printer model, the type of recording sheet, and the monitor model used in printing in advance upon inputting a print command. Based on this selection information, the CPU 201 selects one of a plurality of pieces of color gamut information held in the HDD 205.

[Color Signal Converter]

Figure 2:
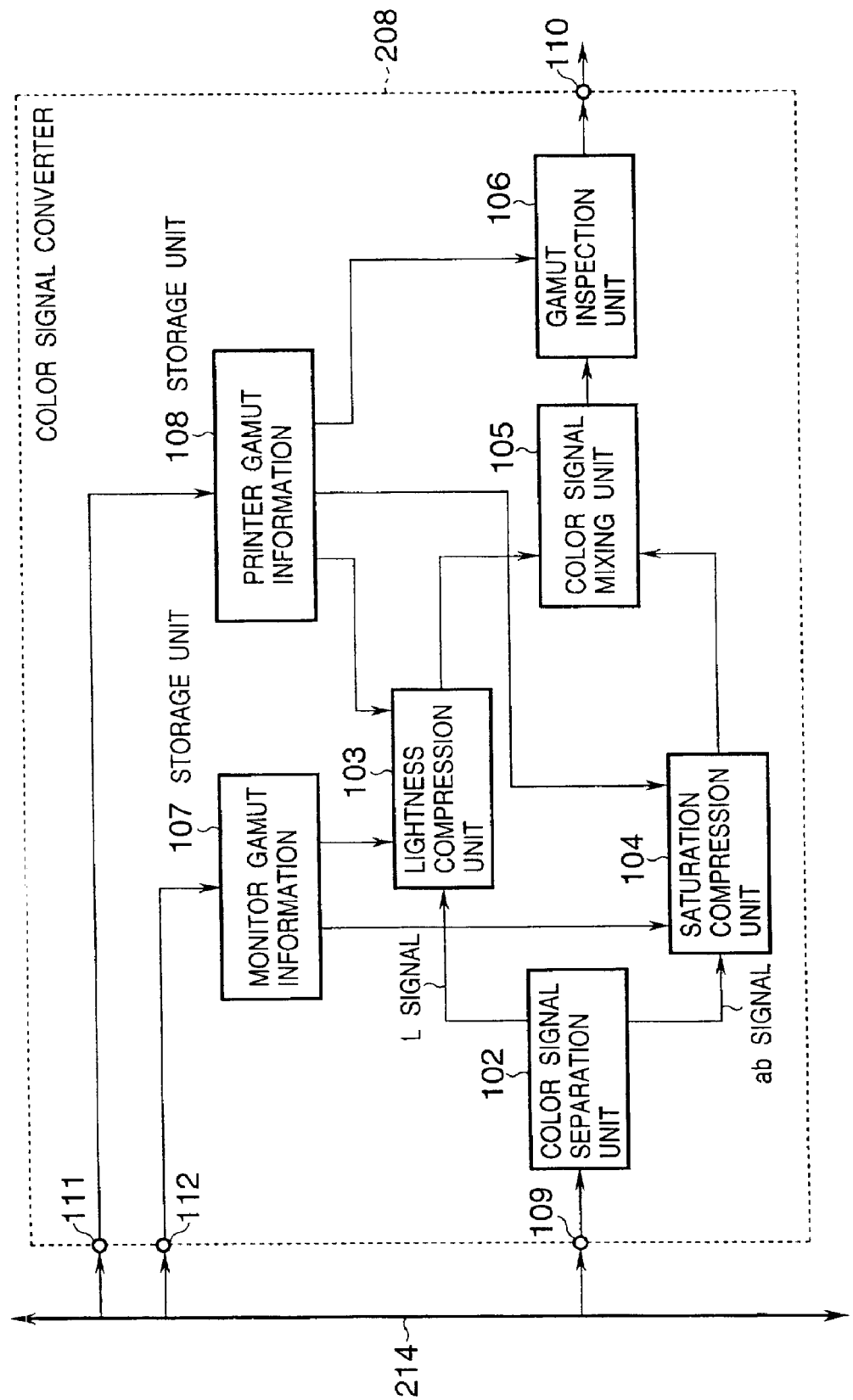
FIG. 2 is a block diagram showing the arrangement of a color signal converter shown in FIG. 1.

FIG. 2 is a block diagram showing the arrangement of the color signal converter 208. In this embodiment, a case will be exemplified below wherein gamut mapping is done in the Lab color space.

The color signal converter 208 converts an Lab signal in a monitor color gamut (to be referred to as a "monitor gamut" hereinafter) into that in a printer color gamut (to be referred to as a "printer gamut" hereinafter). The color signal converter 208 receives an Lab signal of image data held in the main memory 202, i.e., a color signal in the monitor gamut as a conversion source, via a terminal 109. An output image to the printer, i.e., a color signal in the desired printer gamut, is output from a terminal 110.

The converter 208 receives printer gamut information from a terminal 111, and monitor gamut information from a terminal 112. The monitor gamut information is stored in a storage unit 107, and the printer gamut information in a storage unit 108.

Reference numeral 102 denotes a color signal separation unit for separating an input Lab signal into a lightness component L and chromaticity components a and b, and outputting an L signal as the lightness component to a lightness compression unit 103 and an ab signal as chromaticity components to a saturation compression unit 104. The lightness compression unit 103 compresses lightness of the input L signal in accordance with the input/output relationship determined based on lightness range information extracted from the monitor gamut information and printer gamut information, and a predetermined compression relationship, and outputs an L signal as a compression result to a color signal mixing unit 105. The saturation compression unit 104 compresses saturation of the input ab signal in accordance with the input/output relationship determined based on saturation range information extracted from the monitor gamut information and printer gamut information, and a predetermined compression relationship, and outputs an ab signal as a compression result to the color signal mixing unit 105.

The color signal mixing unit 105 mixes the input L and ab signals and outputs an Lab signal to a gamut inspection unit 106. The gamut inspection unit checks whether or not the input Lab signal lies within the printer gamut. If the input Lab signal lies within the printer gamut, the unit 106 outputs the input Lab signal; if the input Lab signal lies outside the printer gamut, it outputs an Lab signal within the printer gamut that minimizes the color difference.

In the above arrangement, the color signal converter 208 operates as follows. Prior to operation, the converter 208 receives color gamut information of the color monitor 207 and that of the color printer 209 in accordance with a command from the CPU 201, and these pieces of information are respectively stored as monitor gamut information and printer gamut information in the storage units 107 and 108. After that, image data in which color information is described by an Lab signal is sent to the color signal converter 208 in the raster scan order via the PCI bus 214. The color signal converter 208 performs color signal conversion of an Lab signal of each pixel in the image data by means of gamut mapping, and sequentially sends the converted signal to the color printer 209.

In this color signal conversion, the input Lab signal is separated by the color signal separation unit 102 into L and ab signals, which undergo gamut mapping in the individual circuits that construct the color signal converter 208.

Lightness Compression Unit

The lightness compression unit 103 is controlled by a function $f(\cdot)$ that defines the input/output relationship. That is, Lin as an L signal input to the lightness compression unit 103 and Lout as an L signal to be output satisfy a relation Lout=f(Lin). $f(\cdot)$ is defined using a piecewise function consisting of n−1 segments, and is controlled to meet the following conditions:

carrier of $f(\cdot)$ is [Lmin_monitor, Lmax_monitor]

in carrier, $f(\cdot)$ is continuous at all points f(Lmin_monitor)=Lmin_printer f(Lmax_monitor)=Lmax_printer f'(Lmin_monitor)=$\alpha$, $\alpha$: $0 \leq \alpha$ f'(Lmax_monitor)=$\beta$, $\beta$: $0 \leq \beta$ f(mi)=mi, i: $0 \leq i \leq n-2$, mi: Lmin_printer<mi<Lmax_printer f'(mi)=1, i: $0 \leq i \leq n-2$, mi: Lmin_printer<mi<Lmax_printer f'(x)≠0, x: Lmin_monitor<x<Lmax_monitor where Lmin_monitor: L value of black of monitor Lmax_monitor: L value of white of monitor Lmin_printer: L value of black of printer Lmax_printer: L value of white of printer $\alpha$: constant for controlling compression ratio near brightest point of lightness compression $\beta$: constant for controlling compression ratio near darkest point of lightness compression Note that n is the number of knots or the knot index of the piecewise function.

Constant $\alpha$ for controlling the compression ratio decreases with increasing difference between Lmin_monitor and Lmin_printer. That is, a higher compression ratio is set near the darkest point. On the other hand, constant $\beta$ for controlling the compression ratio decreases with increasing difference between Lmax_monitor and Lmax_printer. That is, a higher compression ratio is set near the brightest point. In the first embodiment, $f(\cdot)$ is implemented as a C2-continuous spline function of third order, defined by, e.g., five knots and four segments. Also, for example, m1=40, m2=50, and m3=70.

Figure 3:
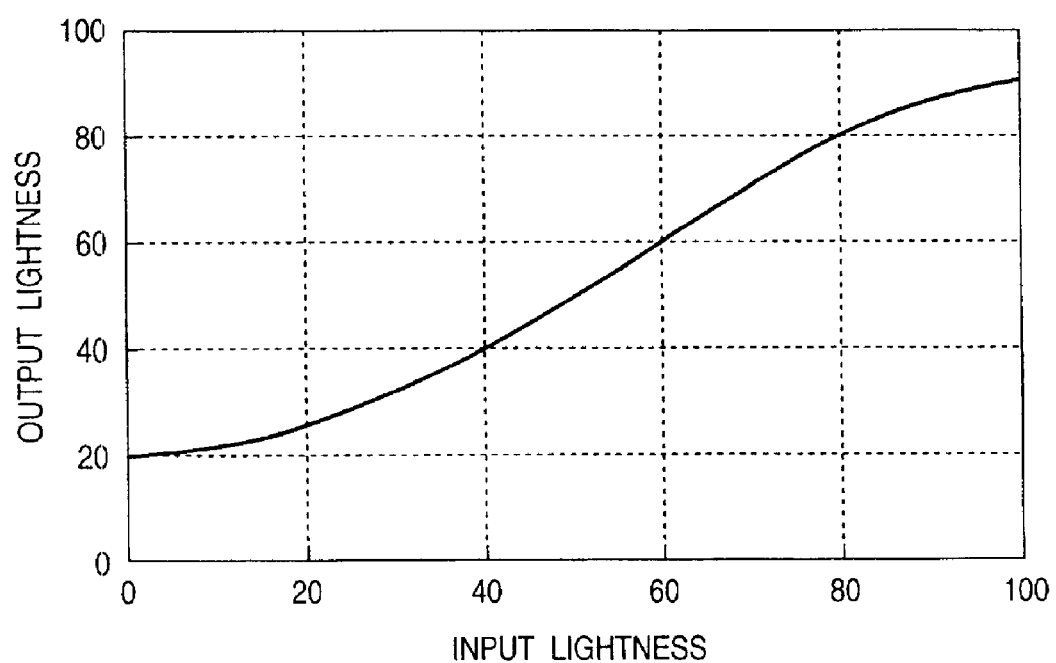
FIG. 3 is a graph showing the input/output relationship of lightness in the first embodiment.

FIG. 3 shows the input/output relationship of lightness when Lmin_monitor=0, Lmax_monitor=100, Lmin_printer=20, and Lmax_printer=90 in a given printer output using the first embodiment.

Saturation Compression Unit

Figure 4:
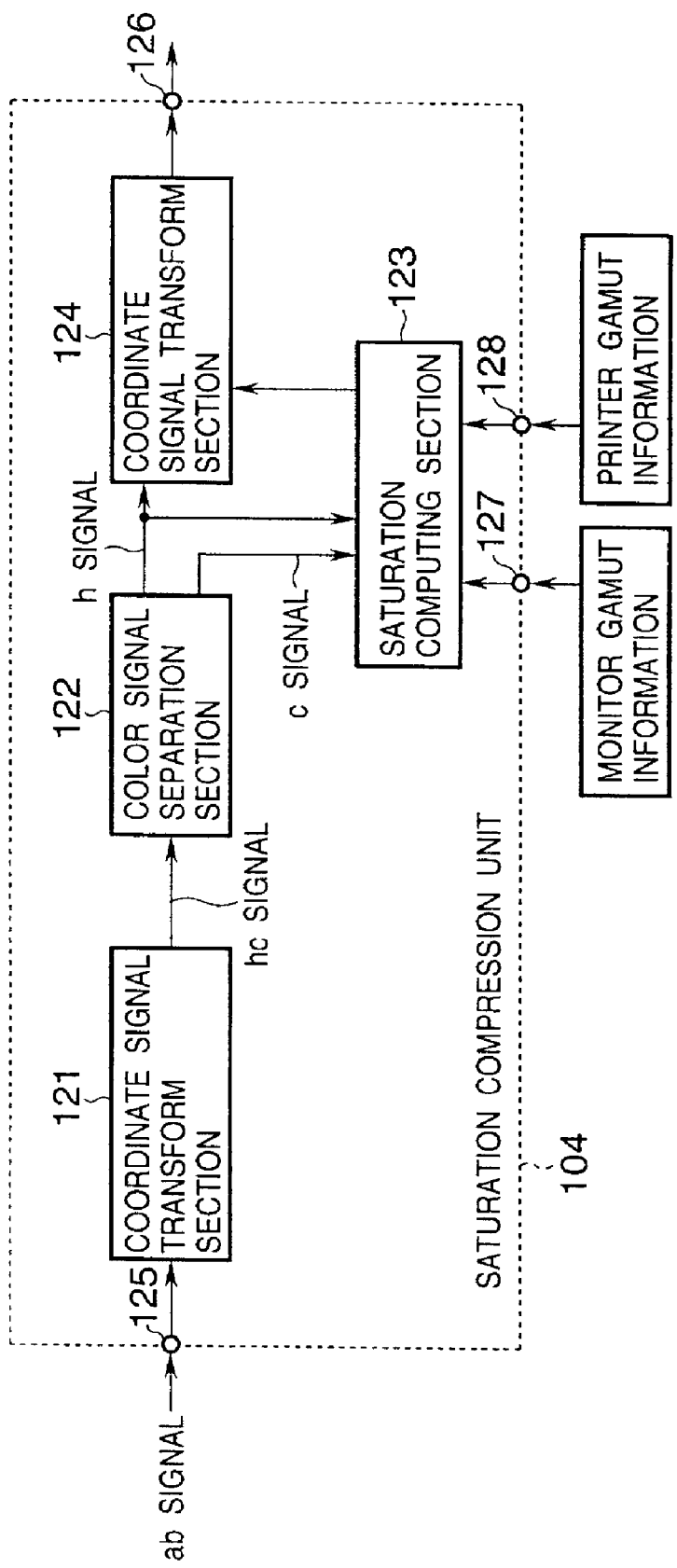
FIG. 4 is a block diagram showing the arrangement of a saturation compression unit shown in FIG. 2.

FIG. 4 is a block diagram showing the arrangement of the saturation compression unit 104. The unit 104 receives an ab signal from a terminal 125, and outputs a saturation-compressed ab signal from a terminal 126. The unit 104 receives monitor gamut information from a terminal 127, and printer gamut information from a terminal 128.

A coordinate signal transform section 121 transforms an ab signal that expresses chromaticity by an orthogonal coordinate system into an hc signal that expresses chromaticity by a polar coordinate system. Note that an h signal represents angle in the polar coordinate system, i.e., hue, and a c signal represents the distance from the origin in the polar coordinate system, i.e., saturation. A color signal separation section 122 separates the input hc signal into a hue component h and saturation component c, and outputs an h signal as a hue component to a coordinate signal transform section 124 and saturation computing section 123, and a c signal as a saturation signal to the saturation computing section 123.

The saturation computing section 123 computes saturation to be output from the input c signal in accordance with the input/output relationship determined based on saturation range information at a hue defined by the h signal, which information is extracted from the monitor gamut information and printer gamut information, and a predetermined compression relationship. A c signal as a computation result is output to the coordinate signal transform section 124. The coordinate signal transform section 124 transforms the hc signal into an ab signal, and outputs the ab signal.

The saturation computing section 123 is controlled by a function $g(\cdot)$ that defines the input/output relationship. That is, a c signal cin input to the saturation computing section 123 and a c signal cout to be output satisfy cout=g(cin). $g(\cdot)$ is defined using a cubic function, and is controlled to satisfy the following conditions:

carrier of $g(\cdot)$ is [0, Cmax_monitor]

g(0)=0 g(Cmax_monitor)=Cmax_printer g'(0)=1 g'(Cmax_monitor)=$\gamma$, $\gamma$: $\gamma>0$ g'(x)≠0, x: $0 \leq x \leq$ Cmax_monitor Cmax_monitor is computed from the h signal and monitor gamut information and is defined as a maximum saturation value of the monitor gamut at a hue defined by the h signal. Cmax_printer is computed from the h signal and printer gamut information, and is defined as a maximum saturation value of the printer gamut at a hue defined by the h signal. Also, $\gamma$ is a value for controlling the compression ratio of saturation compression near the maximum saturation, and is automatically determined by the saturation computing section 123 based on the relationship between Cmax_monitor and Cmax_printer under a limitation that it satisfies the aforementioned conditions. Upon automatically setting the $\gamma$ parameter, as Cmax_monitor/Cmax_printer as the ratio between Cmax_monitor and Cmax_printer becomes larger, the value $\gamma$ becomes smaller. That is, the compression ratio increases.

Figure 5:
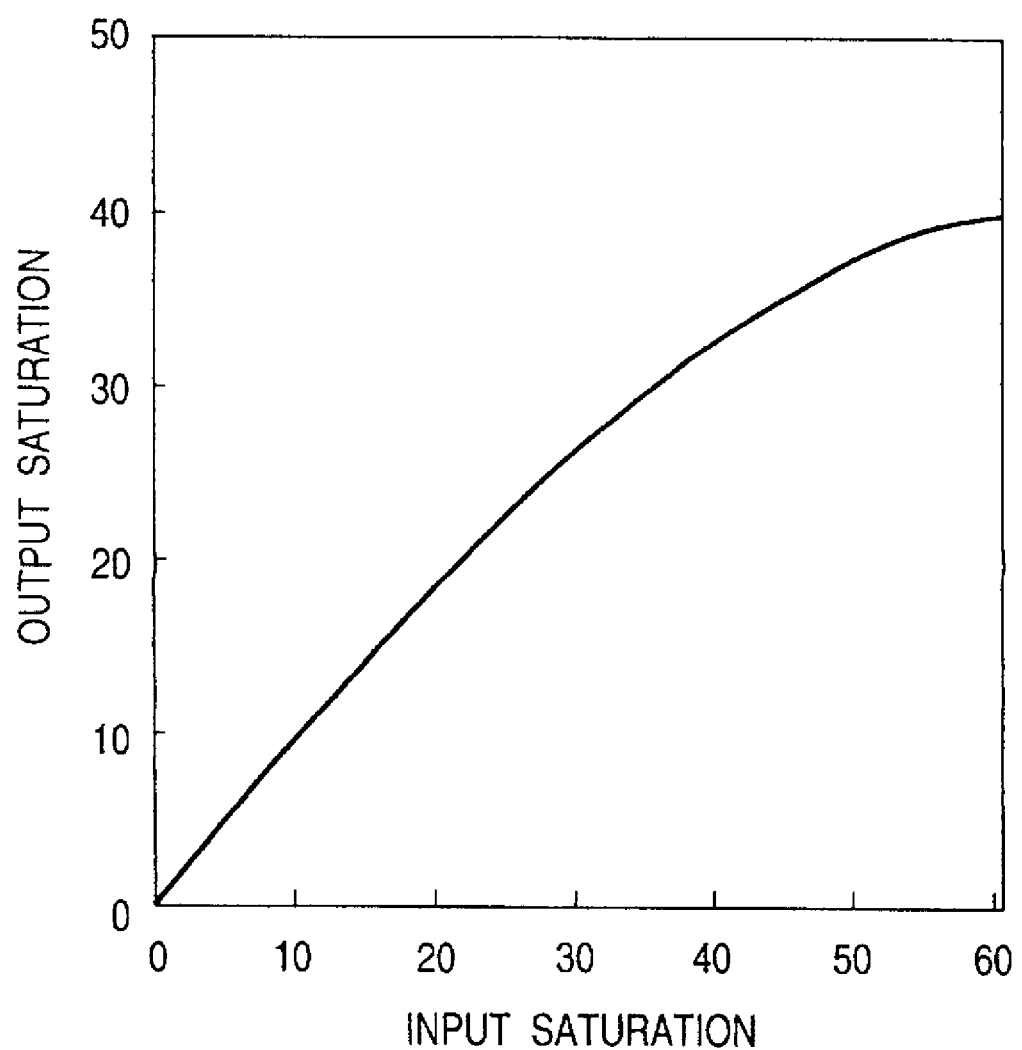
FIG. 5 is a graph showing the input/output relationship of saturation in the first embodiment.

FIG. 5 shows the input/output relationship of saturation in a given printer output using the first embodiment. Note that Cmax_monitor=60.51, and Cmax_printer=40.17.

In the first embodiment, the saturation range information is computed as described above, but may be computed by another means. For example, as the saturation range information of the monitor gamut, maximum saturation information of a hue defined by the h signal may be computed by interpolating primary color saturation information with this scheme, the saturation range information can be easily computed. Also, the saturation range information of the printer gamut may be arbitrarily determined in advance. With this scheme, color of maximum saturation can be adjusted.

Figure 6:
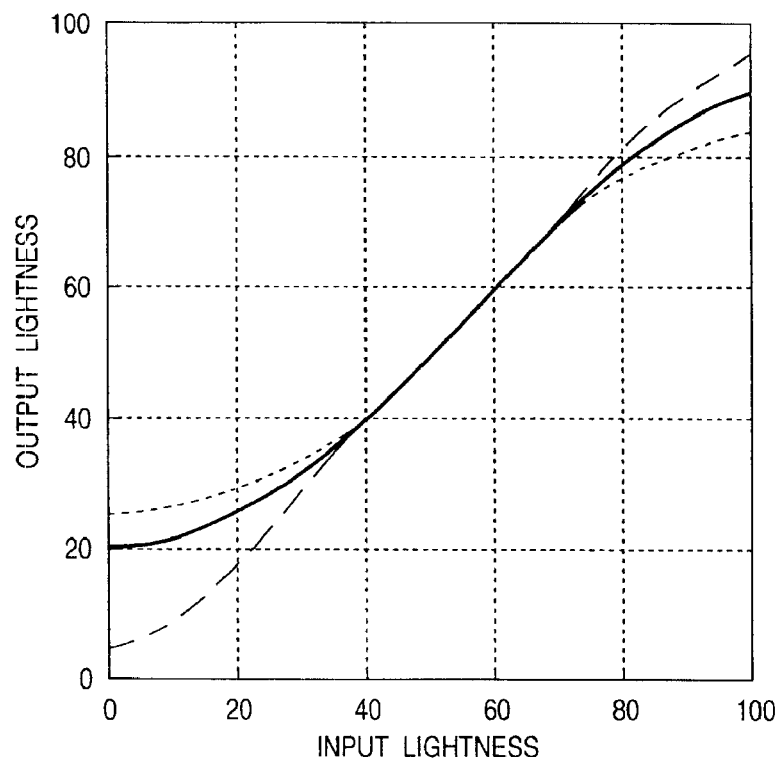
FIG. 6 is a graph showing the lightness compression input/output characteristics when gamut mapping is done in correspondence with a plurality of paper qualities.

According to the first embodiment, lightness compression input/output characteristics obtained upon gamut mapping for a plurality of types of paper qualities such as a normal paper sheet, dedicated recording paper sheet, and the like in a color monitor of a given model and a color printer of another model are superposed on each other, as shown in FIG. 6. That is, middle lightness can be preserved independently of paper qualities. On the other hand, the compression ratio changes largely in correspondence with the lightness range that allows color reproduction near the brightest or darkest point.

According to the first embodiment, color continuity can be maintained, and tones outside the printer gamut can be reproduced. Furthermore, a middle-lightness region (see FIG. 3) and low-saturation region (see FIG. 5), as color gamuts to which the human eye is sensitive and which are frequently included in a photo image, can be reproduced with high precision. Therefore, an input image whose colors fall outside the printer gamut can be faithfully reproduced by the printer.

Since the middle-lightness and low-saturation regions can be reproduced with high precision, color reproducibilities for the middle-lightness and low-saturation regions can match for various types of recording sheets (recording media) having different color reproduction characteristics (color gamuts), as shown in FIG. 6, and the tinctures of images printed on individual recording sheets can be matched.

Second Embodiment

A signal processing apparatus according tot he second embodiment of the present invention will be explained below. The same reference numerals in the second embodiment denote the same parts as in the first embodiment, and a detailed description thereof will be omitted.

In the second embodiment, the operation of the saturation compression unit 104 in the first embodiment is modified. The saturation computing section 123 in the saturation compression unit 104 is controlled by a function $g(\cdot)$ that defines the input/output relationship. That is, a c signal cin input to the saturation computing section 123 and a c signal cout to be output satisfy cout=g(cin). $g(\cdot)$ is defined using a piecewise function consisting of n−1 segments, and is controlled to satisfy the following conditions:

carrier of $g(\cdot)$ is [0, Cmax_monitor]

$g(0)=0$ $g(Cmax\_monitor)=Cmax\_printer$ $g'(0)=1$ $g'(Cmax\_monitor)=\gamma, \gamma: \gamma>0$ $g(mi)=mi, I: 0 \leq i \leq n-2, mi: 0<mi<Cmax\_monitor$ $g'(mi)=1, i: 0 \leq i \leq n-2, mi: 0<mi<Cmax\_monitor$ $g'(x) \neq 0, x: 0 \leq x \leq Cmax\_monitor$ Note that n is the number of knots of the piecewise function.

Cmax_monitor is computed from the h signal and monitor gamut information and is defined as a maximum saturation value of the monitor gamut at a hue defined by the h signal. Cmax_printer is computed from the h signal and printer gamut information, and is defined as a maximum saturation value of the printer gamut at a hue defined by the h signal. Also, γ is a value for controlling the compression ratio of saturation compression near the maximum saturation, and is automatically determined by the saturation computing section 123 based on the relationship between Cmax_monitor and Cmax_printer under a limitation that it satisfies the aforementioned conditions. Upon automatically setting the γ parameter, as Cmax_monitor/Cmax_printer as the ratio between Cmax_monitor and Cmax_printer becomes larger, the value γ becomes smaller. That is, the compression ratio increases.

In the second embodiment, $g(\cdot)$ is implemented as a C2-continuous spline function of third order, which consists of 2 segments. Also, for example, $m1=\frac{1}{2} \times Cmax\_monitor$.

Figure 7:
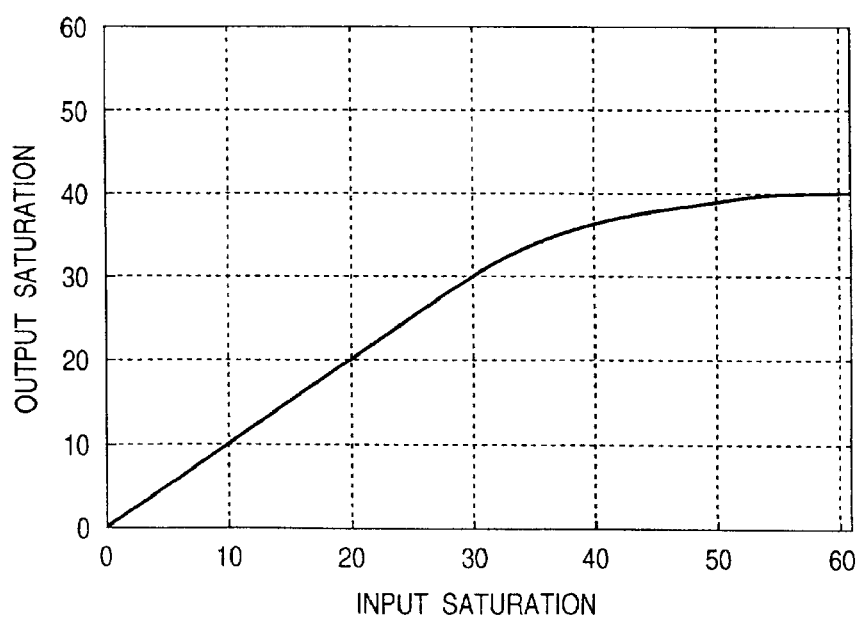
FIG. 7 is a graph showing the input/output relationship of lightness in the second embodiment.

FIG. 7 shows the input/output relationship of saturation in a given printer output using the second embodiment. Note that Cmax_monitor=60.51 and Cmax_printer=40.17.

Third Embodiment

A signal processing apparatus according to the third embodiment of the present invention will be described below. The same reference numerals in the third embodiment denote the same parts as in the first embodiment, and a detailed description thereof will be omitted.

Figure 8:
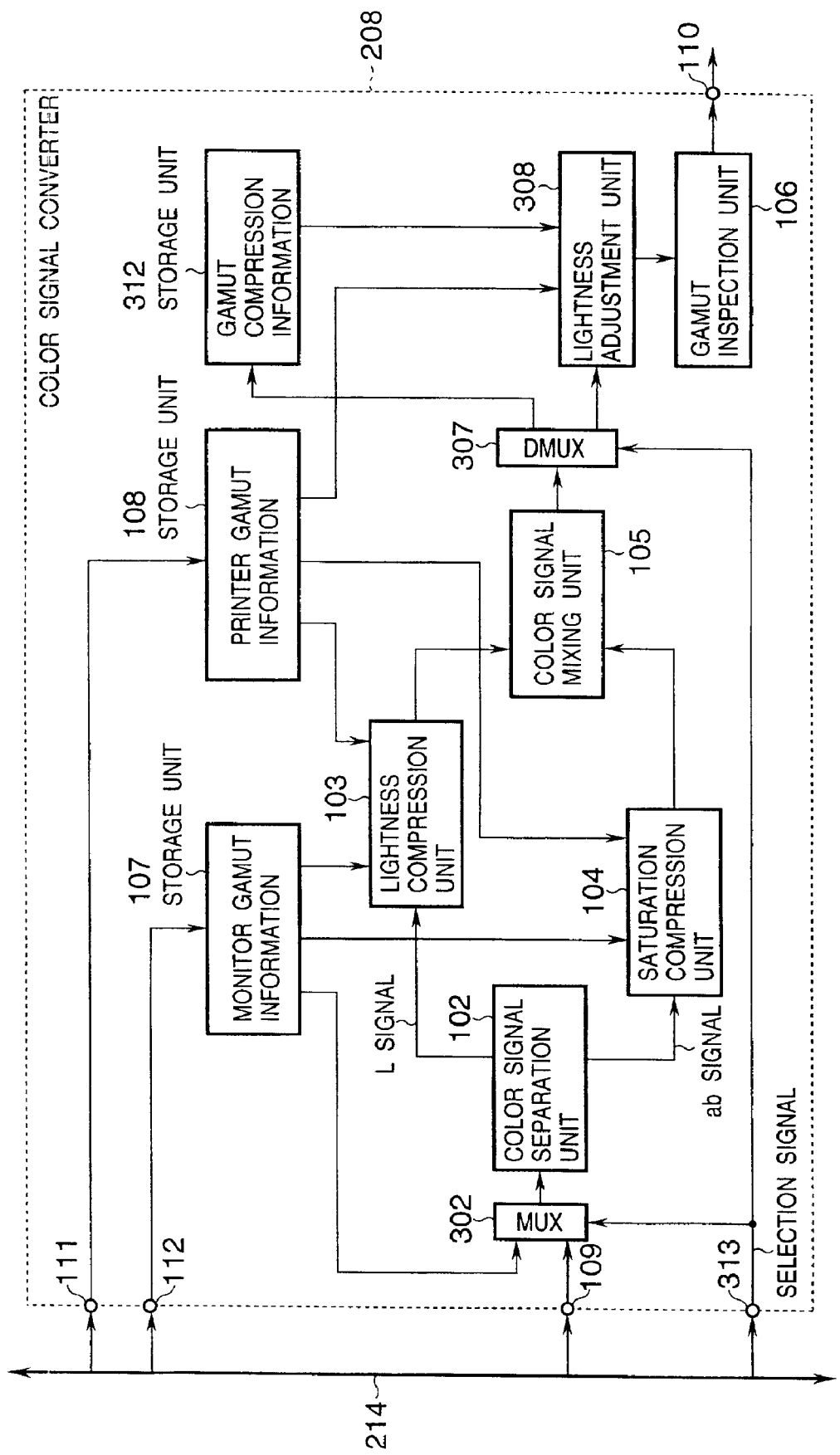
FIG. 8 is a block diagram showing the arrangement of a color signal converter according to the third embodiment.

FIG. 8 is a block diagram showing the arrangement of the color signal converter 208 according to the third embodiment of the present invention.

An Lab signal of image data held in the main memory 202, i.e., a color signal in the monitor gamut as a conversion source, is input to the color signal converter 208 that converts an Lab signal in the monitor gamut into that in the printer gamut via the terminal 109. An output image to the printer, i.e., a color signal in the desired printer gamut, is output from the terminal 110.

The converter 208 receives printer gamut information from the terminal 111, and monitor gamut information from the terminal 112. The monitor gamut information is stored in the storage unit 107, and the printer gamut information in the storage unit 108. A storage unit 312 stores information as lightness and saturation compression results with respect to the monitor gamut (to be referred to as "gamut compression information" hereinafter).

A multiplexer (MUX) 302 selects a signal input from the storage unit 107 or the terminal 109 on the basis of a selection signal input from the CPU 201 via a terminal 313, and outputs the selected signal to the color signal separation unit 102. Since the processes in the color signal separation unit 102, lightness compression unit 103, saturation compression unit 104, and color signal mixing unit 105 are the same as those that have been explained in the first embodiment using FIG. 2, a detailed description thereof will be omitted.

An Lab signal output from the color signal mixing unit 105 is input to a demultiplexer (DMUX) 307, and is output to the storage unit 312 or a lightness adjustment unit 308 in accordance with a selection signal from the CPU 201. The lightness adjustment unit 308 converts an L signal in accordance with the input/output relationship determined on the basis of the input Lab signal, printer gamut information, and gamut compression information stored in the storage unit 312, and outputs an Lab signal as the conversion result to the aforementioned gamut inspection unit 106.

In the aforementioned arrangement, the color signal converter 208 operates as follows. Prior to operation, the converter 208 receives color gamut information of the color monitor and that of the color printer in accordance with a command from the CPU 201, and these pieces of information are respectively stored as monitor gamut information and printer gamut information in the storage units 107 and 108. The color signal converter 208 then generates gamut compression information as monitor gamut information that has undergone lightness and saturation compressions, and stores it in the storage unit 312. In this process, the MUX 302 selects a signal input from the storage unit 107, and the DMUX 307 selects an output to the storage unit 312.

Upon completion of the process, the color signal converter 208 performs color signal conversion that gamut-maps an input Lab signal in the monitor gamut. In this process, the MUX 302 selects a signal input from the terminal 109, and the DMUX 307 selects an output to the lightness adjustment unit 306.

Upon completion of the above operations, image data in which color information is described by an Lab signal is sent to the color signal converter 208 in the raster scan order via the PCI bus 214. The color signal converter 208 performs color signal conversion of an Lab signal of each pixel in the image data by means of gamut mapping, and sequentially sends the converted signal to the printer. Hence, image data in which color information is described by an Lab signal is sent to the color signal converter 208 in the raster scan order via the PCI bus 214. The color signal converter 208 performs color signal conversion of an Lab signal of each pixel in the image data by means of gamut mapping, and sequentially sends the converted signal to the color printer 209.

Lightness Adjustment Unit

The lightness adjustment unit 308 extracts a information and b information from the input Lab signal, and extracts a lightness maximum value Lmax_printer_ab and lightness minimum value Lmin_printer_ab, which have the same values as the extracted a information and b information in a printer gamut, from the extracted a information and b information, and the printer gamut information. Subsequently, the unit 308 extracts a lightness maximum value Lmax_compressed_ab and lightness minimum value Lmin_compressed_ab, which have the same values as the extracted a information and b information in a monitor gamut that have undergone lightness and saturation compressions (to be also referred to as a "compressed gamut" hereinafter), from the extracted a information and b information, and the gamut compression information. The unit 308 computes lightness information Lout from these pieces of extracted information, and L information Lin of the input Lab signal in the following procedure.

If at least one of Lmax_printer_ab, Lmin_printer_ab, Lmax_compressed_ab, and Lmin_compressed_ab is not extracted, Lout=Lin is set.

Otherwise, Lout is computed by:

$$\text{Lout} = \alpha \, (\text{Lin} - \text{Lmin\_compressed\_ab}) + \text{Lmin\_printer\_ab}$$

$$\text{for } \alpha = \frac{\text{Lmax\_printer\_ab} - \text{Lmin\_printer\_ab}}{\text{Lmax\_compressed\_ab} - \text{Lmin\_compressed\_ab}}$$

The lightness adjustment unit 308 outputs an Lab signal obtained by mixing the computed lightness information Lout, and the a information and b information of the input Lab signal.

According to the third embodiment, gamut mapping with higher precision than the first embodiment can be implemented. That is, since an actual printer gamut has a very complicated shape, conversion based on a compression ratio, which is set according to Cmax_printer in the first embodiment, cannot perfectly convert input image data into a printer gamut. By contrast, according to the third embodiment, since gamut mapping is done based on the gamut compression information as data after compression that pertains to an input image, higher-precision gamut mapping can be implemented.

Fourth Embodiment

A signal processing apparatus according to the fourth embodiment of the present invention will be described below. Note that the same reference numerals in the fourth embodiment denote the same parts as those in the first and third embodiments, and a detailed description thereof will be omitted.

In the fourth embodiment, the operation of the lightness adjustment unit 308 in the third embodiment is modified. The lightness adjustment unit 308 extracts a information and b information from the input Lab signal, and extracts a lightness maximum value Lmax_printer_ab and lightness minimum value Lmin_printer_ab, which have the same values as the extracted a information and b information in a printer gamut, from the extracted a information and b information, and the printer gamut information. Subsequently, the unit 308 extracts a lightness maximum value Lmax_compressed_ab and lightness minimum value Lmin_compressed_ab, which have the same values as the extracted a information and b information in a monitor gamut that have undergone lightness and saturation compressions (to be also referred to as a "compressed gamut" hereinafter), from the extracted a information and b information, and the gamut compression information. The unit 308 computes lightness information Lout from these pieces of extracted information, and L information Lin of the input Lab signal in the following procedure.

If at least one of Lmax_printer_ab, Lmin_printer_ab, Lmax_compressed_ab, and Lmin_compressed_ab is not extracted, Lout=Lin is set.

Otherwise, Lout is computed using a function $h(\cdot)$ that defines the input/output relationship. That is, Lout=h(Lin) is set. $h(\cdot)$ is defined using a piecewise function consisting of n−1 segments, and is controlled to satisfy the following conditions:

carrier of $h(\cdot)$ is [Lmin_compressed_ab, Lmax_compressed_ab]

in carrier, $h(\cdot)$ is continuous at all points h(Lmin_compressed_ab)=Lmin_printer_ab h(Lmax_compressed_ab)=Lmax_printer_ab h'(Lmin_compressed_ab)=$\alpha$, $\alpha$: $0<\alpha$ h'(Lmax_compressed_ab)=$\beta$, $\beta$: $0<\beta$ h(mi)=ni, i: $0 \leq i \leq n-2$, mi: Lmin_compressed_ab<mi<Lmax_compressed_ab, ni: Lmin_printer_ab<ni<Lmax_printer_ab h'(mi)=1, i: $0 \leq i \leq n-2$, mi: Lmin_compressed_ab<mi<Lmax_compressed_ab h'(x)$\neq$0, x: Lmin_compressed_ab $\leq$ x $\leq$ Lmax_compressed_ab Note that n is the number of knots of the piecewise function $h(\cdot)$.

Also $\alpha$ and $\beta$ are parameters that give compression ratios at the end point of the carrier, and are automatically computed under a limitation that they satisfy the aforementioned conditions. Also, mi and ni are automatically computed under a limitation that they satisfy the aforementioned conditions. The automatic computation algorithm is devised so mi=ni as much as possible. But since priority is given to preserving grayscale information and satisfying the aforementioned conditions, the relation mi=ni is not always guaranteed. However, the algorithm is devised to minimize the absolute value of a difference, |h(Lin)−Lin|, between the input and output at each point as much as possible.

In the fourth embodiment, $h(\cdot)$ is implemented as a C1-continuous spline function of third order, which is defined by three segments. Also, m1=⅓×Cmax_monitor, and m2=⅔×Cmax_monitor.

Figure 9:
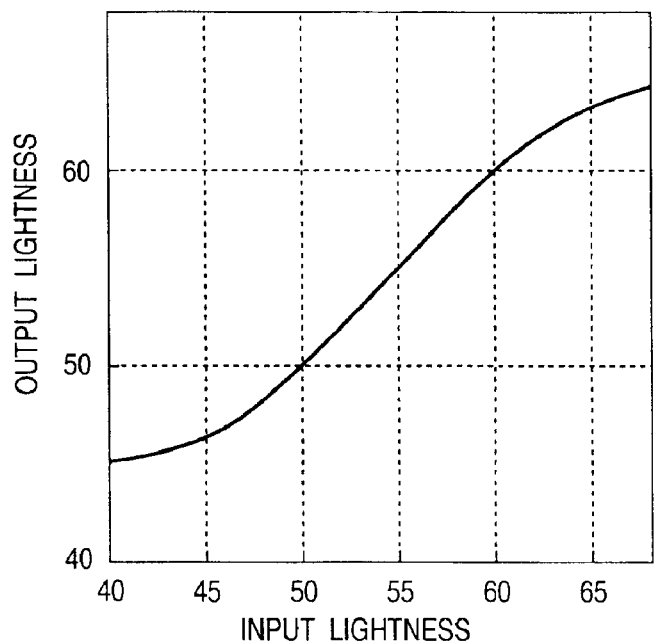
FIGS. 9 and 10 are graphs showing the input/output relationship of lightness at given chromaticity ab.
Figure 10:
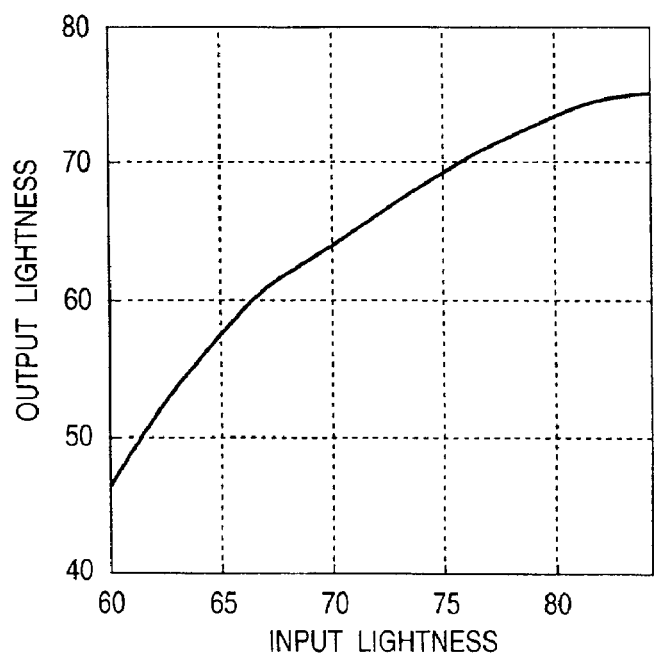

FIGS. 9 and 10 show the input/output relationship of lightness at given chromaticity ab in a certain printer output that uses the fourth embodiment. Note that Lmin_compressed_ab=40, Lmax_compressed_ab=68, Lmin_printer_ab=45, and Lmax_printer_ab=64 in FIG. 9. Also, Lmin_compressed_ab=60, Lmax_compressed_ab=84, Lmin_printer_ab=46, and Lmax_printer_ab=75 in FIG. 10.

According to the fourth embodiment, since nonlinear conversion is used in lightness compression, reproducibility in a middle lightness region can be further improved. Especially, color reproducibility in a region like cyan in which monitor and printer gamuts do not have any similar relationship can be improved.

Fifth Embodiment

A signal processing apparatus according to the fifth embodiment of the present invention will be explained below. Note that the same reference numerals in the fifth embodiment denote the same parts as those in the first, third, and fourth embodiments, and a detailed description thereof will be omitted.

Figure 11:
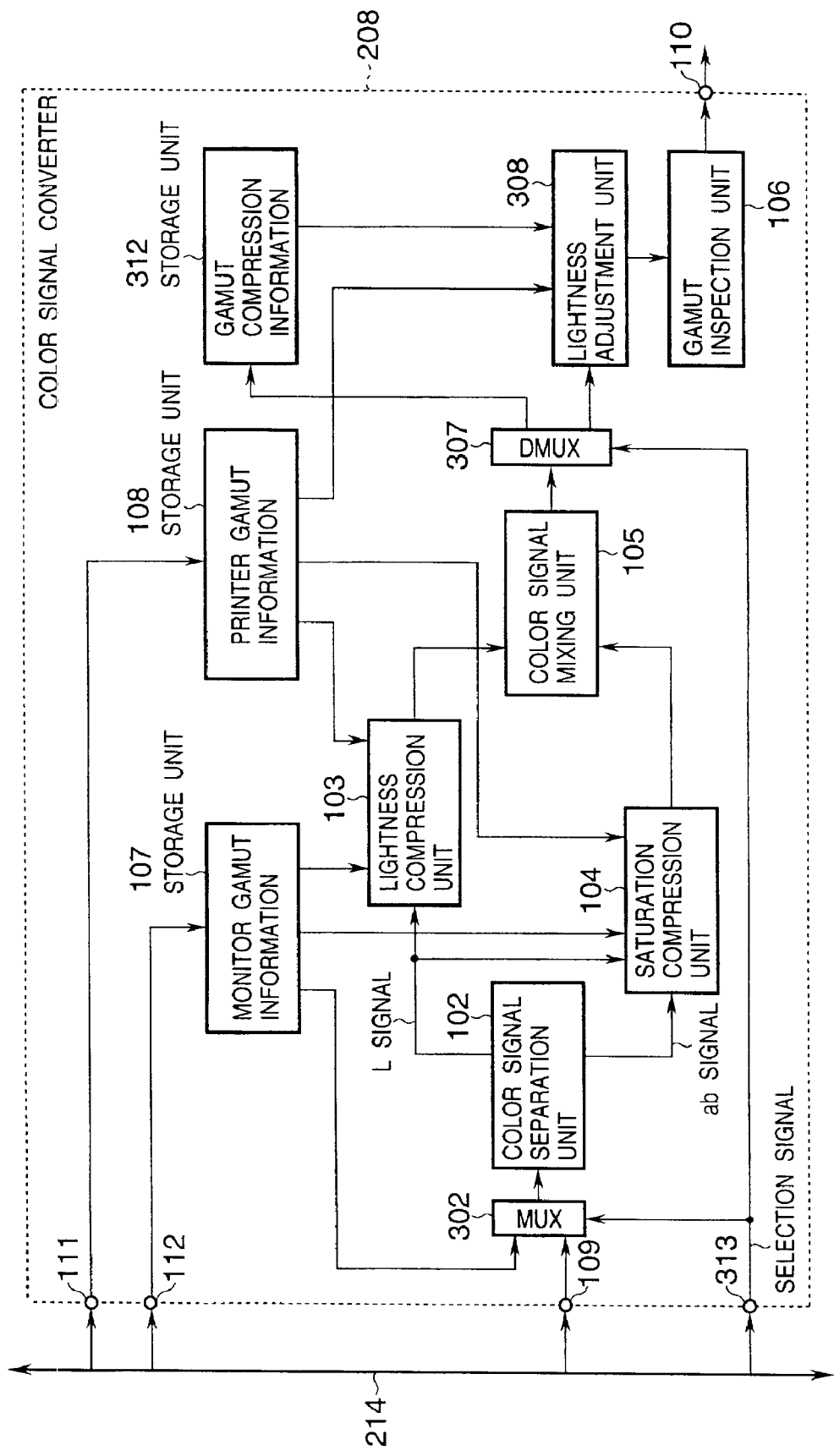
FIG. 11 is a block diagram showing the arrangement of a color signal converter according to the fifth embodiment.

In the fifth embodiment, the arrangement of the saturation compression unit 104 in the fourth embodiment is modified. FIG. 11 is a block diagram showing the arrangement of the color signal converter 208 of the fourth embodiment, which is substantially the same as that shown in FIG. 8, except that an L signal is input to the saturation compression unit 104 together with an ab signal.

Figure 12:
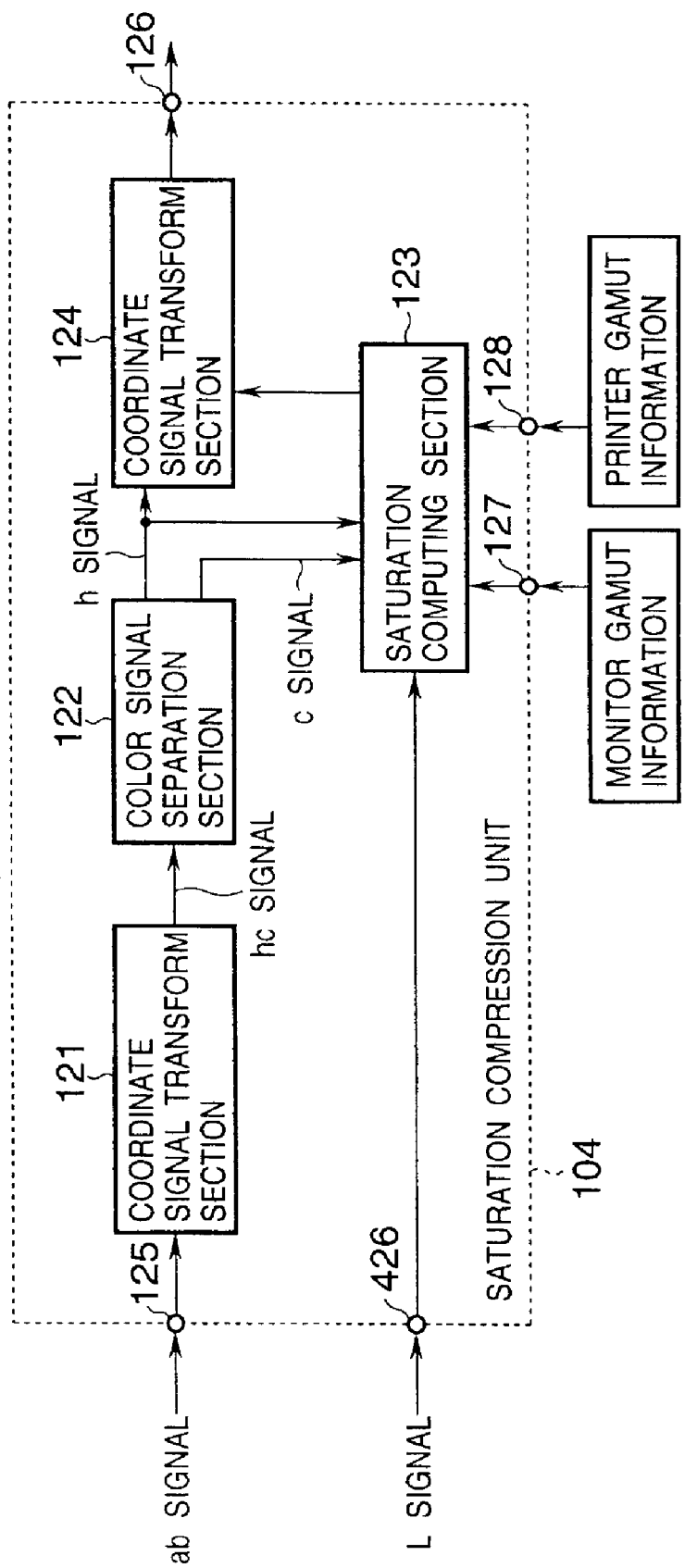
FIG. 12 is a block diagram showing the arrangement of a saturation compression unit shown in FIG. 11.

FIG. 12 is a block diagram showing the arrangement of the saturation compression unit 104 of the fifth embodiment. Unlike the saturation compression unit 104 shown in FIG. 4, an L signal is input to the saturation computing section 123 via a terminal 426.

The saturation computing section 123 computes saturation to be output from the input c signal in accordance with the input/output relationship, which is defined by saturation range information at a hue determined by the h signal and lightness determined by the input L signal, which information is extracted from monitor gamut information and printer gamut information, and a predetermined compression relationship. A c signal as a computation result is output to the coordinate signal transform section 124. The coordinate signal transform section 124 transforms an hc signal into an ab signal, and outputs the ab signal.

Figure 13:
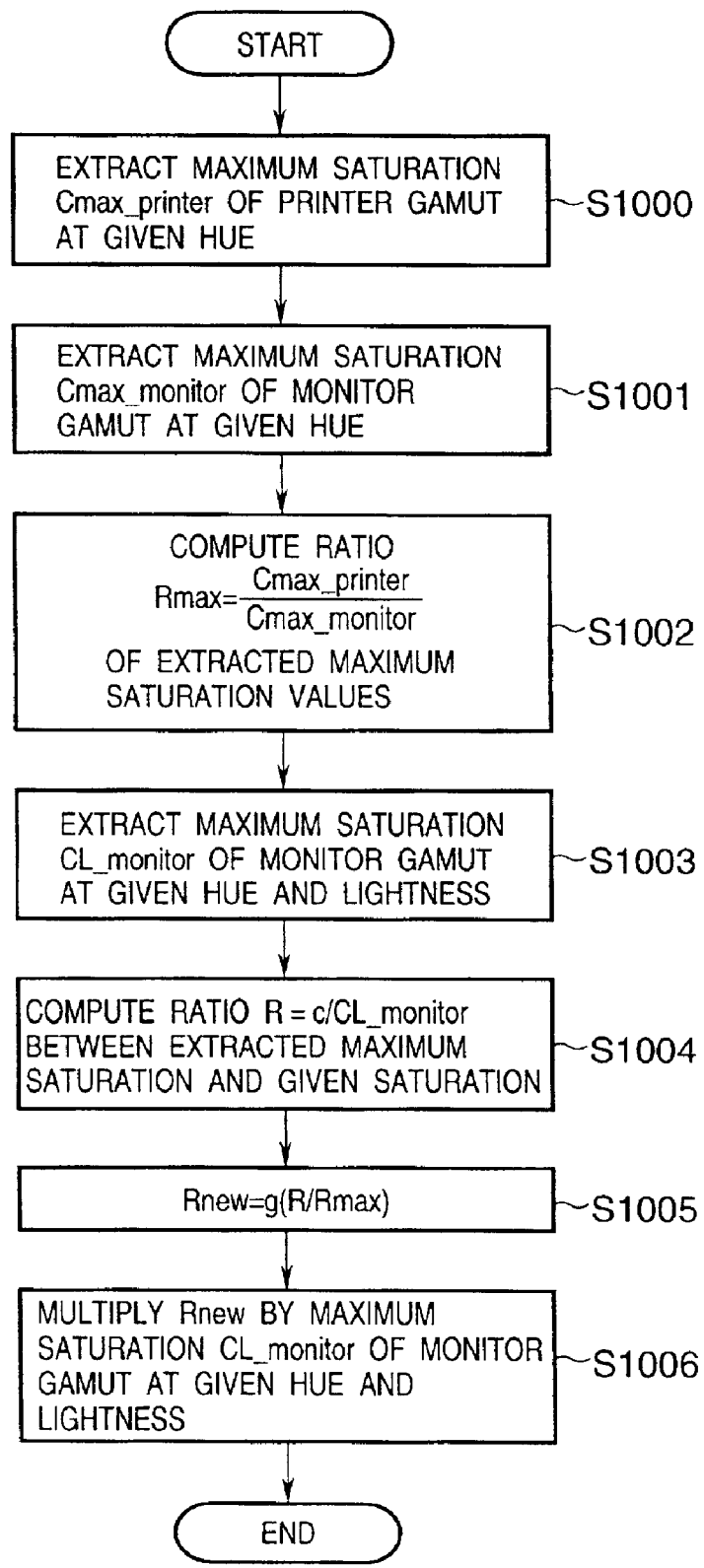
FIG. 13 is a flow chart showing the operation of a saturation computing section shown in FIG. 11.

The operation of the saturation computing section 123 with the above arrangement will be explained below with reference to the flow chart shown in FIG. 13.

In step S1000, maximum saturation Cmax_printer of a printer gamut at hue h is computed from hue h and printer gamut information input to the saturation compression unit 104. In step S1001, maximum saturation Cmax_monitor of a monitor gamut at hue h is computed from hue h and monitor gamut information input to the saturation compression unit 104. In step S1002, a ratio Rmax=Cmax_printer/Cmax_monitor of saturation Cmax_printer to saturation Cmax_monitor is computed.

In step S1003, maximum saturation CL_monitor of the monitor gamut at hue h and lightness L is computed from hue h, lightness L, and printer gamut information input to the saturation compression unit 104. In step S1004, a ratio R=c/CL_monitor of saturation c input to the saturation compression unit 104 to maximum saturation CL_monitor is computed.

In step S1005, a saturation ratio Rnew=g(R/Rmax) is computed using a function g(·) that defines the input/output relationship of the saturation ratios. In step S1006, the product of the saturation ratio Rnew and maximum saturation CL_monitor is output as the computation result of the saturation computing section 123. Note that the function g(·) that defines the input/output relationship of the saturation ratios is defined using a cubic function in the fifth embodiment, and is controlled as follows:

carrier of g(·) is [0, 1]
$g(0)=0$
$g(1)=Rmax$
$g'(0)=1$
$g'(Rmax)=\gamma$, $\gamma$: $\gamma>0$
$g'(x)\neq 0$, x: $0\leq x\leq 1$ Note that $\gamma$ is a value that controls the compression ratio of saturation compression near the maximum saturation at a given hue and lightness, and is automatically determined in units of combinations of hue and saturation values by the saturation computing section 123 on the basis of the relationship between Cmax_monitor and Cmax_printer under a limitation that it satisfies the aforementioned conditions. Upon automatically setting the $\gamma$ parameter, $\gamma$ assumes a smaller value as Cmax_monitor/Cmax_printer becomes larger. That is, the compression ratio increases.

Note that the function g(·) that defines the input/output relationship is implemented using a cubic function, but it may be implemented using a piecewise function like in the second embodiment within the scope of the invention.

According to the fifth embodiment, color outside the printer gamut can be linearly compressed, and that inside the printer gamut can be nonlinearly compressed while increasing the compression ratio for a high-saturation region. That is, since the gamut boundary of the monitor undergoes linear saturation compression, tone reproduction in the high-saturation region can be improved. Hence, reproducibility can be improved in, e.g., a vivid color gradation pattern prevalently used in DTP or the like, and since middle and low saturation regions to which the human eye is sensitive can be reproduced with high precision, a photo image and the like can be satisfactorily reproduced.

According to the fifth embodiment, saturation at the outermost portion of the monitor gamut is linearly compressed, and that inside the monitor gamut undergoes nonlinear compression while setting higher compression ratio for a region with higher saturation. Hence, since tone reproduction in the high-saturation region at the gamut boundary of the monitor can be improved, reproducibility can be improved in, e.g., a vivid color gradation pattern prevalently used in DTP or the like. On the other hand, since middle and low saturation regions to which the human eye is sensitive can be reproduced with high precision, a photo image and the like can be satisfactorily reproduced.

Furthermore, according to the fifth embodiment, since saturation at the outermost portion of the monitor gamut is linearly compressed, an arrangement for mapping correction can be easily constructed when mapping correction of the color gamut is made after color signal mapping like in the ninth embodiment to be described later.

Sixth Embodiment

A signal processing apparatus according to the sixth embodiment of the present invention will be described below. Note that the same reference numerals in the sixth embodiment denote the same parts as those in the first embodiment, and a detailed description thereof will be omitted.

Figure 14:
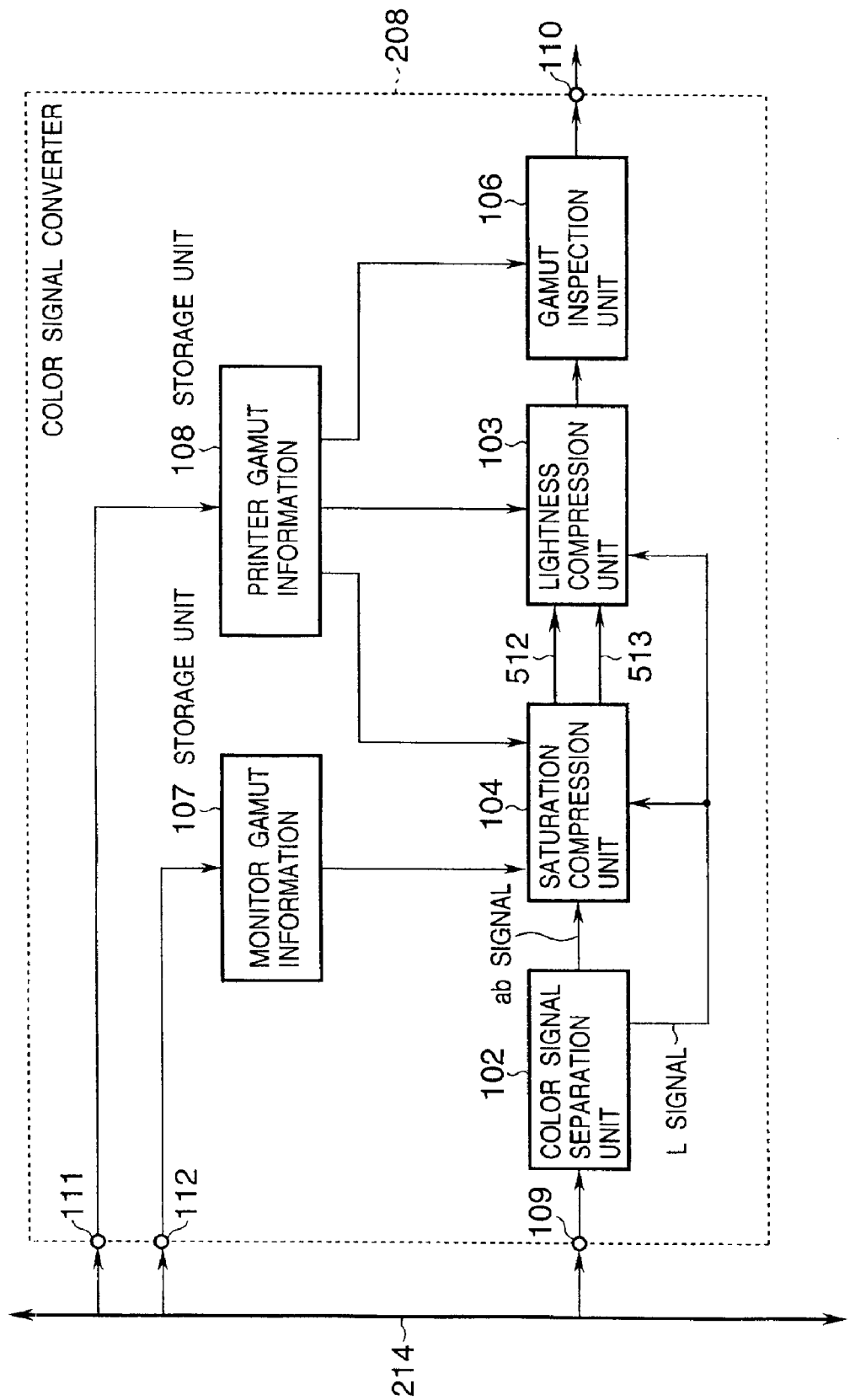
FIG. 14 is a block diagram showing the arrangement of a color signal converter according to the sixth embodiment.

FIG. 14 is a block diagram showing the arrangement of the color signal converter 208 according to the sixth embodiment.

The color signal converter 208 for converting an Lab signal in a monitor gamut into that in a printer gamut receives an Lab signal of image data held in the main memory 202, i.e., a color signal in the monitor gamut as a conversion source, via the terminal 109. An output image to the printer, i.e., a color signal in the desired printer gamut, is output from the terminal 110.

The converter 208 receives printer gamut information from the terminal 111, and monitor gamut information from the terminal 112. The monitor gamut information is stored in the storage unit 107, and the printer gamut information is stored in the storage unit 108.

The color signal separation unit 102 separates an input Lab signal into lightness and chromaticity components, and outputs an L signal as the lightness component to the lightness compression unit 103 and saturation compression unit 104, and an ab signal as chromaticity components to the saturation compression unit 104.

The saturation compression unit 104 compresses saturation in accordance with the input/output relationship determined based on saturation range information extracted from the monitor gamut information and printer gamut information, and a predetermined compression relationship, and outputs an ab signal 513 as a compression result to the color lightness compression unit 103. Also, the saturation compression unit 104 obtains lightness information required for lightness compression from the monitor gamut information, and executes an information process. The unit 104 outputs the extracted saturation range information and monitor lightness information to the lightness compression unit 103 as a signal 512.

The lightness compression unit 104 compresses lightness of the L signal in accordance with the input/output relationship, which is determined based on the monitor lightness information that has undergone the information process in the saturation compression unit 104 and the extracted saturation range information, and a predetermined compression relationship, mixes an L signal as its compression result and the ab signal 513 input from the saturation compression unit 104, and outputs the mixed signal as an Lab signal to the gamut inspection unit 106.

Saturation Compression Unit

Figure 15:
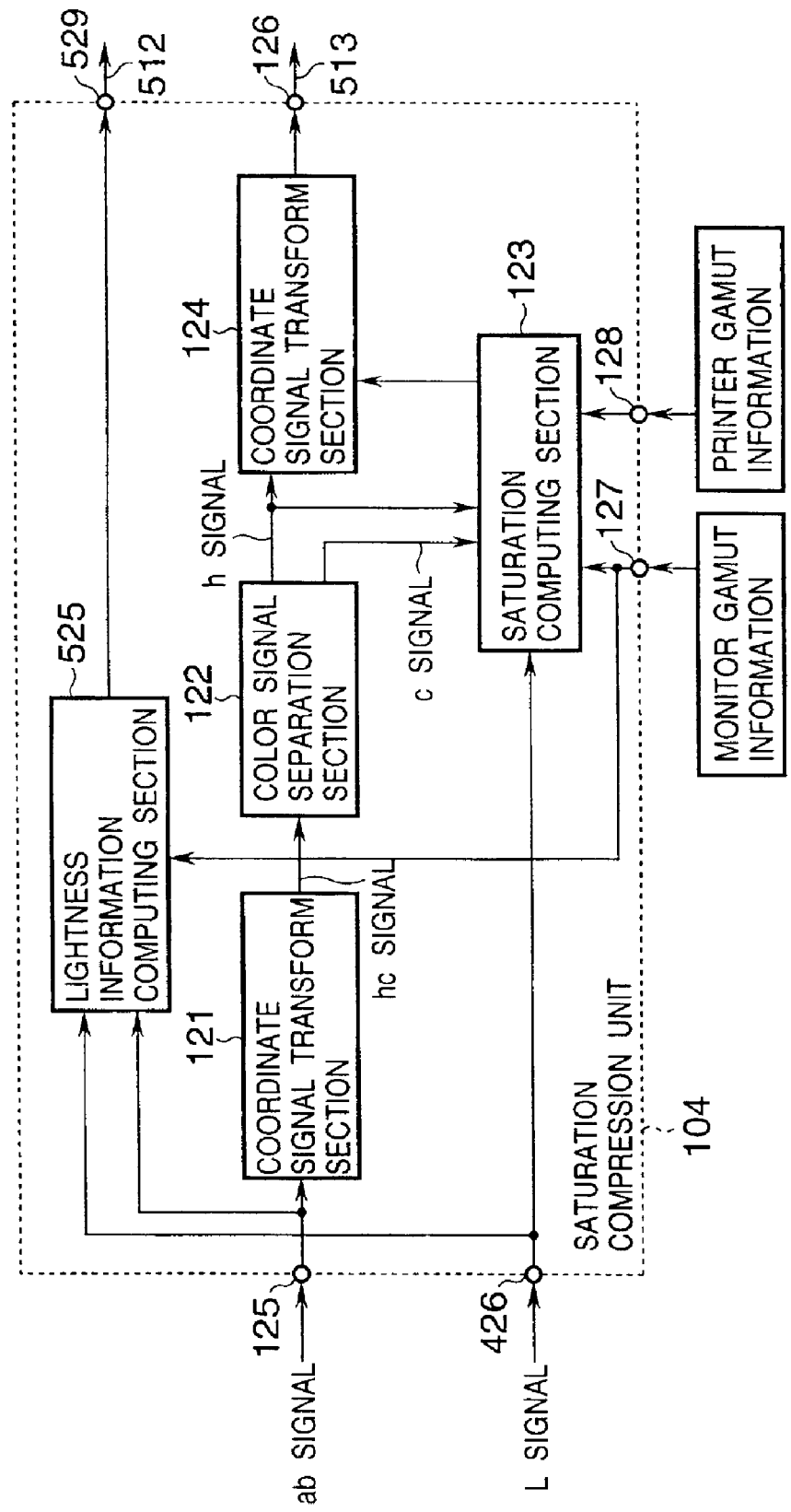
FIG. 15 is a block diagram showing the arrangement of a saturation compression unit shown in FIG. 14.

FIG. 15 is a block diagram showing the arrangement of the saturation compression unit 104 of the sixth embodiment. Unlike the saturation compression unit 104 shown in FIG. 12, the saturation compression unit 104 of this embodiment comprises a lightness information computing section 525. The section 525 computes maximum and minimum lightness values of the monitor gamut at chromaticity ab from the L signal, ab signal, and monitor gamut information input to the saturation compression unit 104, and outputs them as the signal 512 from a terminal 529.

Lightness Compression Unit

The operation of the lightness compression unit 103 in the above arrangement will be explained below. The lightness compression unit 103 computes maximum lightness information Lmax_printer_ab and minimum lightness information Lmin_printer_ab of the printer gamut at chromaticity ab from the input ab signal and printer gamut information. Then, the unit 103 sets maximum lightness information and minimum lightness information input thereto as Lmax_monitor_ab and Lmin_monitor_ab, and computes parameters required for lightness compression computations from these four pieces of lightness information.

The lightness compression unit 103 computes a signal Lout using the computed parameters, and a function $f(\cdot)$ that defines the input/output relationship between an L signal Lin which is input to the lightness compression unit 103 and is to undergo lightness compression, and an L signal Lout to be output. Note that $f(\cdot)$ is defined using a piecewise function consisting of n−1 segments, and is controlled to satisfy the following conditions:

carrier of $f(\cdot)$ is [Lmin_monitor_ab, Lmax_monitor_ab]
In carrier, $f(\cdot)$ is continuous at all points
f(Lmin_monitor_ab)=Lmin_printer_ab
f(Lmax_monitor_ab)=Lmax_printer_ab
f'(Lmin_monitor_ab)=α, α: 0≦α
f'(Lmax_monitor_ab)=β, β: 0≦β
f(mi)=ni, i: 0≦i≦n−2, mi: Lmin_monitor_ab<mi<Lmax_monitor_ab, ni: Lmin_printer_ab<ni<Lmax_printer_ab
f'(x)≠0, x: Lmin_monitor_ab<x<Lmax_monitor_ab Note that n is the number of knots of the piecewise function.

In the sixth embodiment, $f(\cdot)$ is implemented as a C2-continuous spline function of third order, which is defined by five segments. Note that the number n of knots, the value mi at each knot, and compression ratios α and β at the end point of the carrier are automatically computed from four pieces of lightness information, i.e., Lmin_monitor_ab, Lmax_monitor_ab, Lmin_printer_ab, and Lmax_printer_ab. An automatic parameter setting algorithm sets parameters which possibly yield f(x)=x within the range that preserves grayscale information and satisfies the above conditions. An outline of the automatic setting algorithm for α and β is as follows.

As for α, if Lmin_monitor_ab≦Lmin_printer_ab, as the difference between Lmin_monitor_ab and Lmin_printer_ab becomes larger, α decreases under the constraint condition 0≦α≦1. That is, the compression ratio near the darkest point becomes higher.

On the other hand, if Lmin_monitor_ab>Lmin_printer_ab, as the difference between Lmin_monitor_ab and Lmin_printer_ab becomes larger, α increases under the constraint condition α>1. That is, the expansion ratio near the darkest point becomes higher.

Likewise, as for β, if Lmin_monitor_ab≧Lmin_printer_ab, as the difference between Lmin_monitor_ab and Lmin_printer_ab becomes larger, β decreases under the constraint condition 0≦β≦1. That is, the compression ratio near the brightest point becomes higher.

On the other hand, if Lmin_monitor_ab<Lmin_printer_ab, as the difference between Lmin_monitor_ab and Lmin_printer_ab becomes larger, β increases under the constraint condition β>1. That is, the expansion ratio near the brightest point becomes higher.

Seventh Embodiment

A signal processing apparatus according to the seventh embodiment of the present invention will be described below. Note that the same reference numerals in the seventh embodiment denote the same parts as those in the first, third, and fourth embodiments, and a detailed description thereof will be omitted.

Figure 16:
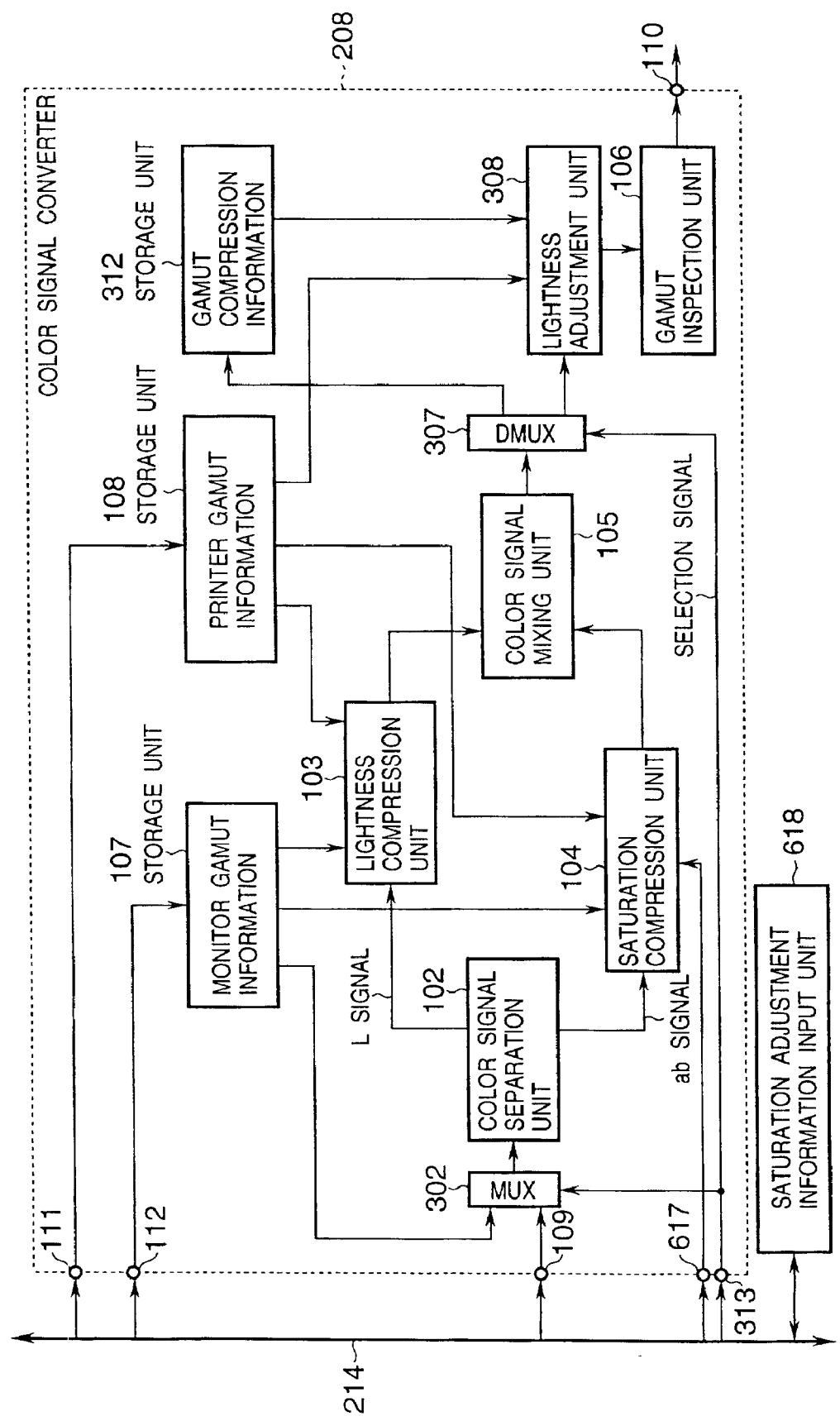
FIG. 16 is a block diagram showing the arrangement of a color signal converter according to the seventh embodiment.

In the seventh embodiment, the arrangement of the saturation compression unit 104 in the fourth embodiment is modified. FIG. 16 is a block diagram showing the arrangement of the color signal converter 208 of the seventh embodiment.

A saturation adjustment information input unit 618 is used by the user to input saturation adjustment information, and is constructed by, e.g., a control panel formed as a user interface image on the color monitor 207 by the CPU 201, keyboard 211 and/or mouse 212, and the like. Saturation adjustment information input by giving input and output values at respective knots is converted into a given data structure by the CPU 201, and is temporarily held in the main memory 202. The saturation adjustment information is then input to the saturation compression unit 104 in the color signal converter 208 via a terminal 617. Note that input of the saturation adjustment information is not mandatory.

Upon receiving a command for outputting an image held in the main memory 202 to the color printer 209, the CPU 201 checks the storage contents of the main memory 202 to determine the presence/absence of input of the saturation adjustment information, and sends the presence/absence information to the color signal converter 208. When the saturation adjustment information is input, the CPU 201 sends the saturation adjustment information held in the main memory 202 to the color signal converter 208 via the PCI bus 214 and terminal 617.

The saturation compression unit 104 compresses saturation in accordance with the input/output relationship determined based on saturation range information extracted from the monitor gamut information and printer gamut information, and a predetermined compression relationship, and outputs an ab signal as its compression result to the color signal mixing unit 105.

Note that the saturation adjustment information input unit 618 in the above arrangement is implemented when the individual blocks in the arrangement shown in FIG. 2 operate in the predetermined order, as described above.

Saturation Compression Unit

Figure 17:
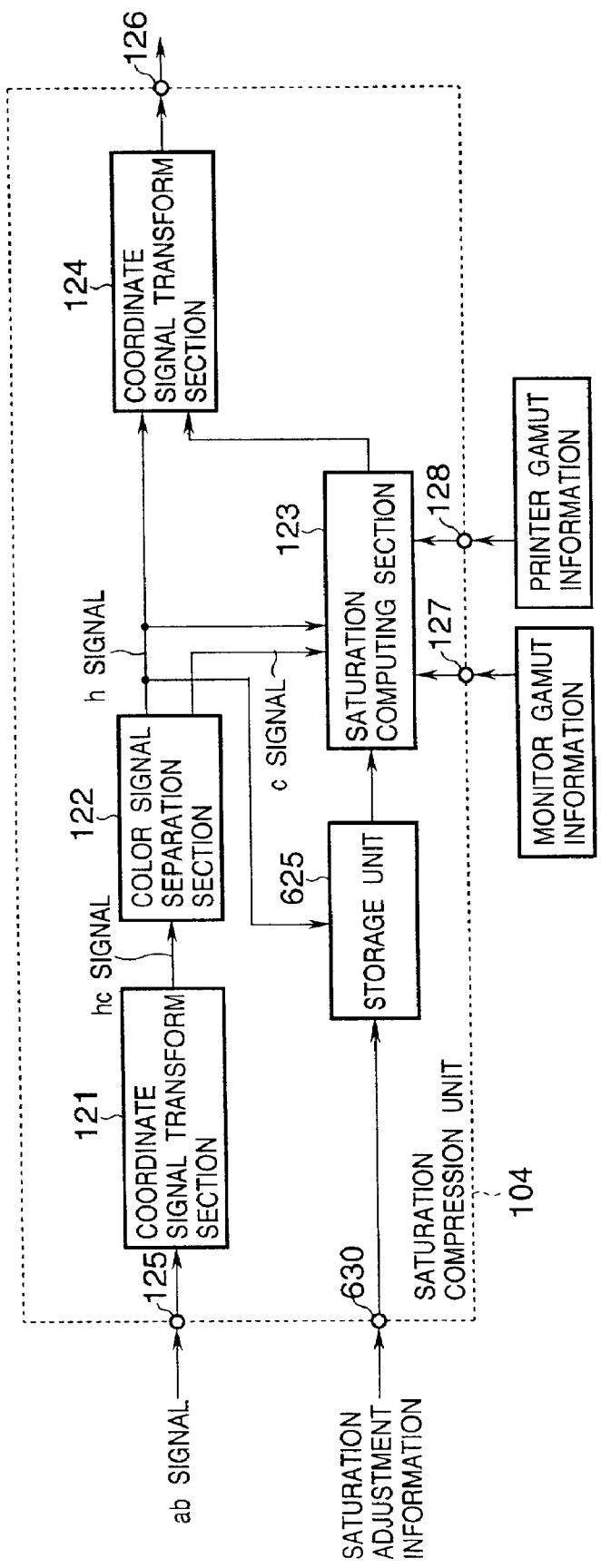
FIG. 17 is a block diagram showing the arrangement of a saturation compression unit shown in FIG. 16.

FIG. 17 is a block diagram showing the arrangement of the saturation compression unit 104.

Referring to FIG. 17, a storage unit 625 stores saturation adjustment information input via a terminal 630, and outputs a saturation adjustment value corresponding to an h signal as hue information input from the color signal separation section 122 to the saturation computing section 123. The saturation computing section 123 computes saturation to be output based on the input c signal in accordance with the input/output relationship, which is determined based on saturation range information at a hue defined by the h signal, which is extracted from monitor gamut information and printer gamut information, and a compression relationship controlled by the saturation adjustment information, and outputs a c signal as its computation result to the coordinate signal transform section 124.

The operation of the saturation computing section 123 in the above arrangement will be explained below. The saturation computing section 123 is controlled by a function $g(\cdot)$ that defines the input/output relationship, and cout=g(cin) holds between an input c signal cin and a c signal cout to be output. $g(\cdot)$ is defined using a cubic function, and is controlled to satisfy the following conditions:

carrier of $g(\cdot)$ is [0, Cmax_monitor]

$g(0)=0$ $g(Cmax\_monitor)=Cmax\_printer$ $g'(0)=\alpha$ $g'(Cmax\_monitor)=\gamma$, $\gamma: \gamma>0$ $g'(x)\neq 0$, x: $0 \leq x \leq Cmax\_monitor$ Note that $\alpha$ is defined by the output value of the storage unit 625, i.e., is the saturation adjustment value at the hue defined by the h signal. Cmax_monitor is computed from the h signal as a hue component and monitor gamut information, and is defined as a maximum saturation value of the monitor gamut at the hue defined by the h signal. On the other hand, Cmax_printer is computed from the h signal as hue information and printer gamut information, and is defined as a maximum saturation value of the printer gamut at the hue defined by the h signal.

$\gamma$ is a value for controlling the compression ratio of saturation compression near the maximum saturation, and is automatically set by the saturation computing section 123 on the basis of the relationship between Cmax_monitor and Cmax_printer under a limitation that it satisfies the aforementioned conditions. Upon automatically setting the $\gamma$ parameter, as Cmax_monitor/Cmax_printer as the ratio between Cmax_monitor and Cmax_printer becomes larger, the value $\gamma$ becomes smaller. That is, the compression ratio increases.

Saturation Adjustment Information

The user inputs as saturation adjustment information slope y at x=0 of a saturation control function at one or a plurality of arbitrary hues. The storage unit 625 linearly interpolates saturation as a function of hue angle, and generates saturation adjustment information at all hues. This information is formed as a set of hues and saturation adjustment values $\alpha$ at the respective hues. The set information is held as saturation adjustment information in the storage unit 625.

Inputting slope y at x=0 of the saturation control function at an arbitrary hue by the user as saturation adjustment information amounts to computing ideal saturation after gamut mapping at designated saturation by multiplying original saturation by y, and intuitive saturation adjustment is facilitated very much.

Eighth Embodiment

A signal processing apparatus according to the eighth embodiment of the present invention will be described below. Note that the same reference numerals in the eighth embodiment denote the same parts as those in the first, third, and fourth embodiments, and a detailed description thereof will be omitted.

Figure 18:
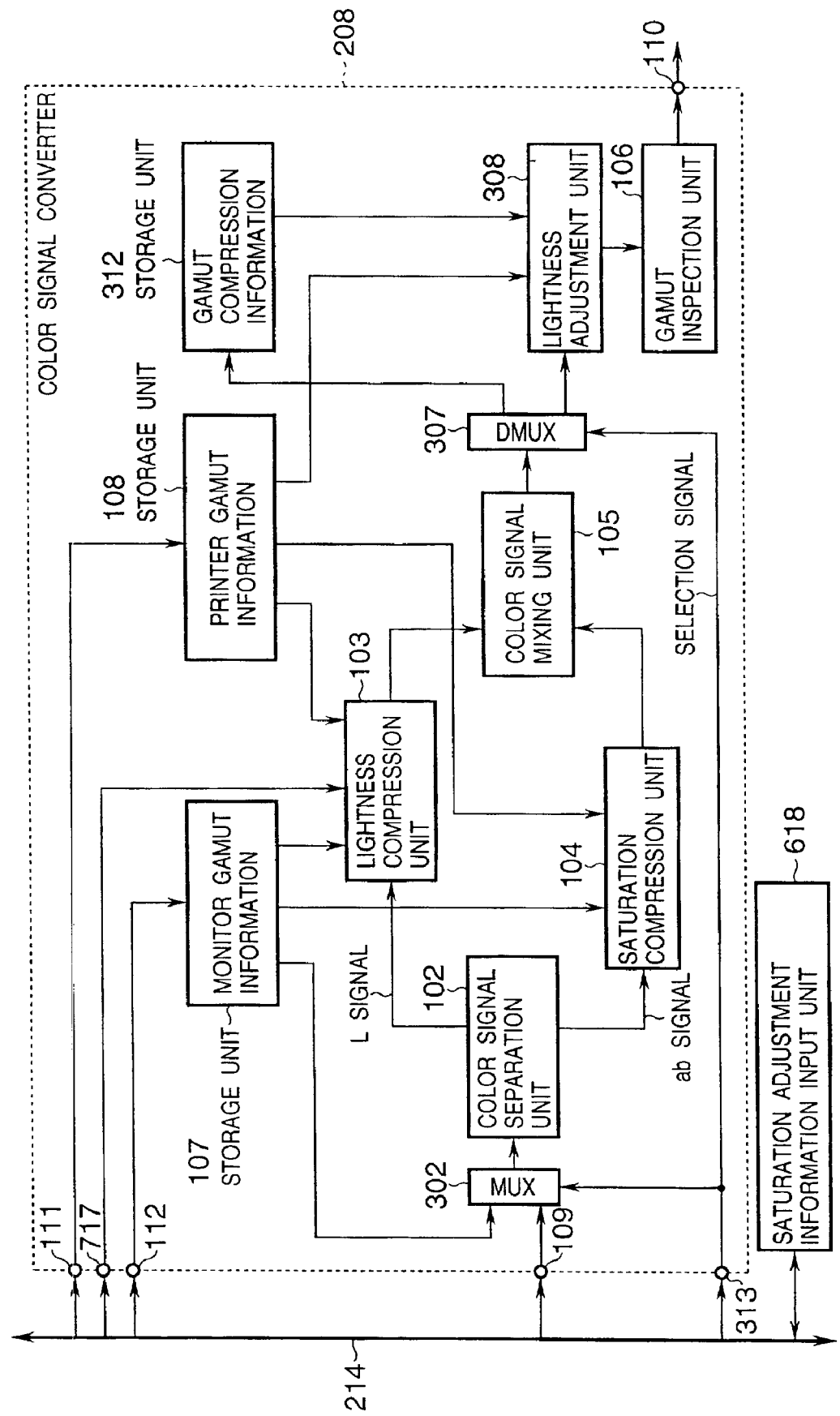
FIG. 18 is a block diagram showing the arrangement of a color signal converter according to the eighth embodiment.

In the eighth embodiment, the arrangement of the saturation compression unit 104 in the fourth embodiment is modified. FIG. 18 is a block diagram showing the arrangement of the color signal converter 208 of the eighth embodiment.

A lightness adjustment information input unit 718 is used by the user to input lightness adjustment information, and is constructed by, e.g., a control panel formed as a user interface image on the color monitor 207 by the CPU 201, keyboard 211 and/or mouse 212, and the like. Saturation adjustment information input by giving input and output values at respective knots is converted into a given data structure by the CPU 201, and is temporarily held in the main memory 202. The lightness adjustment information is then input to the lightness compression unit 103 in the color signal converter 208 via a terminal 717. Note that input of the lightness adjustment information is not mandatory.

Upon receiving a command for outputting an image held in the main memory 202 to the color printer 209, the CPU 201 checks the storage contents of the main memory 202 to determine the presence/absence of input of the lightness adjustment information, and sends the presence/absence information to the color signal converter 208. When the lightness adjustment information is input, the CPU 201 sends the lightness adjustment information held in the main memory 202 to the color signal converter 208 via the PCI bus 214 and terminal 717.

The lightness compression unit 103 compresses lightness of the input L signal in accordance with the input/output relationship determined based on lightness range information extracted from the monitor gamut information and printer gamut information, a predetermined compression relationship, and the input lightness adjustment information, and outputs an L signal as its compression result to the color signal mixing unit 105.

Lightness Compression Unit

The lightness compression unit 103 is controlled by a function $f(\cdot)$ that defines the input/output relationship, and Lout=f(Lin) holds between an input L signal Lin and an L signal Lout to be output. $f(\cdot)$ is defined using a piecewise function consisting of n−1 segments, and is controlled to satisfy the following conditions:

carrier of $f(\cdot)$ is [Lmin_monitor, Lmax_monitor]

in carrier, $f(\cdot)$ is continuous at all points f(Lmin_monitor)=Lmin_printer f(Lmax_monitor)=Lmax_printer f'(Lmin_monitor)=α, α: 0≦α f'(Lmax_monitor)=β, β: 0≦β f(mi)=ni, i: 0≦i≦n−2, mi: Lmin_printer<mi<Lmax_printer, ni: Lmin_printer<ni<Lmax_printer f'(mi)=γi, i: 0≦i≦n−2, mi: Lmin_monitor<mi<Lmax_monitor f'(x)≠0, x: Lmin_monitor<x<Lmax_monitor Note that n is the number of knots of the piecewise function, and is controlled by the input from the lightness adjustment information input unit 718 in the eighth embodiment.

Lmin_monitor is an L value held by black of the monitor, Lmax_monitor is an L value held by white of the monitor, Lmin_printer is an L value held by black of the printer, and Lmax_printer is an L value held by white of the printer. In this embodiment, $f(\cdot)$ is implemented by a spline function of third order, which is at least C1-continuous at each knot. Note that α, β, the number n of knots, mi, ni, and yi are set by the input upon inputting the lightness adjustment information. If at least one of α and P is not input, the algorithm automatically sets one or both of α and β. If no γi is input, γi is automatically computed by the algorithm based on C2 continuity at knot i.

When the user does not input any lightness adjustment data, n=5, mi=ni, and γi=1 are set, α and β are automatically set under the above conditions, and these parameters are set in the function $f(\cdot)$.

In the automatic computation algorithm of α and β, as the difference between Lmin_monitor and Lmin_printer becomes larger, the value a becomes smaller. That is, the compression ratio near the darkest point becomes higher. On the other hand, as the difference between Lmax_monitor and Lmax_printer becomes larger, the value β becomes smaller. That is, the compression ratio near the brightest point becomes higher.

According to the aforementioned embodiments, in gamut mapping, middle lightness is preserved, and color with very high or low lightness is compressed at a higher ratio. On the other hand, in gamut mapping, the saturation of color with lower saturation is preserved, and color with higher saturation is compressed at a higher ratio. With such nonlinear mapping, output images having very similar perceptual colors can be obtained independently of different color reproducibilities due to different models of monitors and printers, or different color reproducibilities due to different color reproduction characteristics of recording media.

The above embodiments have been explained in reference to the typical Lab color space. However, these embodiments are not limited to such specific color space, but may be applied to any other color spaces having lightness and chromaticity such as an Luv color space, Munsell color space, and the like.

Furthermore, according to each of the above embodiments, lightness and chromaticity signals are separated and mapped, and mapping characteristics are determined based on the maximum and minimum lightness values and maximum saturation value upon mapping, i.e., the arrangement is simple. Therefore, when mapping correction of a color reproduction region is made after color signal mapping like in the ninth embodiment to be described later, an arrangement for implementing that mapping correction can be easily constructed.

Moreover, according to each of the above embodiments, since means for controlling each knot is provided as adjustment means used when the input/output characteristics of lightness mapping are implemented by a piecewise function, it is easy for the user to control mapping.

In addition, according to each of the above embodiments, since means for controlling the slope of the input/output characteristic curve when saturation is zero is provided as adjustment means used when the input/output characteristics of lightness mapping are implemented by a piecewise function, it is easy for the user to control mapping.

Ninth Embodiment

The ninth and tenth embodiments according to the present invention will be described below. These embodiment will exemplify conversion of a color signal in an Lab color space as a second color space into that in an RGB color space as a first color space, and conversion of a color signal in an Lab color space as a first color space into that in a CMY color space as a second color space. However, the present invention is not limited to such specific types of color spaces, and color signals can be converted in two ways among arbitrary color spaces such as XYZ, Luv, YIQ, HSB, HSL, CMY, CMYK, sRGB, and the like.

An image processing apparatus according to the ninth embodiment of the present invention will be described below. Note that the same reference numerals in the ninth embodiment denote the same parts as those in the first embodiment, and a detailed description thereof will be omitted.

[Color Signal Converter]

Figure 20:
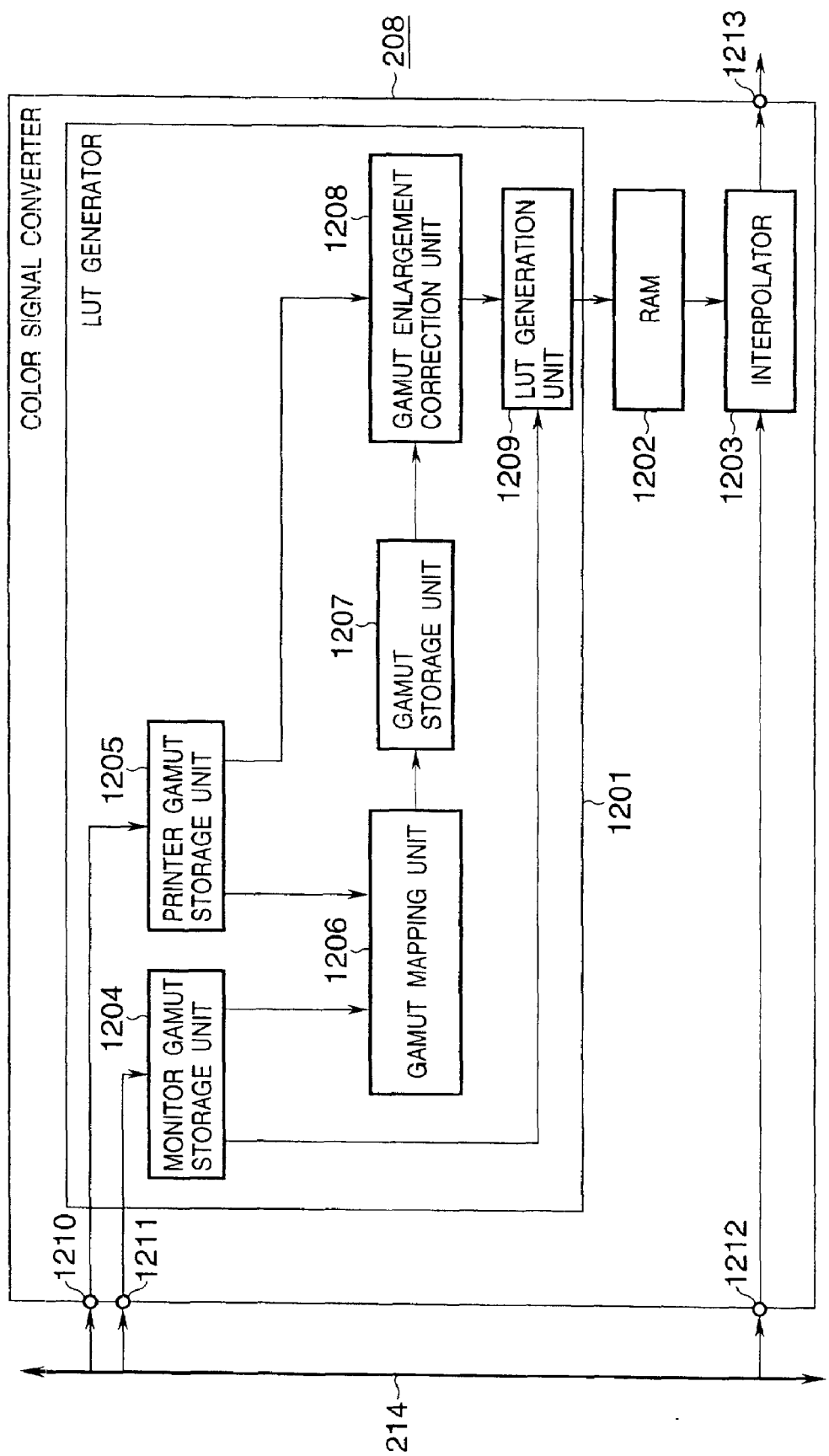
FIG. 20 is a block diagram showing the arrangement of a color signal converter according to the ninth embodiment.

FIG. 20 is a block diagram showing the arrangement of the color signal converter 208.

Referring to FIG. 20, an LUT generator 1201 generates a look-up table (LUT) for converting image data RGB into CMYK when its units operate in the designated procedure. An LUT generated by the LUT generator 1201 is stored in a RAM 1202. An interpolator 1203 computes CMYK data to be output based on RGB data input from a terminal 1212 by interpolation using the LUT stored in the RAM 1202, and outputs the CMYK data to a terminal 1213. Note that RGB image data held in the main memory 202 is input from the terminal 1212 in a raster scan order. The CMYK data output from the terminal 1213 is sent to the color printer 209.

Arrangement of LUT Generator

The arrangement of the LUT generator 1201 will be described in detail below.

A printer gamut storage unit 1205 stores printer gamut information input from a terminal 1210, and a monitor gamut storage unit 1204 stores monitor gamut information input from a terminal 1211. A gamut mapping unit 1206 compresses and maps the monitor gamut with reference to the printer gamut information and monitor gamut information. A compression & mapping result of the monitor gamut that is processed by the gamut mapping unit 1206 will be referred to as an "intermediate mapped gamut" hereinafter. A gamut storage unit 1207 stores intermediate mapped gamut information. A gamut enlargement correction unit 1208 maps the intermediate mapped gamut in a printer gamut with reference to the intermediate mapped gamut information and printer gamut information. A mapping result of the gamut enlargement correction unit 1208 will be referred to as a "mapped gamut" hereinafter. An LUT generation unit 1209 generates an LUT used to convert RGB data into CMYK data with reference to the correspondence between the monitor and mapped gamuts, RGB data that can produce a predetermined color on the monitor, and CMYK data that can produce the predetermined color on the printer.

Generation of LUT

Generation of an LUT will be explained below. A case will be exemplified below wherein an L*a*b* color space is used as a uniform colorimetric system.

The color signal converter 208 receives color gamut information corresponding to the color monitor 207 and that corresponding to the color printer 209 in accordance with a command from the CPU 201. When the two pieces of color gamut information are respectively stored in the monitor and printer gamut storage units 1204 and 1205, and transmission of the two pieces of color gamut information is complete, the CPU 201 commands to start initialization for color signal conversion. Upon receiving this command, in the color signal converter 208, the gamut mapping unit 1206 is launched to compress and map the monitor gamut in an intermediate mapped gamut in the uniform calorimetric system. In this operation, the aforementioned scheme for nonlinearly compressing lightness and saturation, or the like is used.

Figure 21:
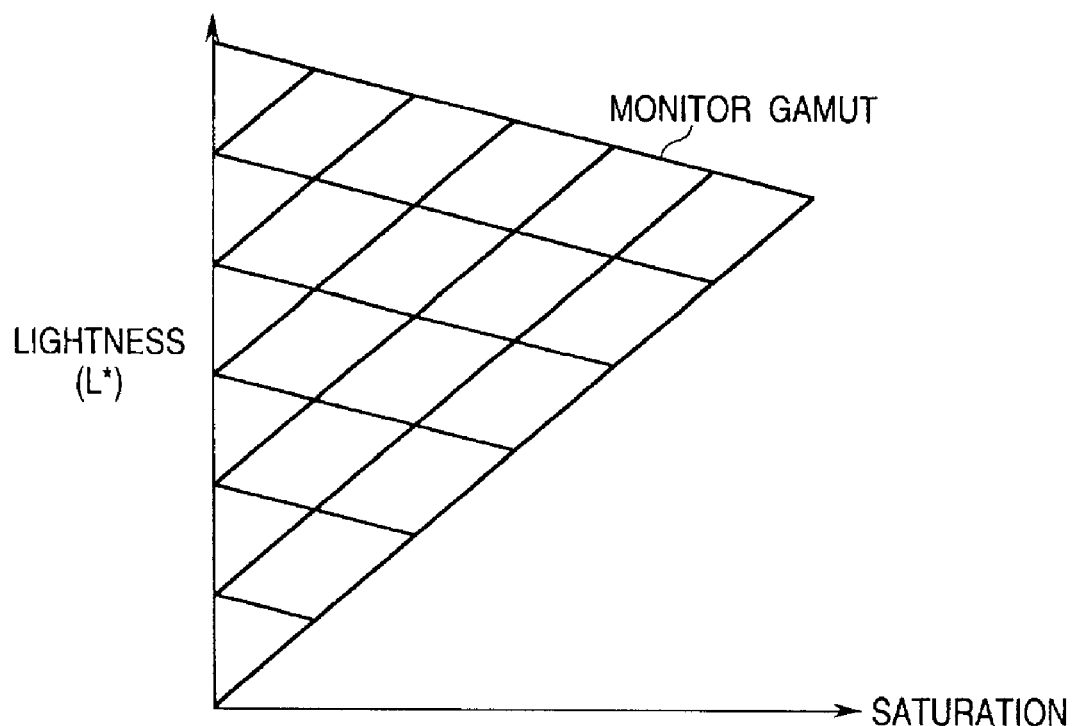
FIGS. 21 to 23 are graphs for explaining gamut mapping in the ninth embodiment.
Figure 22:
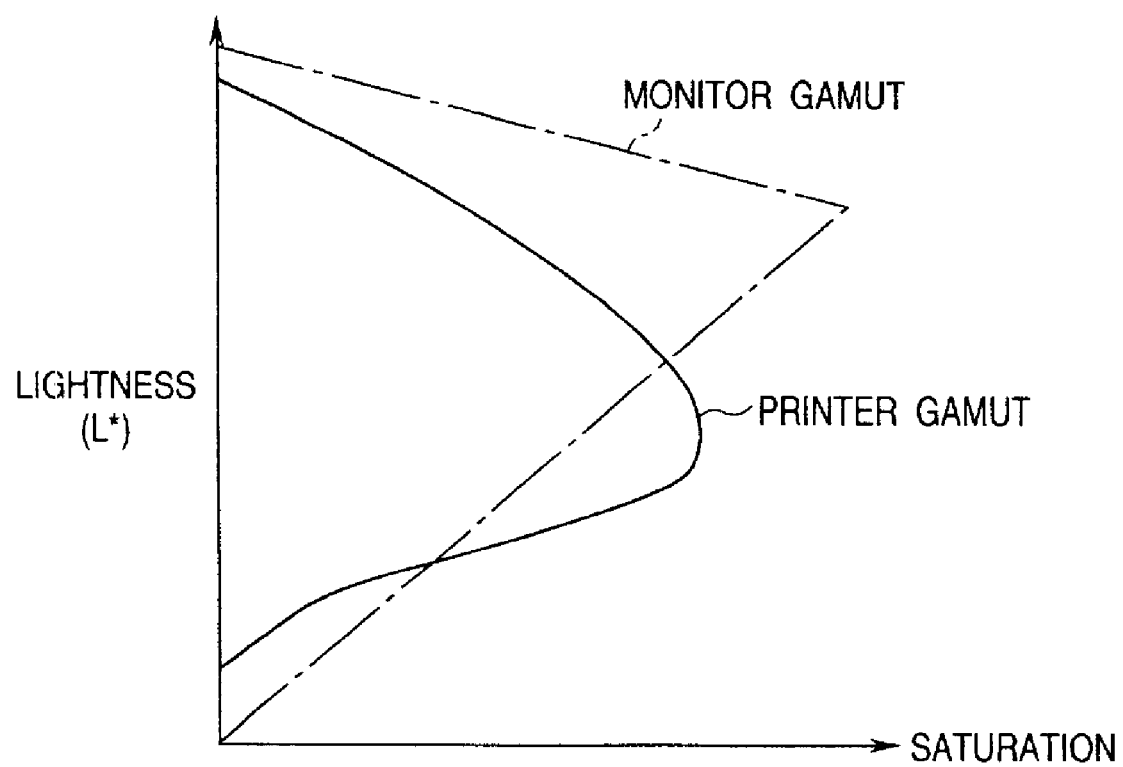
Figure 23:
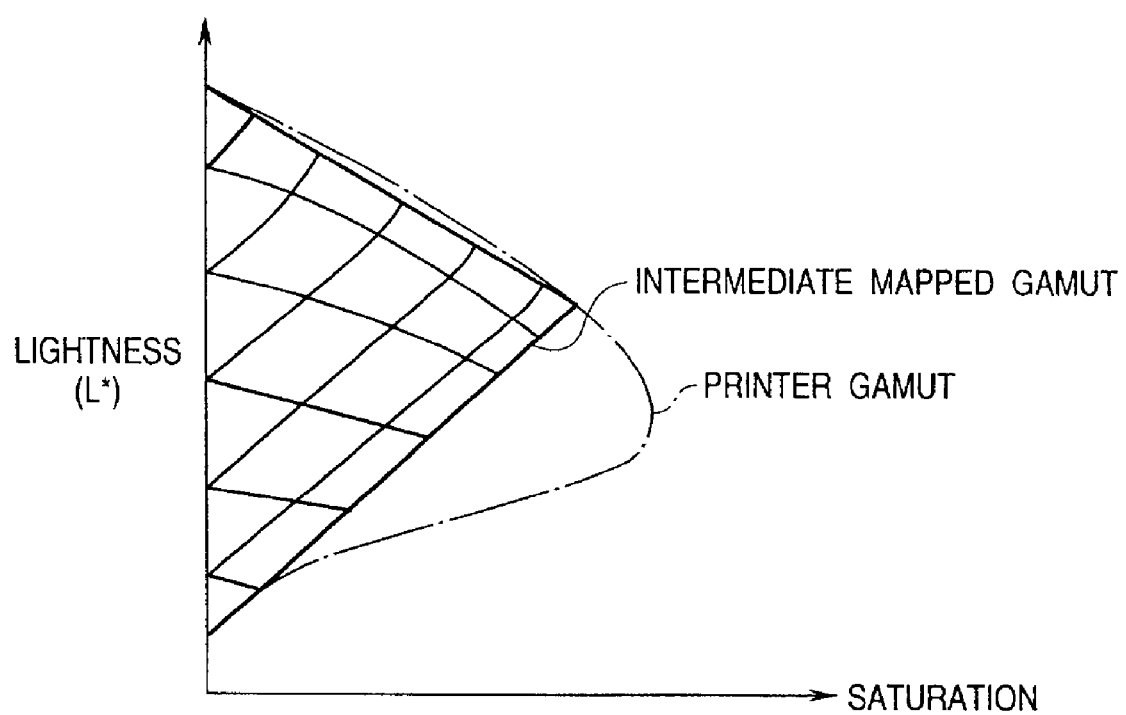

FIGS. 21 to 23 are graphs for explaining gamut mapping in the ninth embodiment. FIG. 21 is a graph showing a monitor gamut for green hues. FIG. 22 is a graph showing printer and monitor gamuts for green hues, in which a printer gamut is indicated by the solid curve, and a monitor gamut is indicated by the one-dashed chain curve. FIG. 23 is a graph showing an intermediate mapped gamut and printer gamut for green hues, in which an intermediate mapped is indicated by the solid curve, and a printer gamut is indicated by the one-dashed chain curve.

The gamut mapping unit 1206 nonlinearly compresses the lightness component of the monitor gamut, and nonlinearly compresses the saturation value of a chromaticity component at a predetermined hue. With this operation, the monitor gamut shown in FIG. 21 is mapped to the intermediate mapped gamut shown in FIG. 23. Upon completion of the process of the gamut mapping unit 1206, the intermediate mapped gamut information as the gamut mapping result is stored in the gamut storage unit 1207, and the gamut enlargement correction unit 1208 is then launched.

The gamut enlargement correction unit 1208 maps the intermediate mapped gamut in a printer gamut with reference to the intermediate gamut information and printer gamut information on the basis of an algorithm (to be described later). The LUT generation unit 1209 generates an LUT for converting RGB data into CMYK data with reference to the mapped gamut as the mapping result of the gamut enlargement correction unit 1208, and writes the LUT in the RAM 1202. Upon completion of a series of operations above, the color signal converter 208 informs the CPU 201 of the end of initialization.

Gamut Enlargement Correction Unit

Figure 24:
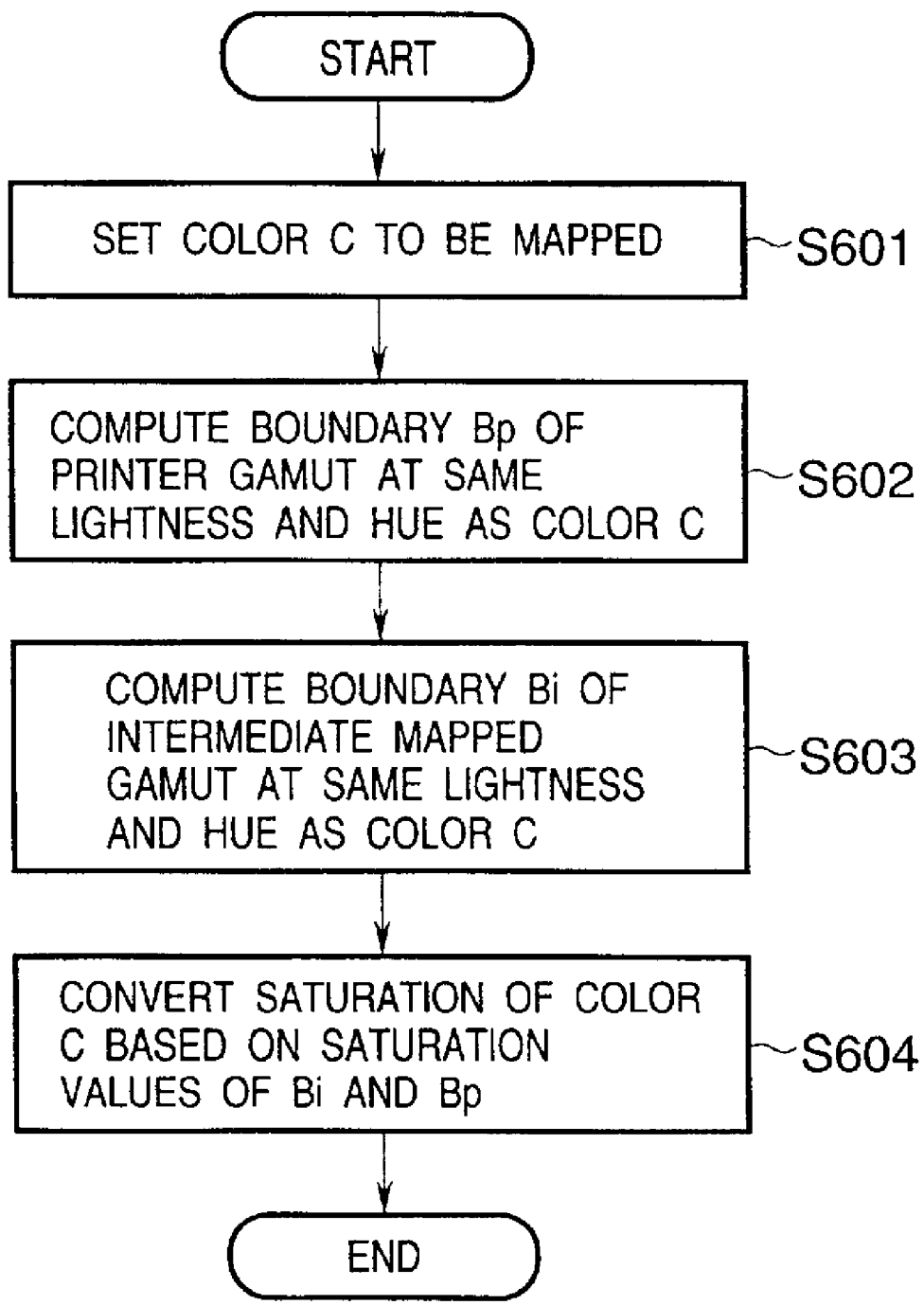
FIG. 24 is a flow chart showing mapping by a gamut enlargement correction unit shown in FIG. 20.
Figure 25:
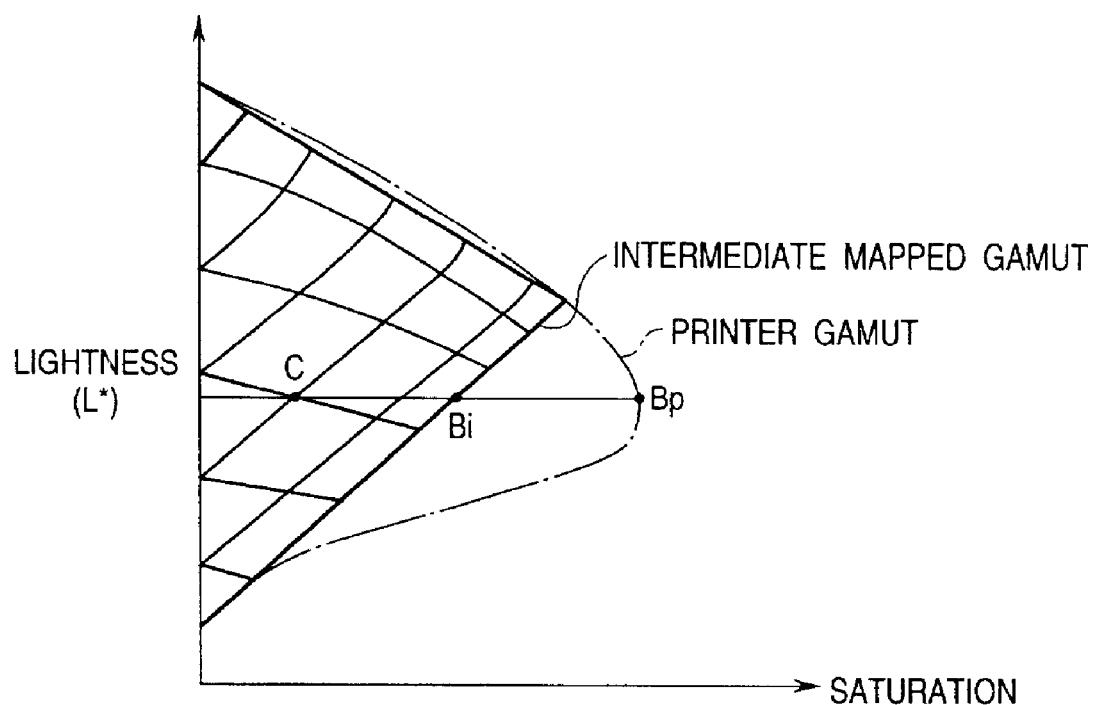
FIG. 25 is a graph for explaining mapping by the gamut enlargement correction unit.

Mapping in the gamut enlargement correction unit 1208 will be described below with reference to the flow chart in FIG. 24 and the graph in FIG. 25.

In step S601, color C to be mapped is set. In step S602, boundary color Bp of the printer gamut at the same lightness and hue as those of setting color C is computed. In step S603, boundary color Bi of the intermediate mapped gamut at the same lightness and hue as those of setting color C is computed. These colors C, Bp, and Bi have a relationship, as shown in the graph in FIG. 25. Subsequently, in step S604 saturation of color C is converted on the basis of the relationship among saturation values of colors Bp and Bi, and setting color C. If $c_{org}$ represents saturation of color C, $C_p$ that of color Bp, $c_i$ that of color Bi, and $c_{mod}$ converted saturation, this conversion is implemented by an input/output function $f(\cdot)$:

$$c_{mod} = f(c_{org}) \tag{1}$$

Note that the input/output function $f(\cdot)$ is defined using a C2-continuous spline function of third order, and the following conditions are satisfied:

carrier of $f(\cdot)$ is $[0, c_i]$
$f(0)=0$
$f(c_u)=c_p$
$f()=1$
$f(c_i)=\gamma, \gamma: \gamma>1$
$f(x) \neq 0, x: 0 \leq x \leq c_i$ $\gamma$ is a parameter that controls an enlargement factor of saturation correction near maximum saturation, and is automatically determined by the gamut enlargement correction unit 1208 based on the relationship between saturation $c_p$ of color Bp and saturation $c_i$ of color Bi. Upon automatically setting the $\gamma$ parameter, as the ratio $c_p/c_i$ of saturation $c_p$ to saturation ci increases, the value $\gamma$ increases. That is, the enlargement factor increases.

Figure 26:
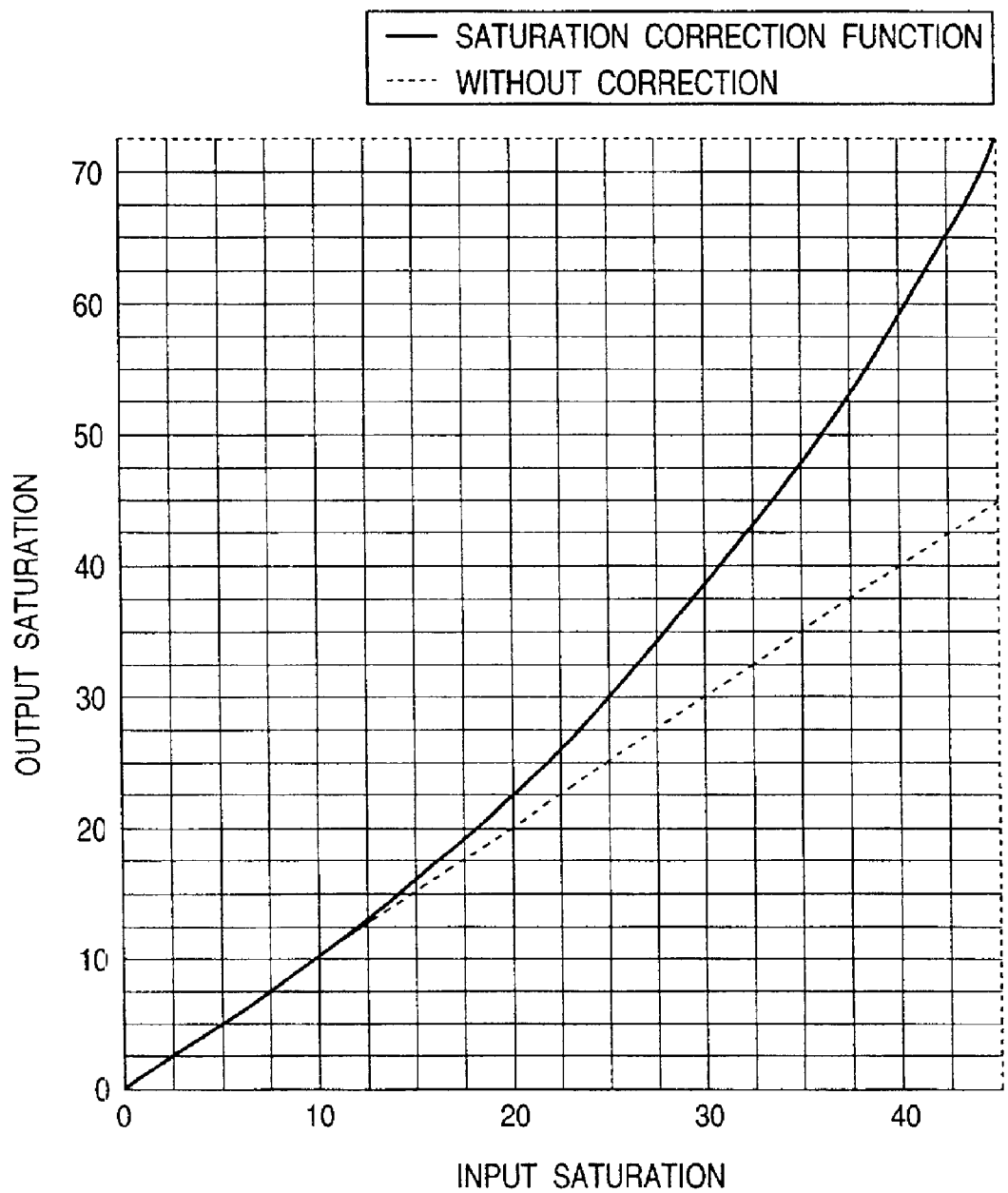
FIG. 26 is a graph showing an example of an input/output function f(·) used by the algorithm of the gamut enlargement correction unit.

FIG. 26 shows an example of the input/output function $f(\cdot)$ used by the algorithm of the gamut enlargement correction unit 1208 for color C. When saturation correction is implemented by a smooth input/output function shown in FIG. 26, grayscale information can be preserved, and generation of pseudo edges can be prevented.

The aforementioned mapping is done for all colors that require gamut mapping.

Figure 27:
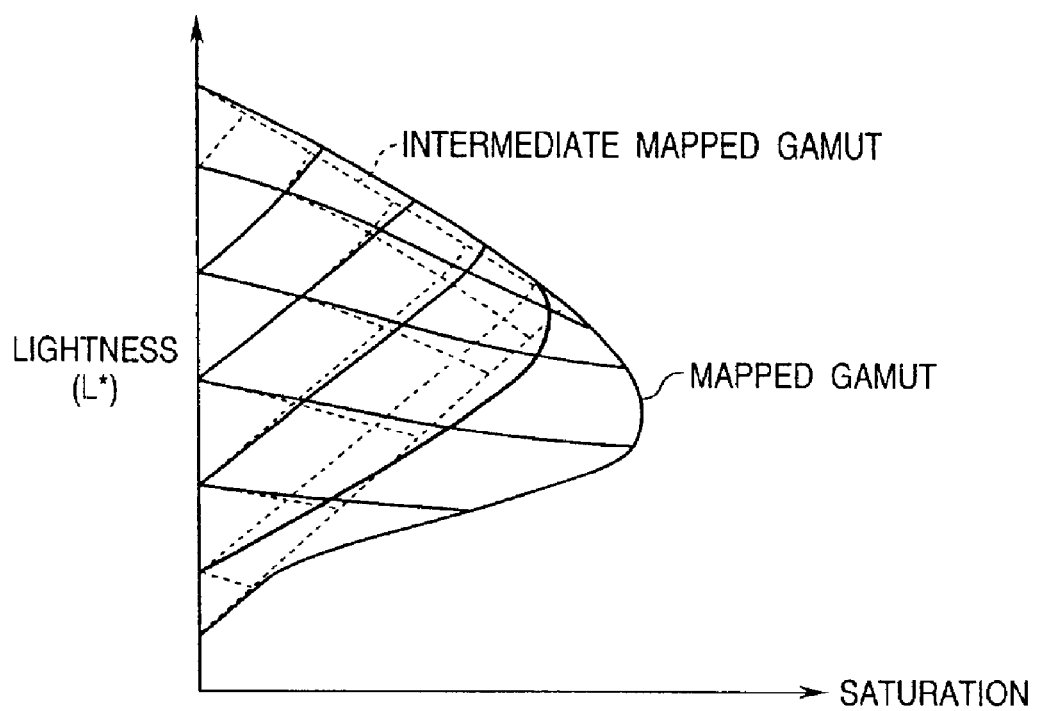
FIG. 27 is a graph showing the gamut mapping result by the gamut enlargement correction unit.

FIG. 27 is a graph showing the gamut mapping result by the gamut enlargement correction unit 1208. FIG. 27 shows the gamut mapping result for green hues, i.e., the way the monitor gamut shown in FIG. 21 is mapped.

As described above, according to the ninth embodiment, gamut mapping can be made while fully utilizing the color gamut of an output device. Hence, upon outputting an image whose color gamut has been converted by gamut mapping of the ninth embodiment, a vivid image with high contrast can be obtained while fully using color reproduction performance of the output device. Furthermore, upon mapping that enlarges the gamut obtained by gamut mapping of the ninth embodiment, since an abrupt variation of change rate upon changes in color is prevented in advance, grayscale information of an output image can be preserved, and pseudo edges can be prevented from being generated, thus reproducing a preferred image.

Tenth Embodiment

An image processing apparatus according to the tenth embodiment of the present invention will be described below. Note that the same reference numerals in the tenth embodiment denote the same parts as those in the first and ninth embodiments, and a detailed description thereof will be omitted.

In the tenth embodiment, the arrangement and operation of the color signal converter 208 in the ninth embodiment shown in FIG. 20 are modified. Only modified portions will be explained below.

When gamut mapping from a monitor gamut to a printer gamut uses the entire printer gamut, high contrast can be obtained, but monitor and print images may often appear largely differently due to the difference between their color gamuts. This problem poses a perceptual problem especially in image formation of a photo image and the like.

Figure 29:
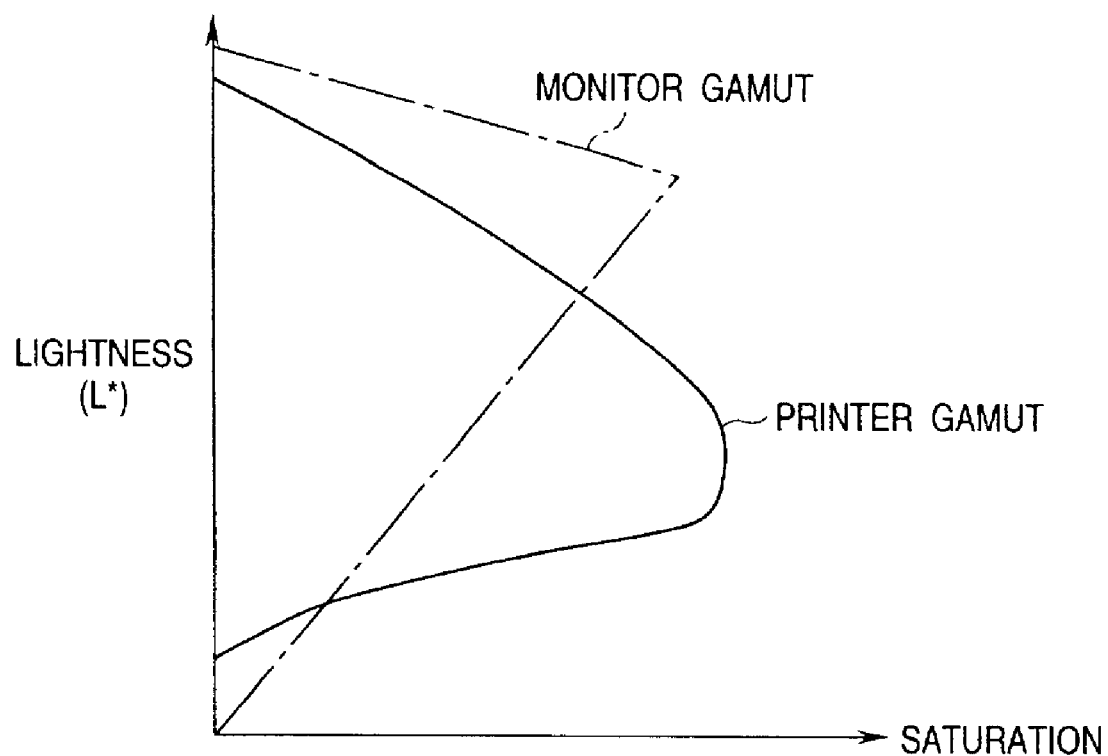
FIG. 29 is a graph comparing monitor and printer gamuts.

FIG. 29 is a graph that compares monitor and printer gamuts for cyan hues, in which a printer gamut is indicated by the solid curve, and a monitor gamut is indicated by the one-dashed chain curve. As can be seen from FIG. 29, the printer gamut in a low-lightness range is very broader than the monitor gamut. When the entire printer gamut is used without considering such color gamut difference, the aforementioned problem is posed. In other words, the printer gamut used must be limited to avoid this problem.

Figure 28:
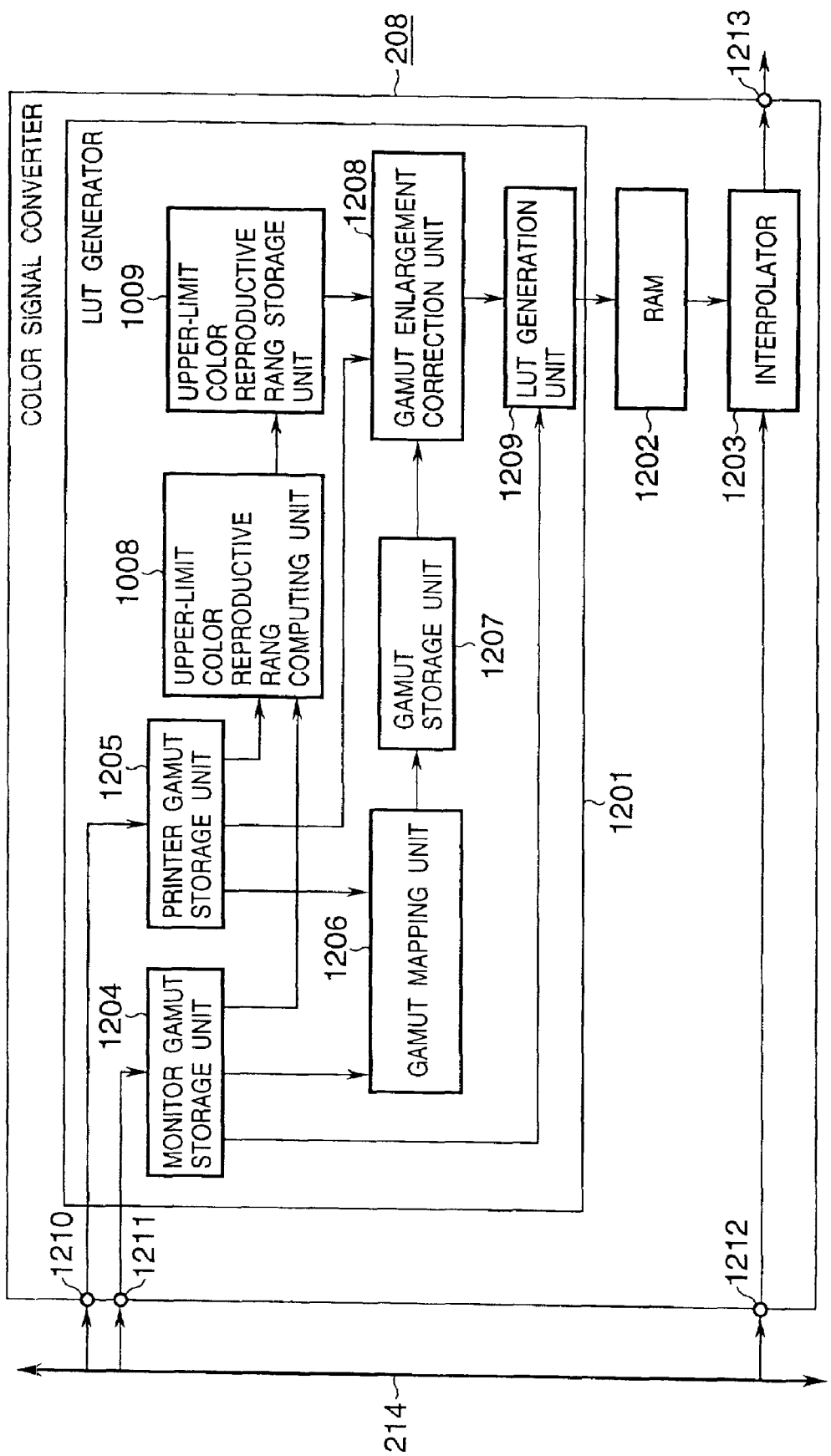
FIG. 28 is a block diagram showing the arrangement of a color signal converter according to the tenth embodiment.

FIG. 28 is a block diagram showing the arrangement of the color signal converter 208 of the tenth embodiment. An upper-limit color reproductive range computing unit 1008 computes an upper-limit color reproductive range that indicates the upper limit of the printer gamut used to limit use of the printer gamut, so as to avoid the aforementioned problem. An upper-limit color reproductive range storage unit 1009 stores computed upper-limit color reproductive range information.

The gamut enlargement correction unit 1208 generates mapped gamut information obtained by mapping an intermediate mapped gamut into a printer gamut with reference to intermediate mapped gamut information, printer gamut information, and upper-limit color reproductive range information.

Generation of LUT

The color signal converter 208 receives color gamut information corresponding to the color monitor 207 and that corresponding to the color printer 209 in accordance with a command from the CPU 201. When the two pieces of color gamut information are respectively stored in the monitor and printer gamut storage units 1204 and 1205, and transmission of the two pieces of color gamut information is complete, the CPU 201 commands to start initialization for color signal conversion. Upon receiving this command, in the color signal converter 208, the gamut mapping unit 1206 is launched to compress and map the monitor gamut in an intermediate mapped gamut in the uniform calorimetric system. In this operation, the aforementioned scheme for nonlinearly compressing lightness and saturation, or the like is used.

Upon completion of the process of the gamut mapping unit 1206, intermediate mapped gamut information as the gamut mapping result is stored in the gamut storage unit 1207, and the upper-limit color reproductive range computing unit 1008 is then launched to generate upper-limit color reproductive range information. The generated information is stored in the upper-limit color reproductive range storage unit 1009. Note that the process of the upper-limit color reproductive range computing unit 1008 will be described in detail later.

Figure 30:
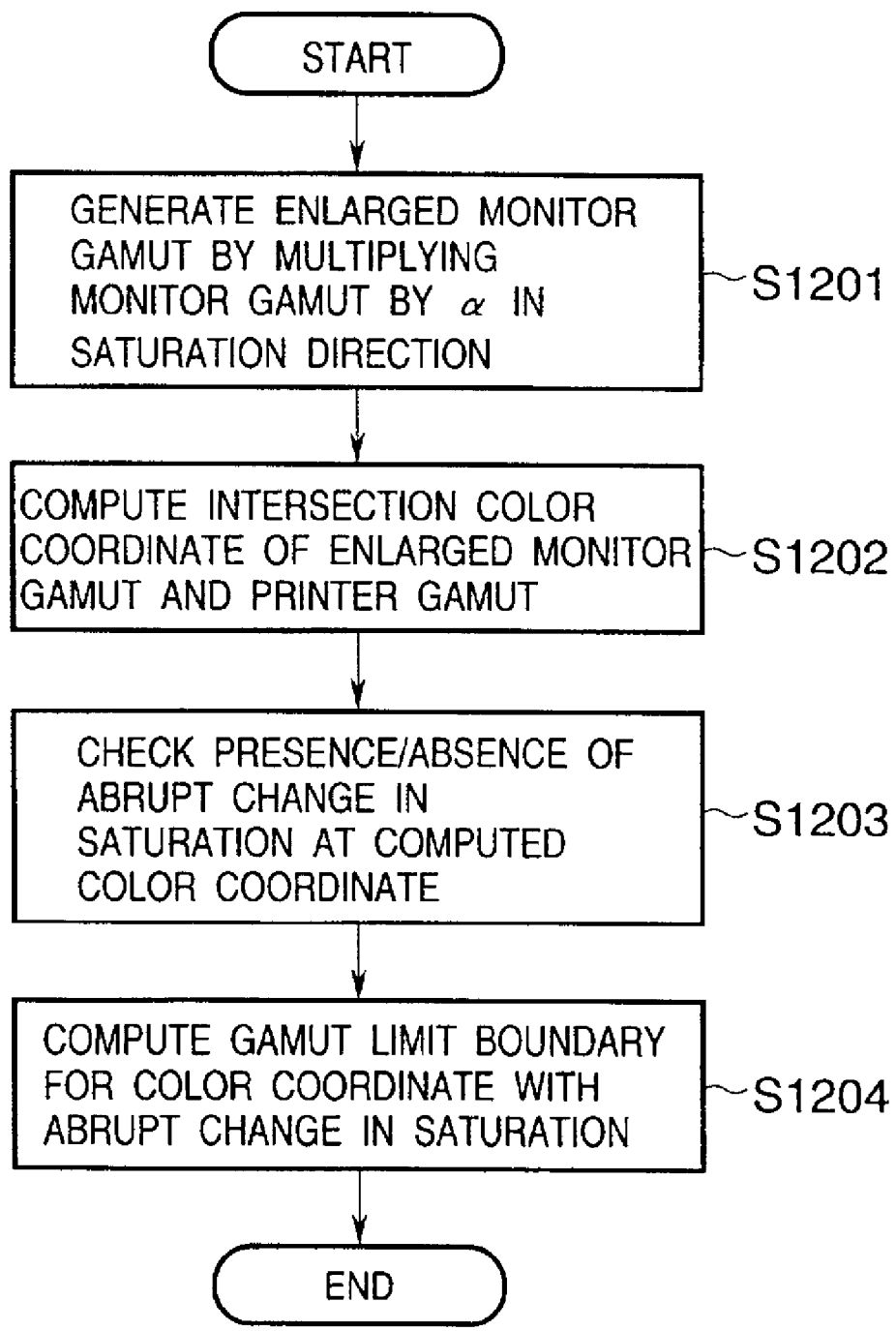
FIG. 30 is a flow chart showing the operation algorithm of an upper-limit color reproductive range computing section shown in FIG. 28.

After the upper-limit color reproductive range information is stored in the storage unit 1009, the gamut enlargement correction unit 1208 is launched. The unit 1208 maps an intermediate mapped gamut into a printer gamut based on an algorithm (to be described later) with reference to the intermediate mapped gamut information, printer gamut information, and upper-limit color reproductive range information. The LUT generation unit 1209 generates an LUT for converting RGB data into CMYK data with reference to a mapped gamut as a mapping result of the gamut enlargement correction unit 1208, and writes it in the RAM 1202. Upon completion of a series of operations above, the color signal converter 208 informs the CPU 201 of the end of initialization. Upper-limit Color Reproductive Range Computing Unit FIG. 30 is a flow chart showing the operation algorithm of the upper-limit color reproductive range computing unit 1008.

Figure 31:
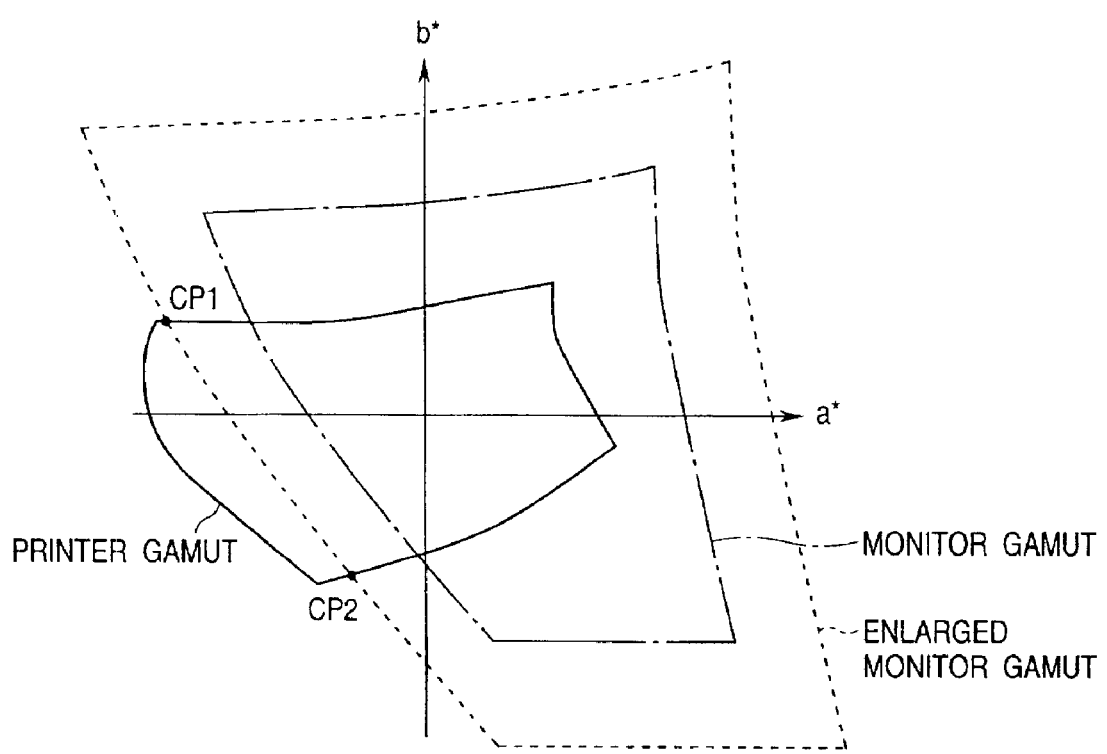
FIG. 31 is a graph showing a printer, monitor, and enlarged monitor gamuts.

In step S1201, a gamut is generated by enlarging the monitor gamut to a predetermined magnification α in the direction of saturation. This gamut will be referred to as an "enlarged monitor gamut" hereinafter. FIG. 31 is a graph showing the relationship among these gamuts, and shows gamuts at L*=50 in the a*b* plane. The solid curve represents the printer gamut, the one-dashed chain curve the monitor gamut, and the broken curve the enlarged monitor gamut.

In step S1202, color coordinate positions where the enlarged monitor gamut and printer gamut intersect (color coordinate positions CP1 and CP2 in FIG. 31) are computed. Note that since a gamut is expressed in a three-dimensional space in practice, the intersection color coordinate position is expressed by a curve.

Figure 32:
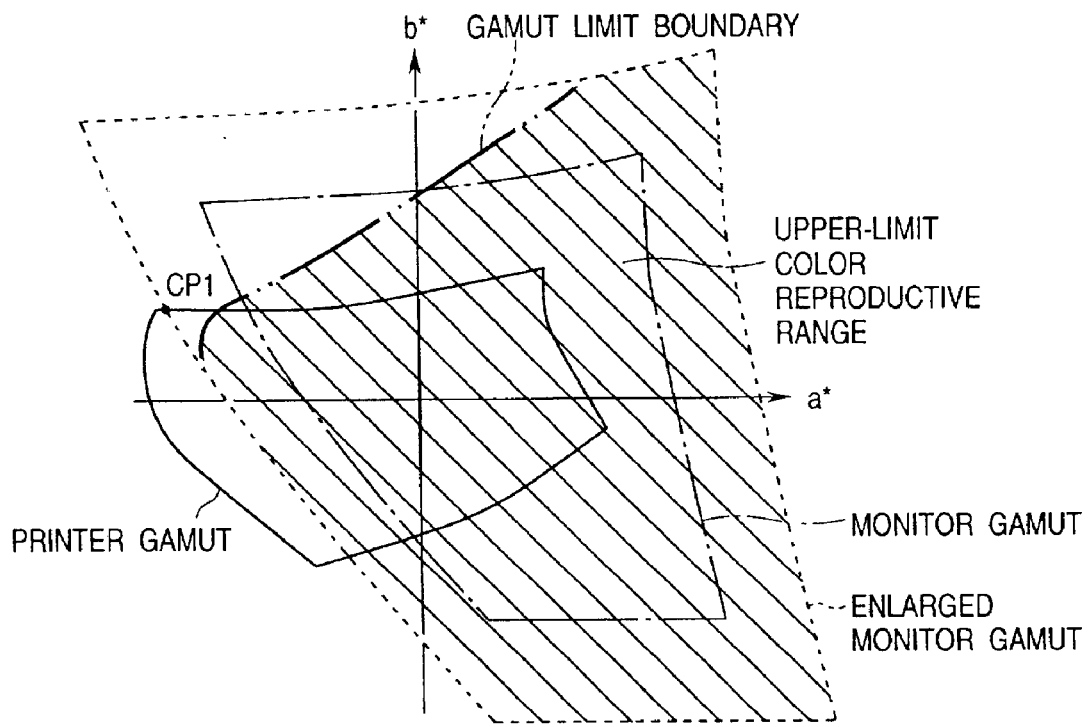
FIG. 32 is a graph showing an example of an upper-limit color reproductive range computed by the upper-limit color reproductive range computing section.

Subsequently, in step S1203 the presence/absence of abrupt change in gamut at each intersection color coordinate position is checked. In step S1204, a gamut limit boundary for the color coordinate position at which the abrupt change in gamut is detected is computed. For example, when an abrupt change in gamut is detected at, e.g., the color coordinate position CP1 shown in FIG. 31, a gamut limit boundary indicated by the two-dashed chain curve in FIG. 32 is computed. Note that the gamut limit boundary is formed by a curved surface in practice, and that curved surface is defined by a B-spline curved surface or triangular patch/polygon.

With the aforementioned processes, the upper-limit color reproductive range is computed. FIG. 32 depicts the upper-limit color reproductive range, as indicated by a hatched region.

Gamut Enlargement Correction Unit

Figure 33:
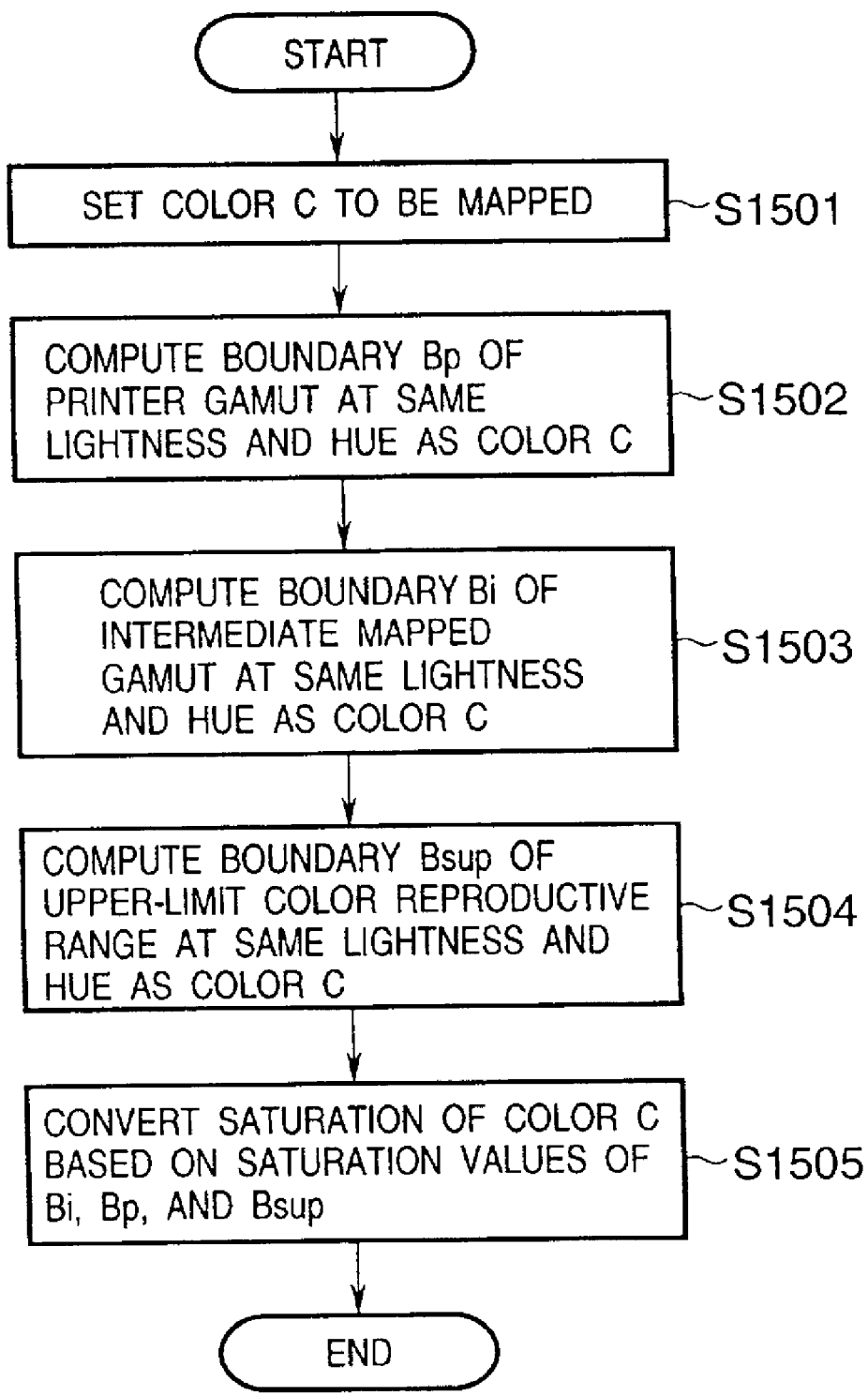
FIG. 33 is a flow chart for explaining the operation of a gamut enlargement correction unit of the tenth embodiment.

FIG. 33 is a flow chart for explaining the operation of the gamut enlargement correction unit 1208.

Figure 34:
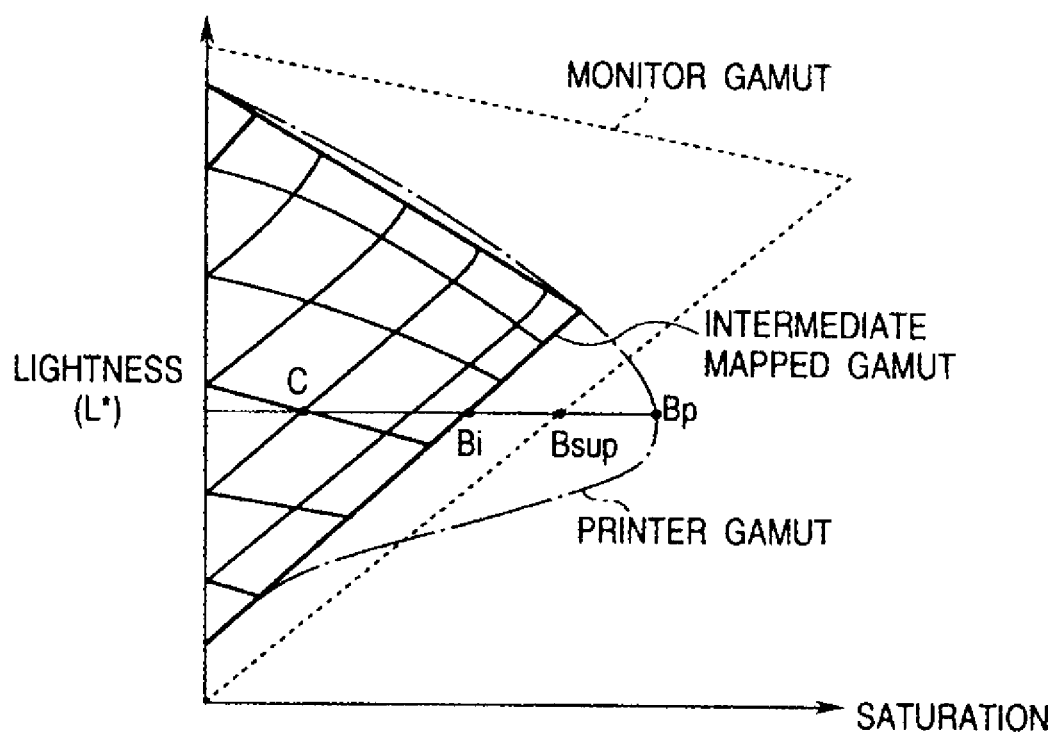
FIG. 34 is a graph for explaining mapping by the gamut enlargement correction unit of the tenth embodiment.

In step S1501, color C to be mapped is set. In step S1502, boundary Bp of the printer gamut at the same lightness and hue as those of setting color C is computed. In step S1503, boundary Bi of the intermediate mapped gamut at the same lightness and hue as those of setting color C is computed. Furthermore, in step S1504 boundary Bsup of the upper-limit color reproductive range at the same lightness and hue as those of setting color C is computed. FIG. 34 shows the relationship among these colors C, Bp, Bi, and Bsup. Subsequently, in step S1505 saturation of color C is converted on the basis of the saturation relationship among the colors Bp, Bi, and Bsup, and setting color C. If $c_{org}$ represent saturation of color C, $c_p$ that of color Bp, $c_i$ that of color Bi, $c_{sup}$ that of color Bsup, and $c_{mod}$ the converted saturation, this conversion is implemented by an input/output function f(·):

$$c_{mod} = f(c_{org})$$

$$c_{max} = \min[c_p, c_{sup}] \quad (2)$$

Note that the input/output function f(·) is defined using a C2-continuous spline function of third order, and the following conditions are satisfied:

carrier of f(·) is [0, $c_i$]

f(0)=0 f($c_i$)=$c_{max}$ f′(0)=1 f′($c_i$)=γ, γ: γ>1 f′(x)≠0, x: 0≦x≦$c_i$

As described above, γ is a parameter that controls the enlargement factor of saturation correction near maximum saturation, and is automatically determined by the gamut enlargement correction unit 1208 based on the relationship between saturation $c_{max}$ and saturation $c_i$ of color Bi. Upon automatically setting the γ parameter, as the ratio $c_{max}/c_i$ of saturation $c_{max}$ to saturation $c_i$ increases, the value γ increases. That is, the enlargement factor increases.

Figure 35:
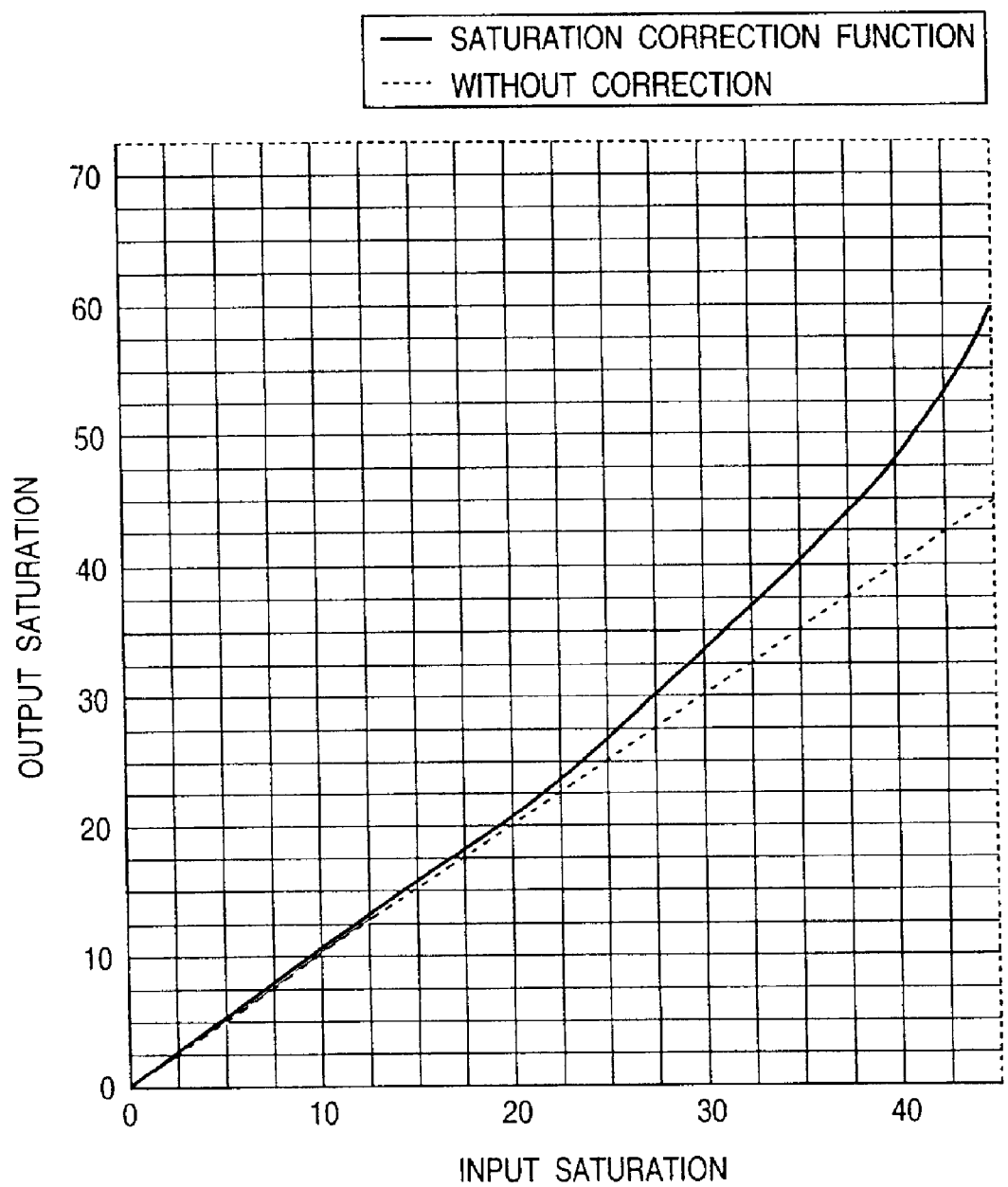
FIG. 35 is a graph showing an example of an input/output function f(·) used by the algorithm of a gamut enlargement correction unit of the tenth embodiment.

FIG. 35 shows an example of the input/output function f(·) used by the algorithm of the gamut enlargement correction unit 1208 for color C. When saturation correction is implemented by a smooth input/output function shown in FIG. 35, grayscale information can be preserved, and generation of pseudo edges can be prevented.

The aforementioned mapping is done for all colors that require gamut mapping.

As described above, according to the tenth embodiment, not only gamut mapping that fully utilizes the color gamut of an output device can be attained, but also a high contrast ratio can be obtained by limiting the printer gamut used. In addition, gamut mapping that can match perceptual colors of monitor and print images can be attained, and it is especially effective in image formation such as a photo image and the like.

When an abrupt change in gamut like the color coordinate position CP1 shown in FIG. 31 has taken place as a result of limitation of use of the printer gamut, pseudo edges may be generated in an image output using the mapped gamut. That is, when a gamut that originally changes smoothly suffers an abrupt change, high-frequency components are produced in an output image, thus generating pseudo edges. To prevent this, when the use of the printer gamut is limited as in the tenth embodiment, an abrupt change in saturation is prevented to avoid pseudo edges from being generated, thus implementing gamut mapping that can obtain a satisfactory image free from pseudo edges.

Eleventh Embodiment

Nonlinear gamut mapping that preserves saturation values of low- and middle-saturation ranges, as described in the above embodiments, is effective to solve the aforementioned problem, output of a perceptually unpreferable image. However, since the monitor gamut shape is largely different from the printer gamut shape, the colors perceived do not often match even by nonlinear gamut mapping.

Differences between the monitor and printer gamut shapes will be briefly explained below. For example, as can be seen from the printer gamut (solid curve) and monitor gamut (one-dashed chain curve) for green hues shown in FIG. 22, the monitor and printer gamuts for green hues are not similar to each other, and have considerably different shapes.

Figure 52:
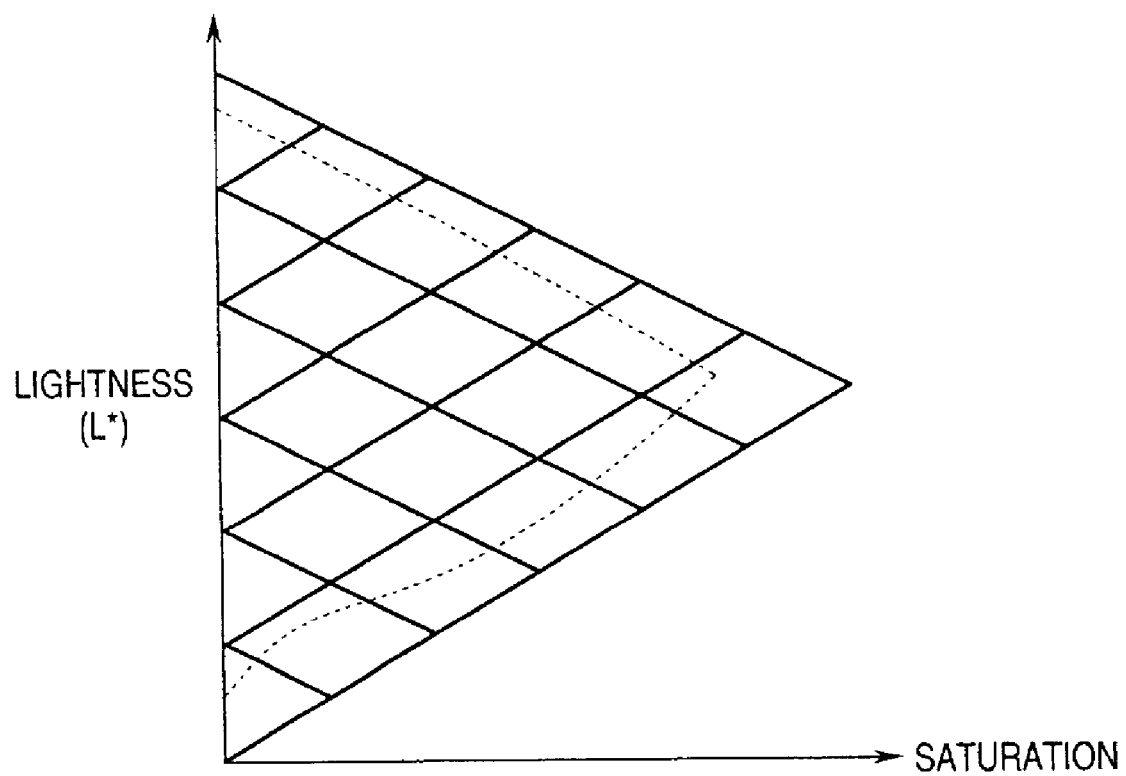
FIG. 52 is a graph showing monitor and printer gamuts for red hues.

On the other hand, monitor and printer gamuts for red hues have relatively similar shapes, as indicated by the solid curve (monitor gamut) and broken curve (printer gamut) in FIG. 52.

In order to improve perceptual color matching between monitor and printer images, gamut mapping that absorbs any difference between the monitor and printer gamut shapes is required. That is, the eleventh embodiment to be described below satisfactorily aims at obtaining a high-quality output image by absorbing any difference between the monitor and printer gamut shapes. Note that the same reference numerals in the eleventh embodiment denote the same parts as those in the first and ninth embodiments, and a detailed description thereof will be omitted.

[Color Signal Converter]

Figure 36:
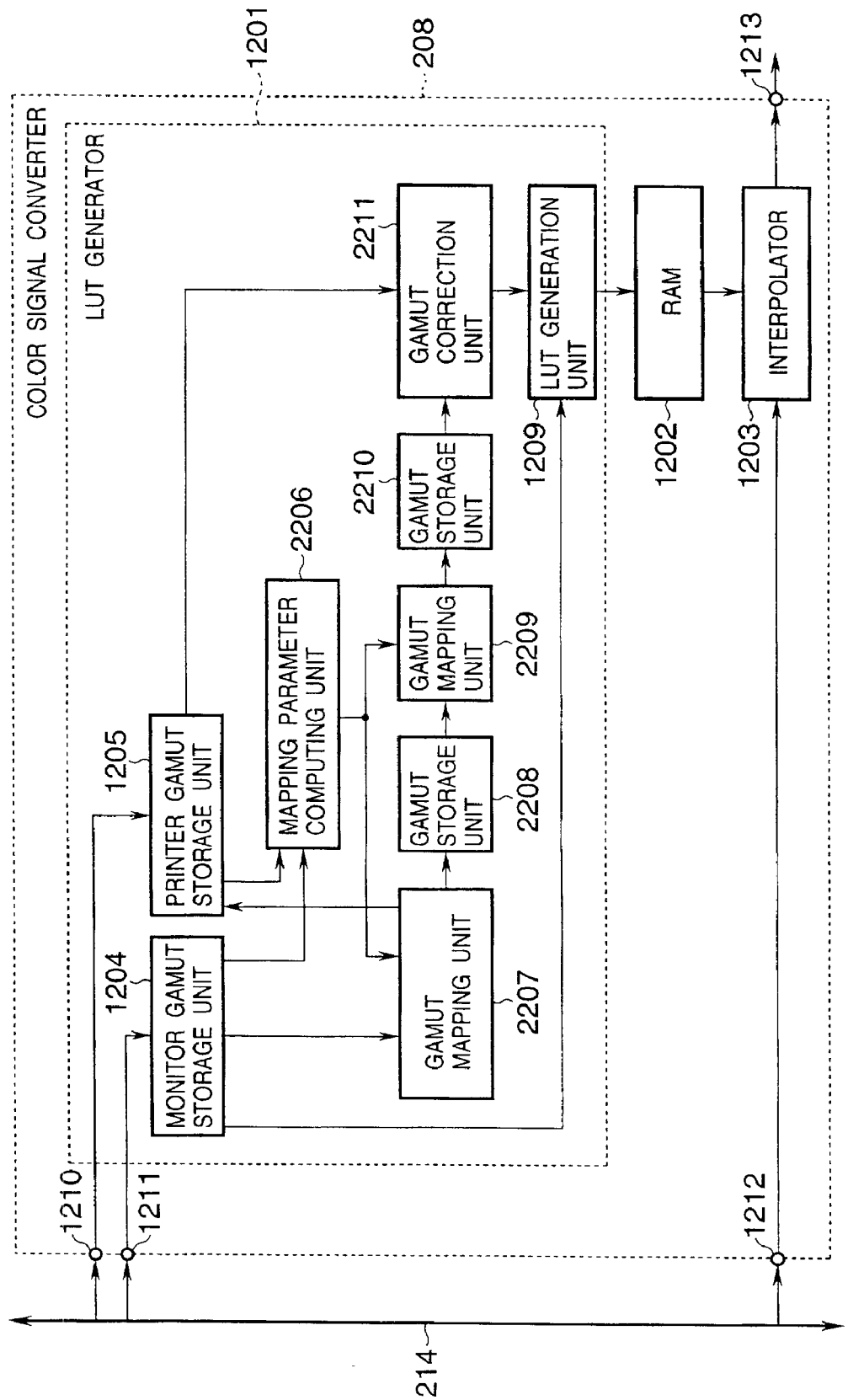
FIG. 36 is a block diagram showing the arrangement of a color signal converter according to the eleventh embodiment.

FIG. 36 is a block diagram showing the arrangement of the color signal converter 208 of the eleventh embodiment.

The LUT generation unit 1201 receives a printer gamut from the terminal 1210, and a monitor gamut from the terminal 1211. The monitor gamut storage unit 1204 stores the input monitor gamut, and the printer gamut storage unit 1205 stores the input printer gamut. A mapping parameter computing unit 2206 computes mapping parameters required in mapping (to be described later) with reference to the printer and monitor gamuts stored in the printer and monitor gamut storage units 1205 and 1204.

A gamut mapping unit 2207 maps the monitor gamut with reference to the mapping parameters computed by the mapping parameter computing unit 2206 and the monitor gamut information. The mapping result of the monitor gamut by the gamut mapping unit 2207 will be referred to as a "first intermediate mapped gamut" hereinafter. A gamut storage unit 2208 stores the first intermediate mapped gamut information.

A gamut mapping unit 2209 maps only lightness for each color in the first intermediate mapped gamut with reference to the mapping parameters computed by the mapping parameter computing unit 2206 and the first intermediate mapped gamut information stored in the gamut storage unit 2208. In mapping by the gamut mapping unit 2209, chromaticity of each color is preserved. The mapping result of the first intermediate mapped gamut by the gamut mapping unit 2209 will be referred to as a "second intermediate mapped gamut" hereinafter. A gamut storage unit 2210 stores the second intermediate mapped gamut information.

A gamut correction unit 2211 maps the second intermediate mapped gamut into the printer gamut with reference to the second intermediate mapped gamut information and printer gamut information. The mapping result of the gamut correction unit 2211 will be referred to as a "mapped gamut" hereinafter.

The LUT generation unit 1209 generates an LUT for converting RGB data into CMYK data with reference to the correspondence between the monitor and mapped gamuts, RGB data that can obtain a predetermined color on the monitor, and CMYK data that can obtain the predetermined color on the printer.

Generation of LUT

Generation of the LUT will be explained in detail below. Note that a case will be exemplified wherein an L*a*b* color space is used as a uniform calorimetric system in a series of mapping operations in the eleventh embodiment.

The color signal converter 208 receives color gamut information corresponding to the color monitor 207 and that corresponding to the color printer 209 in accordance with a command from the CPU 201. The two pieces of color gamut information are respectively stored in the monitor and printer gamut storage units 1204 and 1205. Upon completion of transmission of the two pieces of color gamut information, the CPU 201 commands to start initialization for color signal conversion. Upon receiving this command, the LUT generation unit 201 operates as follows in the color signal converter 208.

The mapping parameter computing unit 2206 is launched to compute various parameters required for the operations of the gamut mapping units 2207 and 2209. Upon completion of computations of the parameters, the gamut mapping unit 2207 is launched to map the monitor gamut into the first intermediate mapped gamut in the uniform colorimetric system. In this operation, the aforementioned scheme for nonlinearly compressing lightness and saturation, or the like is used.

Mapping by the gamut mapping unit 2207 will be briefly described using the graphs in FIGS. 19A, 22, and 37, although it will be explained in more detail later.

Figure 19A:
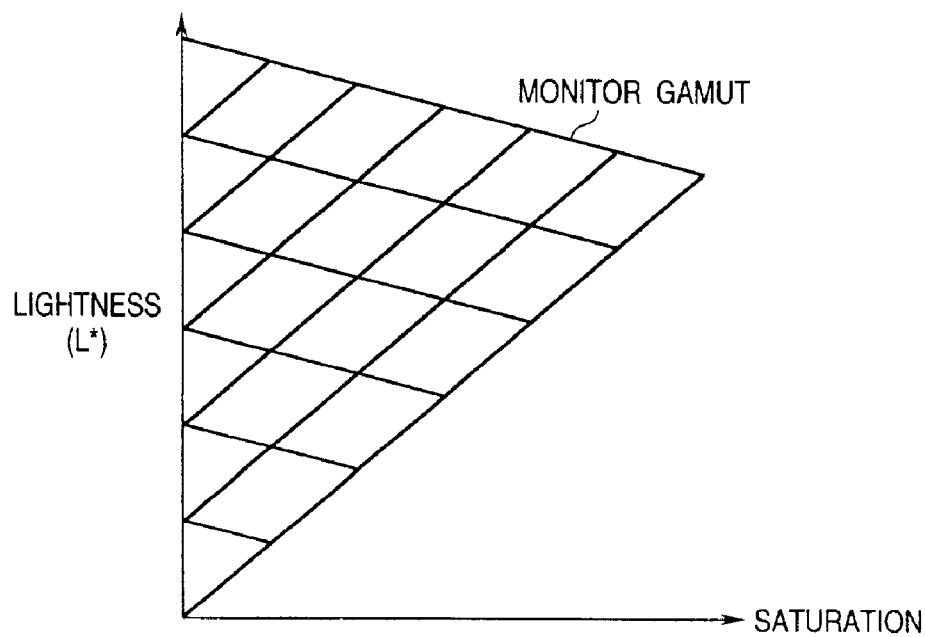
FIGS. 19A and 19B are views for explaining gamut mapping.
Figure 19B:
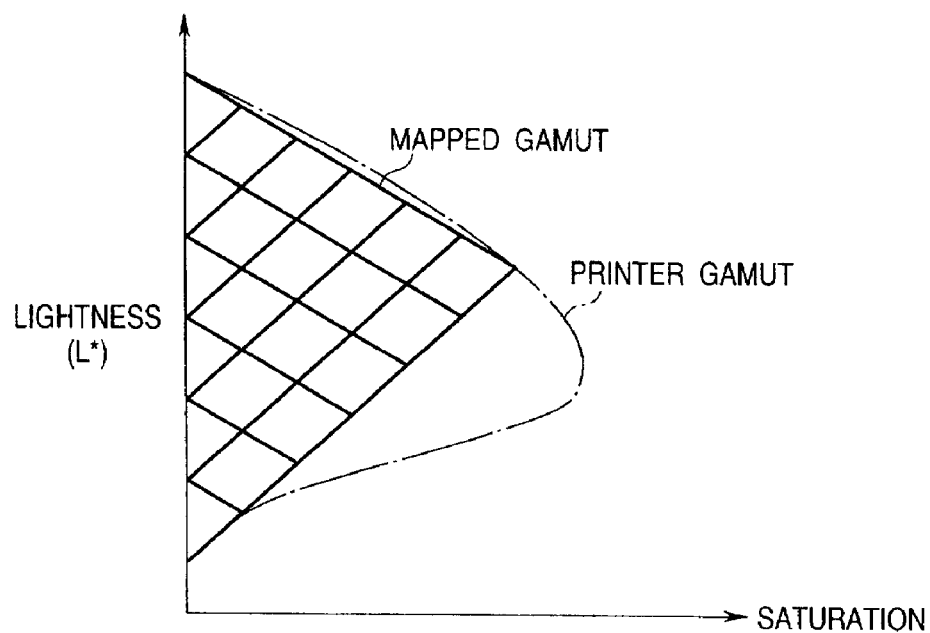

FIG. 19A shows a monitor gamut for green hues. FIG. 22 shows a printer gamut for green hues, in which the solid curve represents the printer gamut, and the one-dashed chain curve represents the monitor gamut. FIG. 37 shows a first intermediate mapped gamut for green hues, in which the solid curve represents the first intermediate mapped gamut, the one-dashed chain curve represents the monitor gamut, and the broken curve represents the printer gamut.

The gamut mapping unit 2207 separates each color in the monitor gamut into lightness and chromaticity components, and nonlinearly maps the lightness and chromaticity components. With this operation, the monitor gamut shown in FIG. 19A is mapped into the first intermediate mapped gamut shown in FIG. 37.

Upon completion of mapping by the gamut mapping unit 2207, the first intermediate mapped gamut information is stored in the gamut storage unit 2208. Then, the gamut mapping unit 2209 is launched to map the first intermediate mapped gamut into the second intermediate mapped gamut. This operation will be briefly described below using the graphs in FIGS. 37 and 38, although it will be explained in more detail later. FIG. 38 is a graph showing the second intermediate mapped gamut for green hues, in which the solid curve represents the second intermediate mapped gamut, and the one-dashed chain curve represents the first intermediate mapped gamut.

The gamut mapping unit 2209 separates each color in the first intermediate mapped gamut into lightness and chromaticity components, and nonlinearly maps only the lightness component while maintaining the chromaticity component. Note that a lightness input/output function that implements mapping varies depending on chromaticity. With this mapping, the first intermediate mapped gamut indicated by the solid curve in FIG. 37 is mapped into the second intermediate mapped gamut indicated by the solid curve in FIG. 38.

Figure 38:
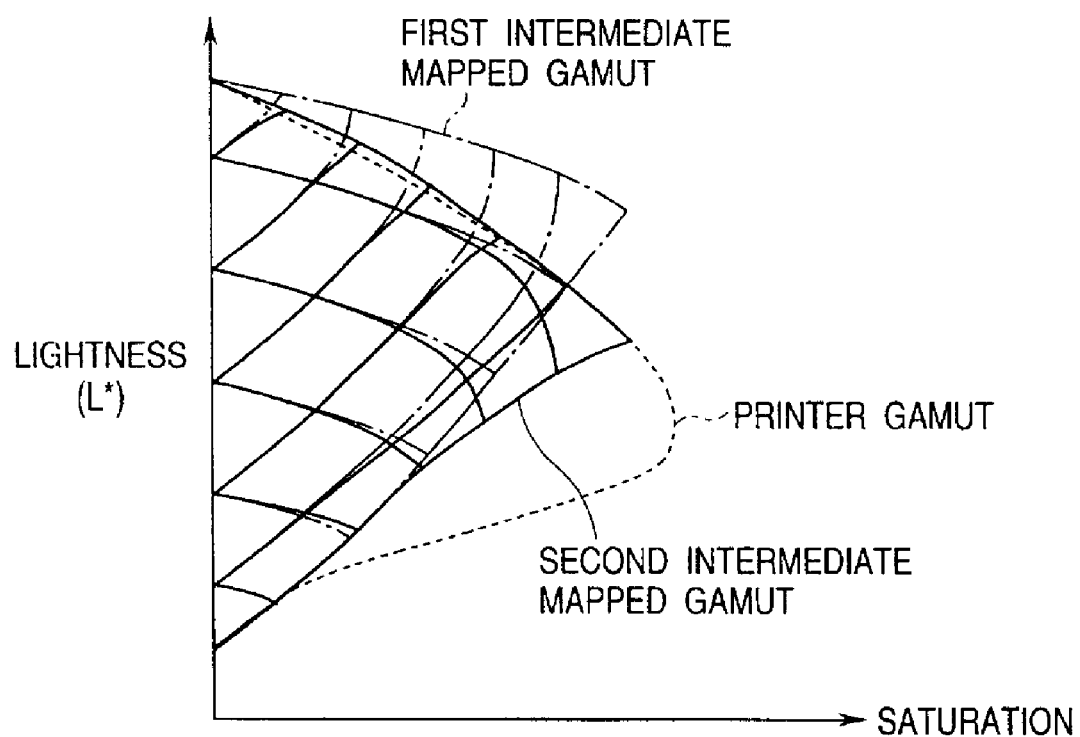
FIG. 38 is a graph showing a second intermediate mapped gamut for green hues.
Figure 39:
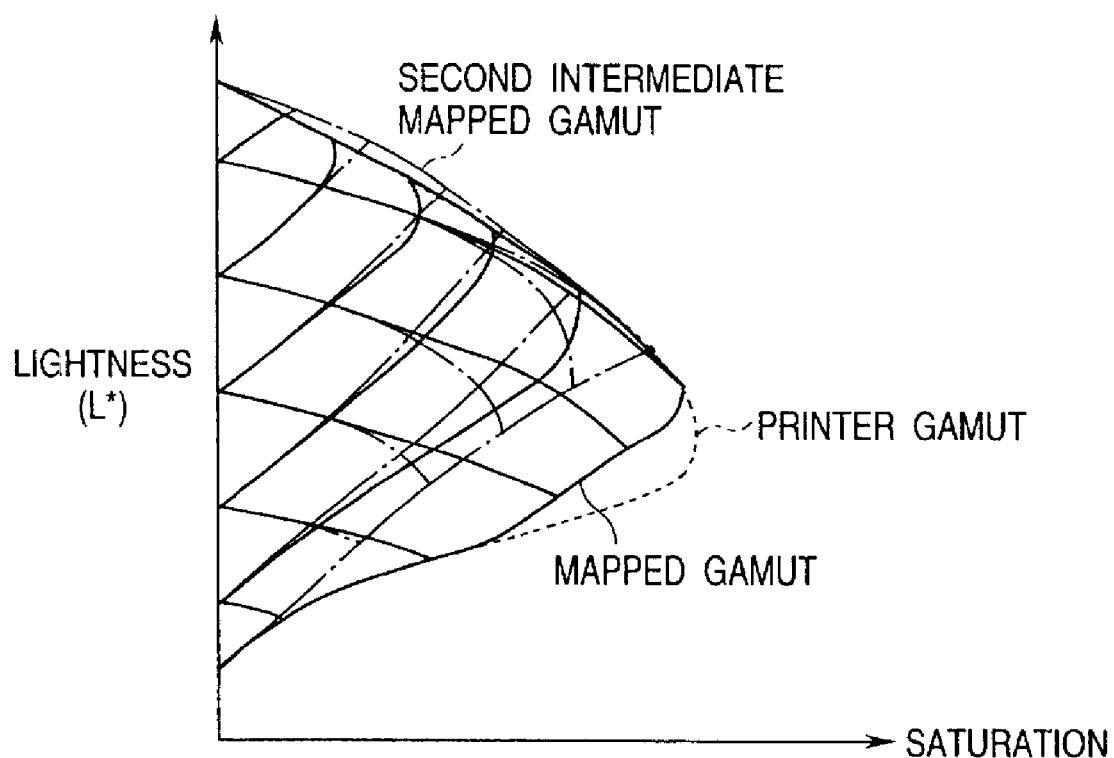
FIG. 39 is a graph showing a mapped gamut for green hues.

The gamut correction unit 2211 maps the second intermediate mapped gamut into the printer gamut with reference to the second intermediate mapped gamut information and printer gamut information. The operation of the gamut correction unit 2211 will be briefly described using the graphs in FIGS. 38 and 39, although it will be explained in more detail later. FIG. 39 is a graph showing a mapped gamut for green hues, in which the solid curve represents the mapped gamut, and the one-dashed chain curve represents the second intermediate mapped gamut.

The gamut correction unit 2211 separates each color in the second intermediate mapped gamut into lightness and chromaticity components, and nonlinearly maps a saturation component in the chromaticity component while maintaining the lightness component. With this mapping, the second intermediate mapped gamut shown in FIG. 38 is mapped into the mapped gamut shown in FIG. 39.

The LUT generation unit 1201 generates an LUT for converting RGB data into CMYK data with reference to the mapped gamut as the final mapping result, and writes it in the RAM 1202. Upon completion of a series of operations above, the color signal converter 208 informs the CPU 201 of the end of initialization.

Gamut Mapping Unit 2207

Nonlinear mapping of the lightness and chromaticity components in the gamut mapping unit 2207 is implemented as follows.

Figure 40:
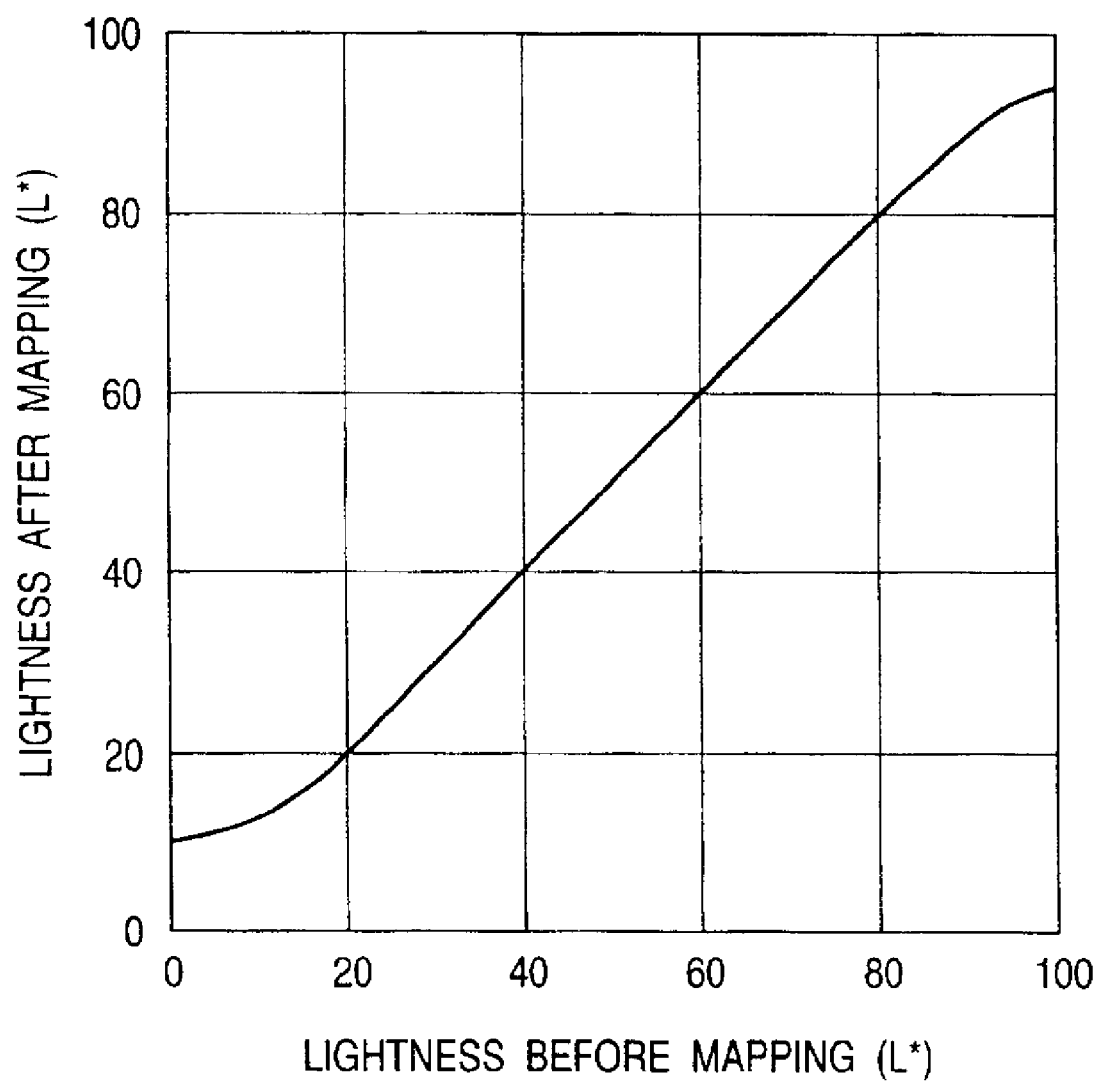
FIG. 40 is a graph showing an example of the input/output function that implements nonlinear mapping of lightness components.

Nonlinear mapping of the lightness component is implemented by one input/output function independent from chromaticity. The input/output function in mapping is controlled to preserve middle lightness, and is controlled to decrease derivatives of the input/output function near highest lightness and lowest lightness, i.e., to set a high compression ratio. Furthermore, in order to prevent generation of pseudo edges or the like, the input/output function is controlled so that at least first derivatives are continuous (C1-continuous) at all points. FIG. 40 shows an example of nonlinear mapping of lightness components implemented by the eleventh embodiment. Note that the control parameters of nonlinear mapping of lightness components are computed and set by the mapping parameter computing unit 2206.

Nonlinear mapping of the chromaticity component is implemented by further separating the chromaticity component into hue and saturation components, and nonlinearly mapping these hue and saturation components.

Figure 41:
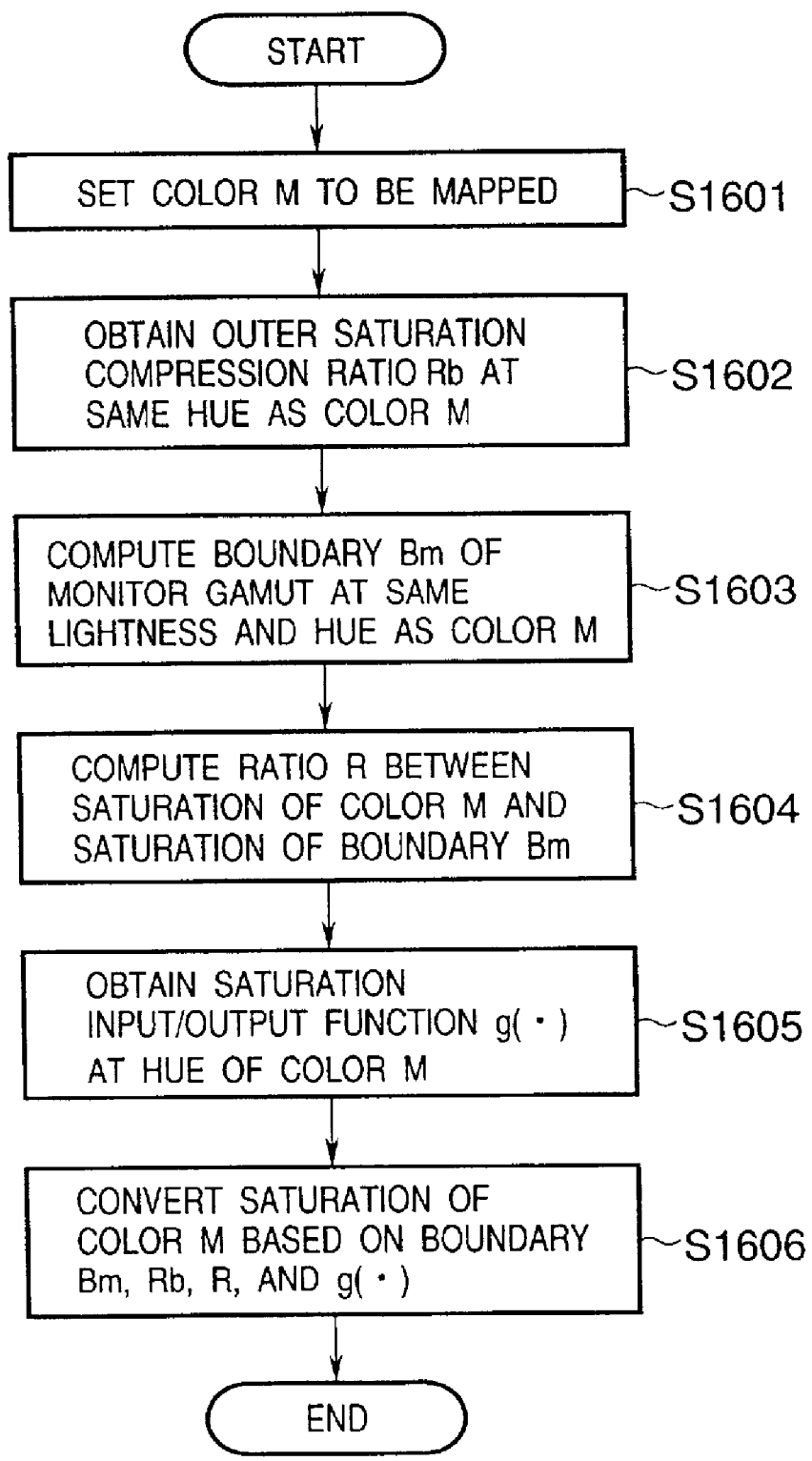
FIG. 41 is a flow chart showing mapping of saturation components by a gamut mapping unit 2207 in the eleventh embodiment.
Figure 42:
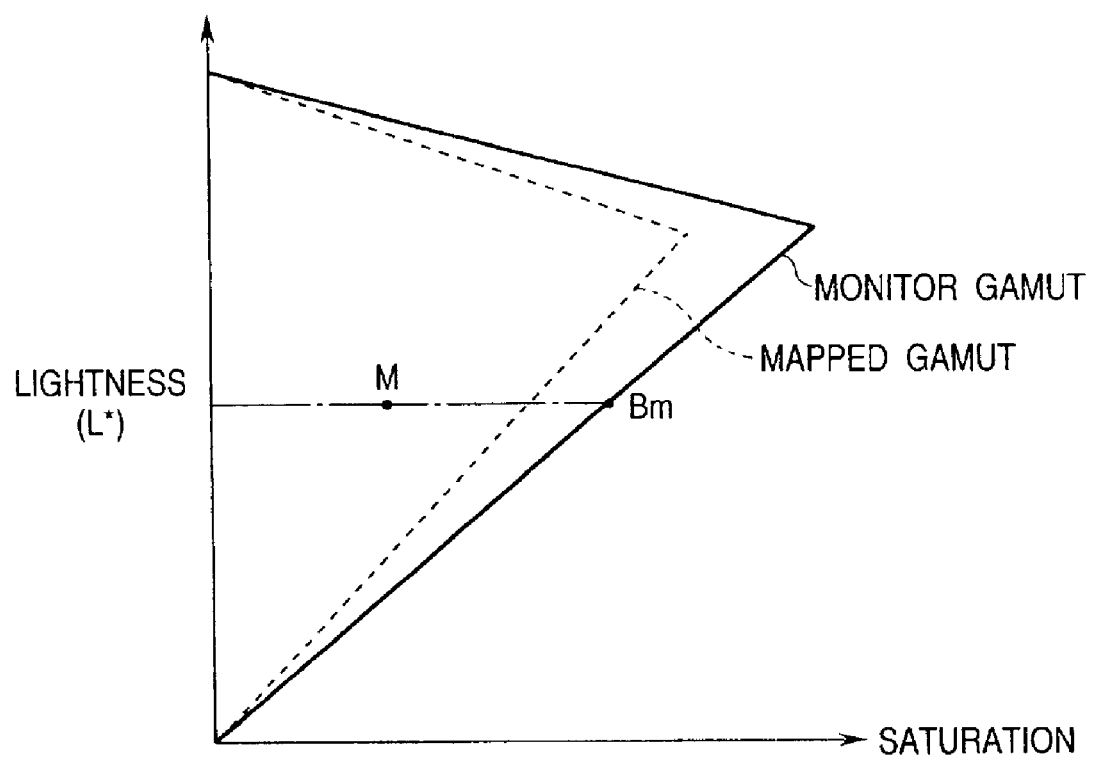
FIG. 42 is a graph showing the spatial relationship between colors M and Bm.

Mapping of the saturation component will be described below using the flow chart in FIG. 41. In step S1601, color M to be mapped is set. In step S1602, outer saturation compression ratio Rb at the hue of color M is obtained from the mapping parameter computing unit 2206. In step S1603, color Bm of a boundary of the monitor gamut at the same lightness and hue as those of color M is computed. FIG. 42 is a graph showing the relationship between colors M and Bm. In FIG. 42, the solid curve represents the monitor gamut, and the broken curve represents the way outer saturation values of the monitor gamut are mapped upon saturation mapping.

In step S1604, saturation Cm of color M and saturation Cbm of color Bm are computed to compute ratio R=Cm/Cbm. In step S1605, a saturation input/output function $g(\cdot)$ is obtained from the mapping parameter computing unit 2206 to map saturation. In step S1606, saturation is mapped based on computed or obtained parameters by:

$$Cm_{mapped} = Cbm \times g(R)$$

where $Cm_{mapped}$ is the mapped saturation of color M.

Note that the saturation input/output function $g(\cdot)$ satisfies the following conditions:

carries of $g(\cdot)$ is [0, 1]

$g(\cdot)$ is monotonous increase $g(0)=0$ $g(1)=Rb$ $g(\cdot)$ is at least C1-continuous $g'(0)=1$ $g'(1)=\gamma$, $\gamma$: $\gamma>0$, $\gamma$ is a constant for controlling compression, is set in units of hues, and changes in inverse proportion to Rb $$g'(x) \neq 0, x: 0 \leq x \leq 1$$

Figure 43:
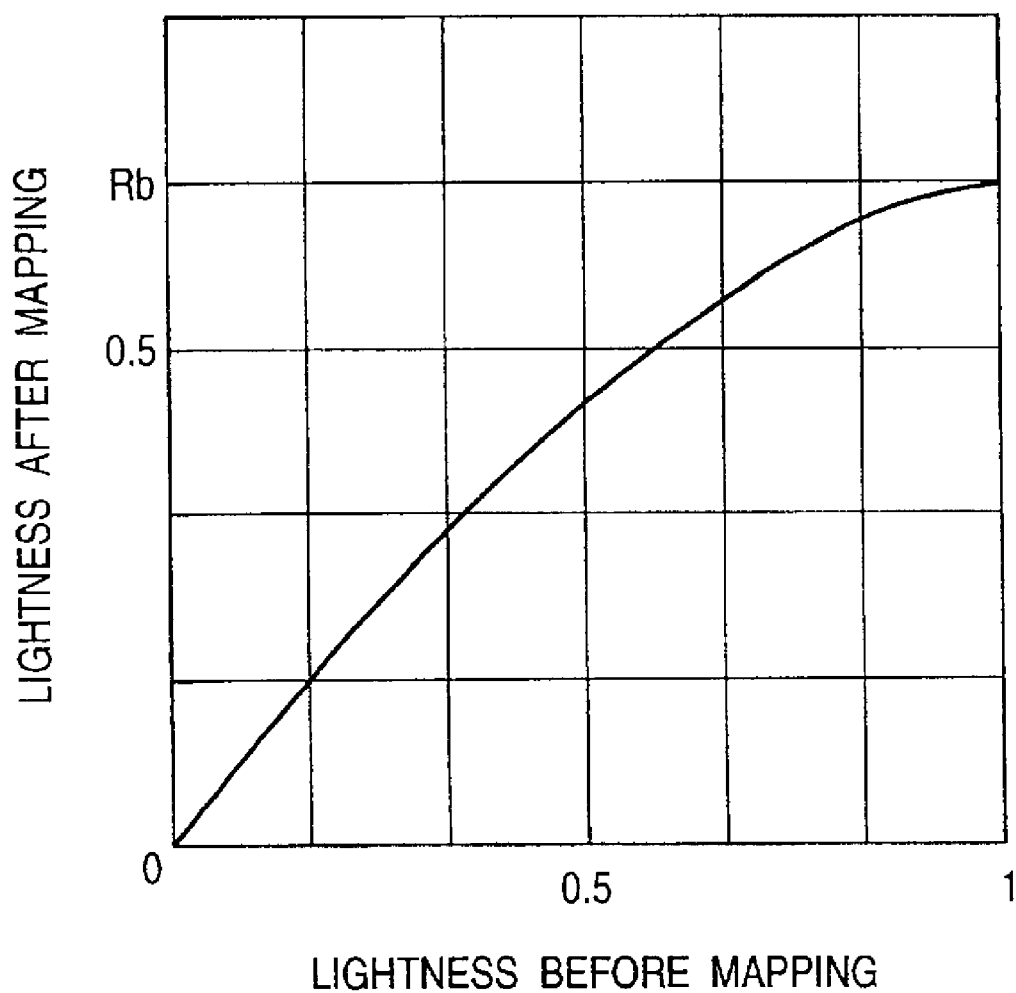
FIG. 43 is a graph showing an example of a saturation input/output function g(·) that implements nonlinear mapping of saturation components.

FIG. 43 is a graph showing the input/output function $g(\cdot)$ of saturation. That is, saturation is preserved as it is lower, and is compressed at a higher compression ratio as it is higher. Furthermore, since the input/output function is at least C1-continuous, the rate of change in saturation smoothly changes, and generation of pseudo edges and the like is suppressed.

Figure 44:
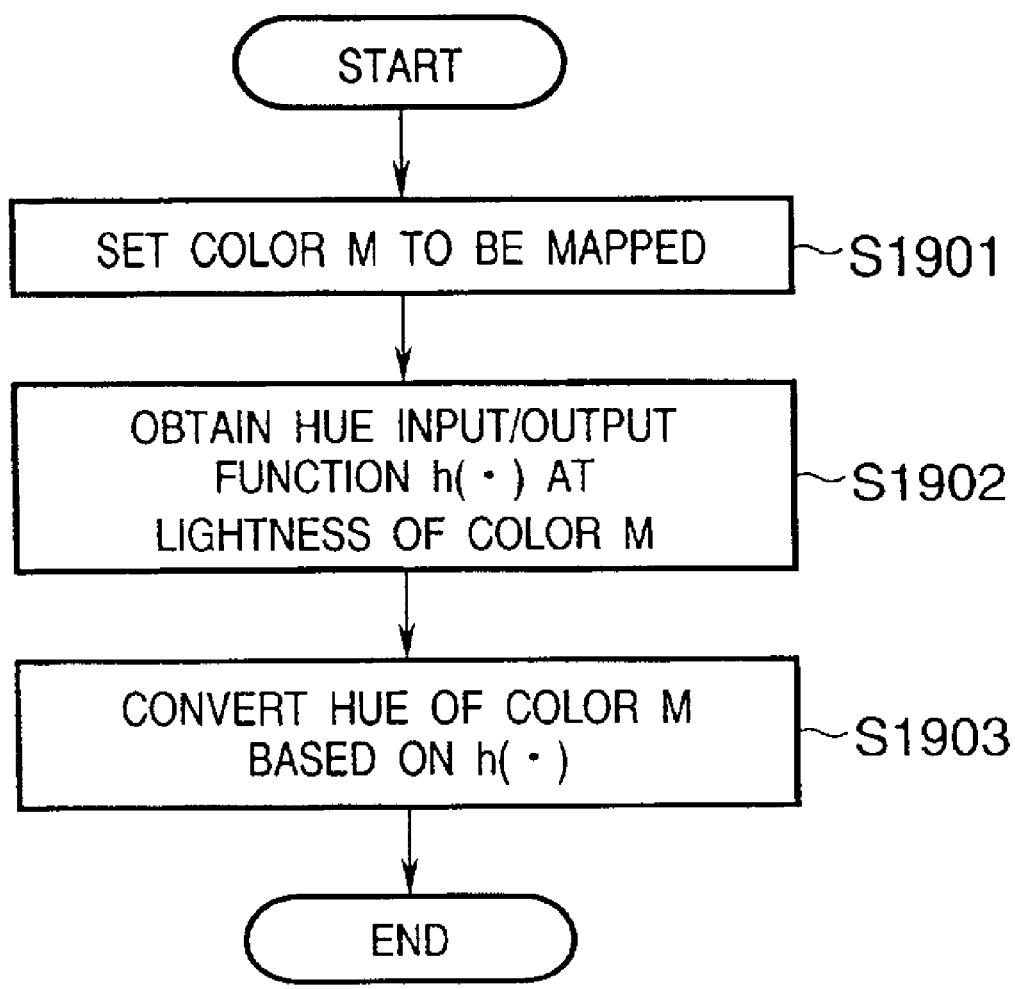
FIG. 44 is a flow chart showing mapping of hue components by the gamut mapping unit 2207.

Mapping of the hue component will be explained below using the flow chart in FIG. 44. In step S1901, color M to be mapped is set. In step S1902, a hue input/output function $h(\cdot)$ at the lightness of color M is obtained from the mapping parameter computing unit 2206. Note that the hue input/output function $h(\cdot)$ changes depending on lightness. In step S1903, hue is mapped by:

$$Hm_{mapped} = h(Hm)$$

where Hm is the hue of color M, and $Hm_{mapped}$ is the mapped hue of color M.

Figure 45:
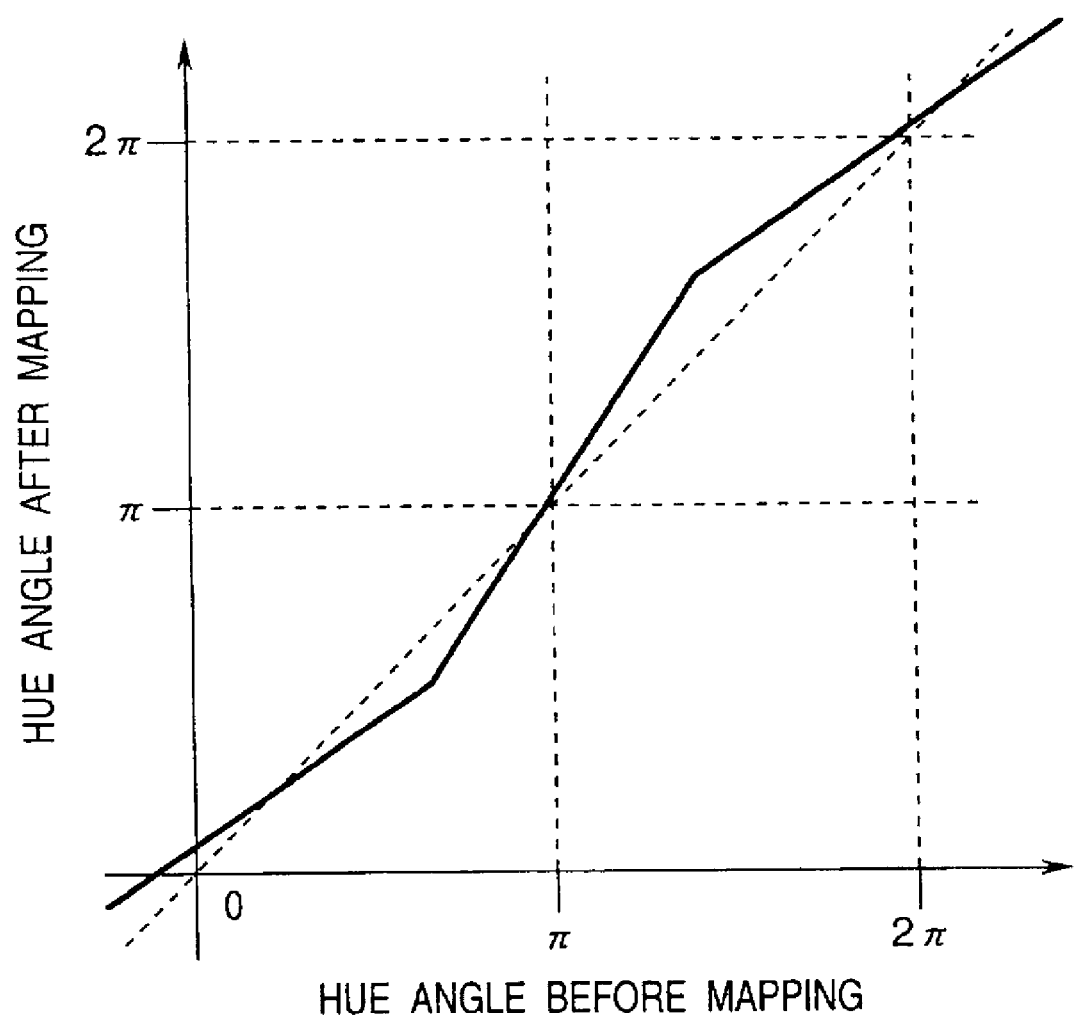
FIG. 45 is a graph showing an example of a hue input/output function h(·) that implements nonlinear mapping of hue components.

FIG. 45 shows an example of the hue input/output function f(·). In FIG. 45, the hue angle is expressed in radians in which a positive b* axis direction in an a*b* chromaticity coordinate system is set at hue angle=0 rad, and counterclockwise rotation is positive.

Figure 37:
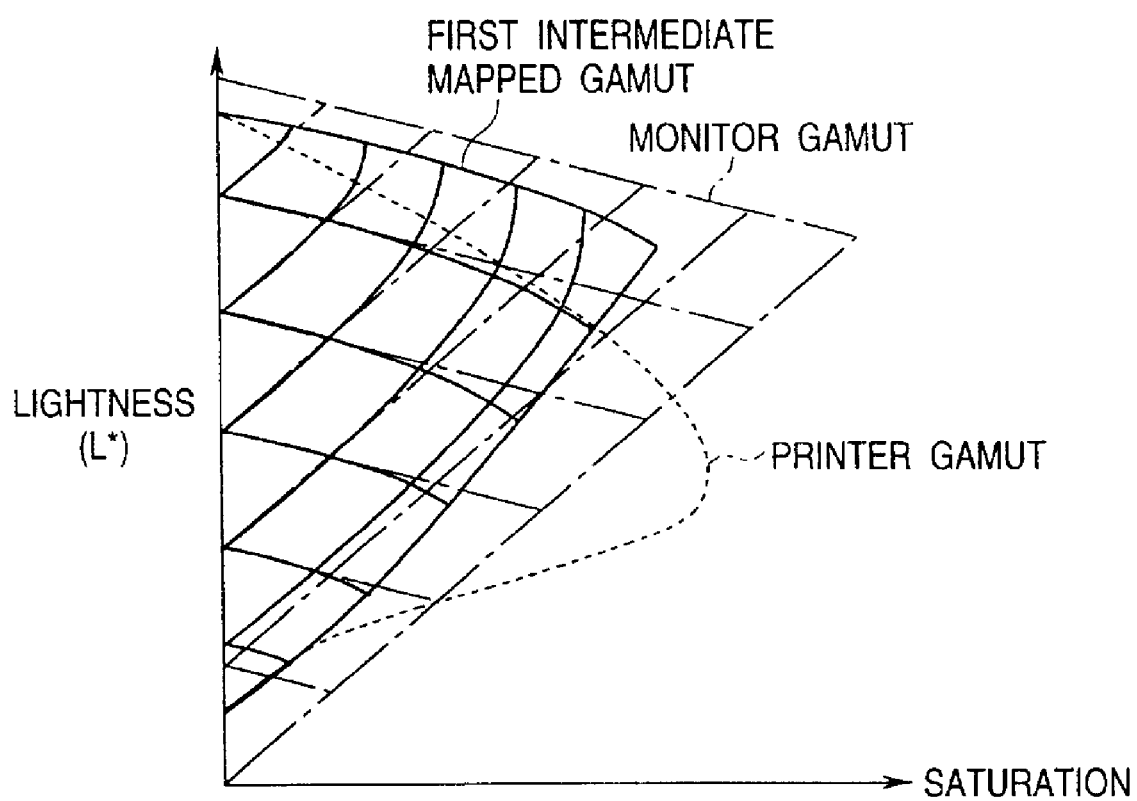
FIG. 37 is a graph showing a first intermediate mapped gamut for green hues.

With the aforementioned mapping of the gamut mapping unit 2207, the monitor gamut shown in the graph in FIG. 19A is mapped into the first intermediate mapped gamut shown in the graph in FIG. 37. In FIG. 37, a gamut indicated by the solid curve is the first intermediate mapped gamut, that indicated by the one-dashed chain curve is the monitor gamut, and that indicated by the broken curve is the printer gamut.

Gamut Mapping Unit 2209

Figure 46:
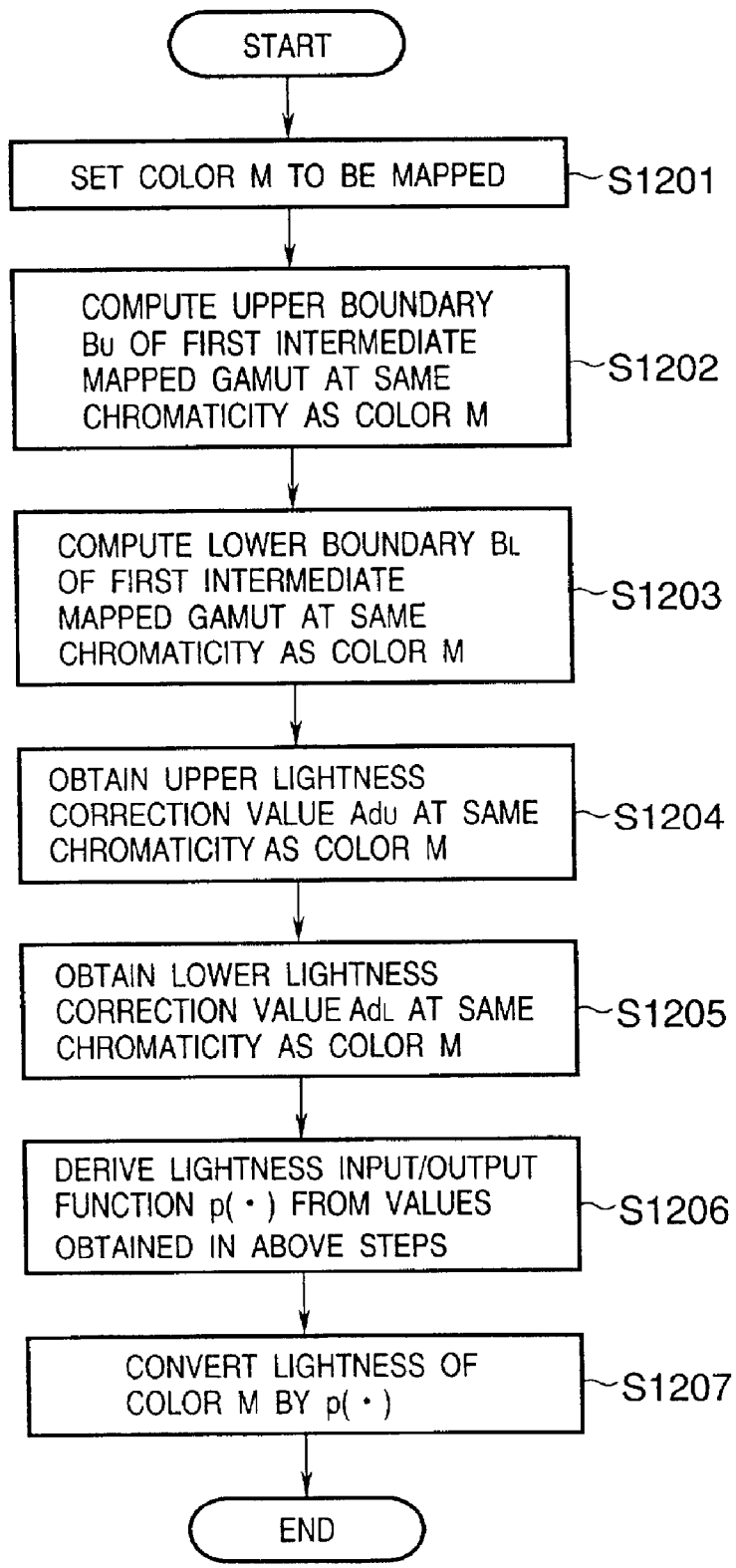
FIG. 46 is a flow chart showing the operation of a gamut mapping unit 2209.

The operation of the gamut mapping unit 2209 will be explained below using the flow chart in FIG. 46.

Figure 47:
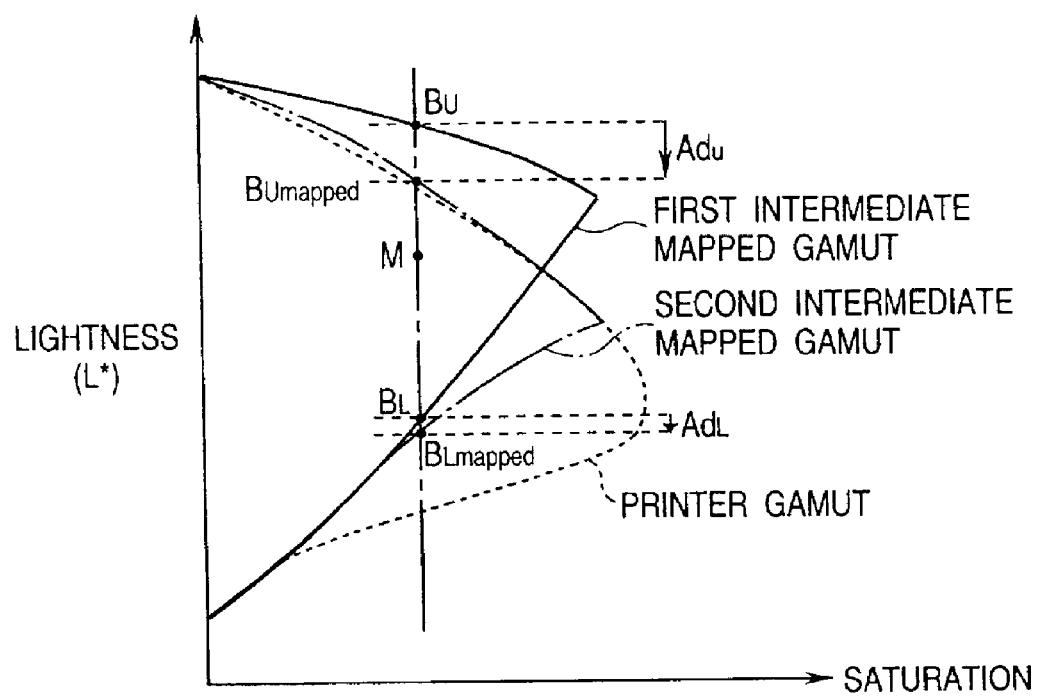
FIG. 47 is a graph showing the spatial relationship among colors obtained in steps S1201 to S1206 shown in FIG. 46.

In step S1201, color M to be mapped is set. Note that this color M is the one in the first intermediate mapped gamut, but does not represent the color in the monitor gamut. In step S1202, upper boundary $B_U$ of the first intermediate mapped gamut at the same chromaticity as that of color M is computed. FIG. 47 shows the relationship between color M and upper boundary $B_U$. In step S1203, lower boundary $B_L$ of the first intermediate mapped gamut at the same chromaticity as that of color M is computed. FIG. 47 also shows the relationship between color M and lower boundary $B_L$.

In step S1204, upper lightness correction value $Ad_U$ at the same chromaticity as that of color M is obtained from the mapping parameter computing unit 2206. Upper lightness correction value $Ad_U$ is a lightness correction value for upper boundary $B_U$, and is given as a real number which assumes a positive value in a direction in which lightness increases. FIG. 47 shows the relationship between upper lightness correction value $Ad_U$ and upper boundary $B_U$. In FIG. 47, color $B_{Umapped}$ indicates the mapping result of $B_U$ by the gamut mapping unit 2209. Also, in FIG. 47, the solid curve represents the first intermediate mapped gamut, the one-dashed chain curve the second intermediate mapped gamut, and the broken curve the printer gamut.

In step S1205, lower lightness correction value $Ad_L$ at the same chromaticity as that of color M is obtained from the mapping parameter computing unit 2206. Lower lightness correction value $Ad_L$ is a lightness correction value for lower boundary $B_L$, and is given as a real number which assumes a positive value in the direction in which lightness increases. FIG. 47 shows the relationship between lower lightness correction value $Ad_L$ and lower boundary $B_L$. In FIG. 47, color $B_{Lmapped}$ indicates the mapping result of $B_L$ by the gamut mapping unit 2209.

Subsequently, in step S1206 an input/output function p(·) that implements mapping for adjusting lightness is derived from the four parameters obtained in the above steps. Upon deriving the input/output function p(·), the following conditions must be satisfied:

carrier of p(·) is $[L_{BL}, L_{BU}]$ p(·) is monotonous increase in carrier $p(L_{BL})=L_{BLm}$ $p(L_{BU})=L_{BUm}$ p(·) is at least C1-continuous $p'(L_{BL})=\alpha$, $\alpha$: $\alpha>0$, $\alpha$ is a constant for controlling compression, and is set in units of chromaticity values in accordance with $Ad_L$. If $Ad_L$ is positive, $\alpha \leq 1$; if $Ad_L$ is negative, $\alpha \geq 1$.

$p'(L_{BU})=\beta$, $\beta$: $\beta>0$, $\beta$ is a constant for controlling compression, and is set in units of chromaticity values in accordance with $Ad_U$. If $Ad_U$ is positive, $\beta \geq 1$; if $Ad_U$ is negative, $\beta \leq 1$.

The input/output function p(·) is computed to satisfy the above conditions, and to preserve lightness in a middle portion of the carrier as much as possible and to minimize change in lightness. In the eleventh embodiment, a C2-continuous spline function of third order is used as the input/output function p(·). A merit of using the C2-continuous spline function of third order is that the input/output function p(·) can be uniquely determined from the conditions at the end point independently of the number of knots. Furthermore, since the input/output function is smoothly defined, a suppression effect of pseudo edges is expected.

Figure 48A:
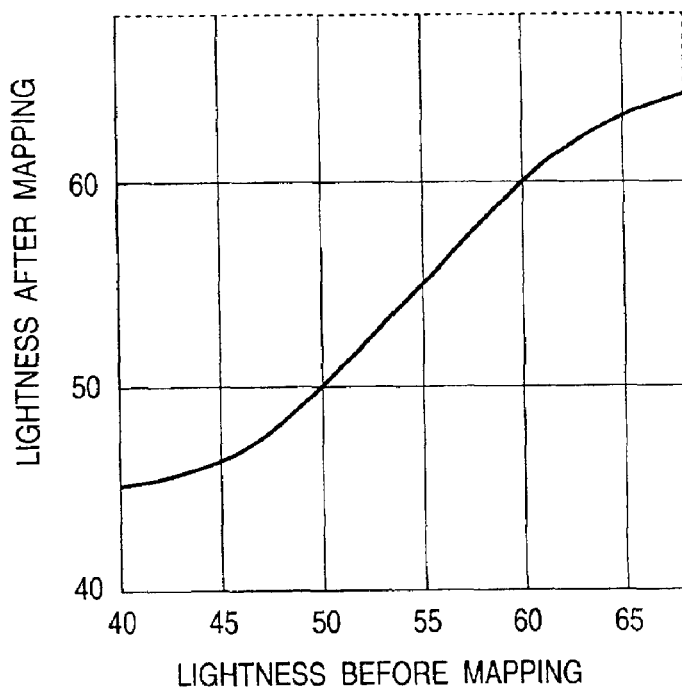
FIGS. 48A and 48B are graphs showing examples of an input/output function p(·) that implements nonlinear mapping of lightness components.
Figure 48B:
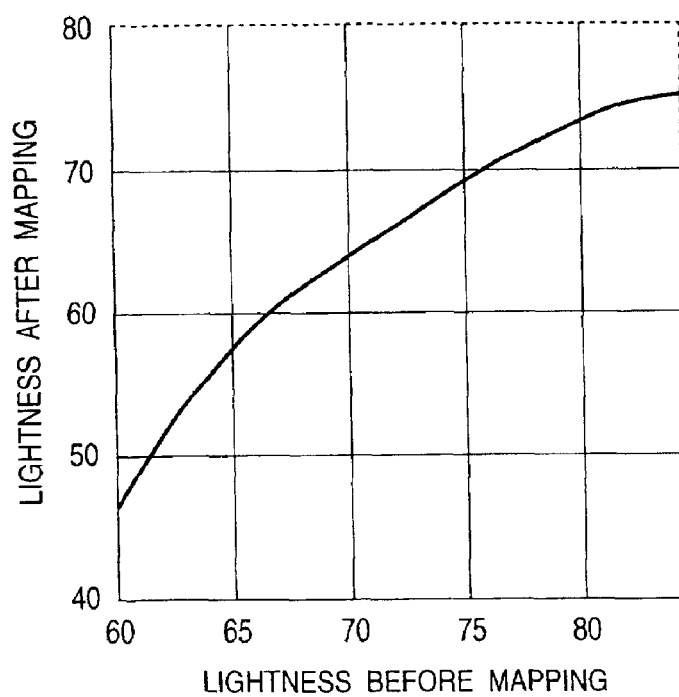

FIGS. 48A and 48B show examples of the input/output function p(·) in the eleventh embodiment. In FIG. 48A, lightness in the middle portion of the carrier is nearly preserved, while it is compressed at a high ratio near high lightness and low lightness. Note that $L_{BL}=40$, $L_{BLm}=45$, $Ad_L=5$, $L_{BU}=68$, $L_{BUm}=64$, and $Ad_U=-4$.

In FIG. 48B, since lightness correction amounts $Ad_L$ and $Ad_U$ have large absolute values, a function of preserving lightness in the middle portion of the carrier is activated, but lightness is not perfectly preserved. That is, lightness is expanded largely near low lightness, and is largely compressed near high lightness. Note that $L_{BL}=60$, $L_{BLm}=46$, $Ad_L=-14$, $L_{BU}=84$, $L_{BUm}=75$, and $Ad_U=-9$. Colors having the same chromaticity as that of color M use an identical input/output function.

Finally, in step S1207 mapping for adjusting lightness, i.e., computing mapped lightness $Lm_{mapped}=p(Lm)$ based on lightness Lm of color M before mapping using the input/output function p(·) computed in step S1206 is made.

With the aforementioned mapping of the gamut mapping unit 2209, the first intermediate mapped gamut shown in the graph in FIG. 37 is mapped into the second intermediate mapped gamut shown in the graph in FIG. 38. Note that the solid curve represents the second intermediate mapped gamut, the one-dashed chain curve the first intermediate mapped gamut, and the broken curve the printer gamut in FIG. 38.

Gamut Correction Unit

Figure 49:
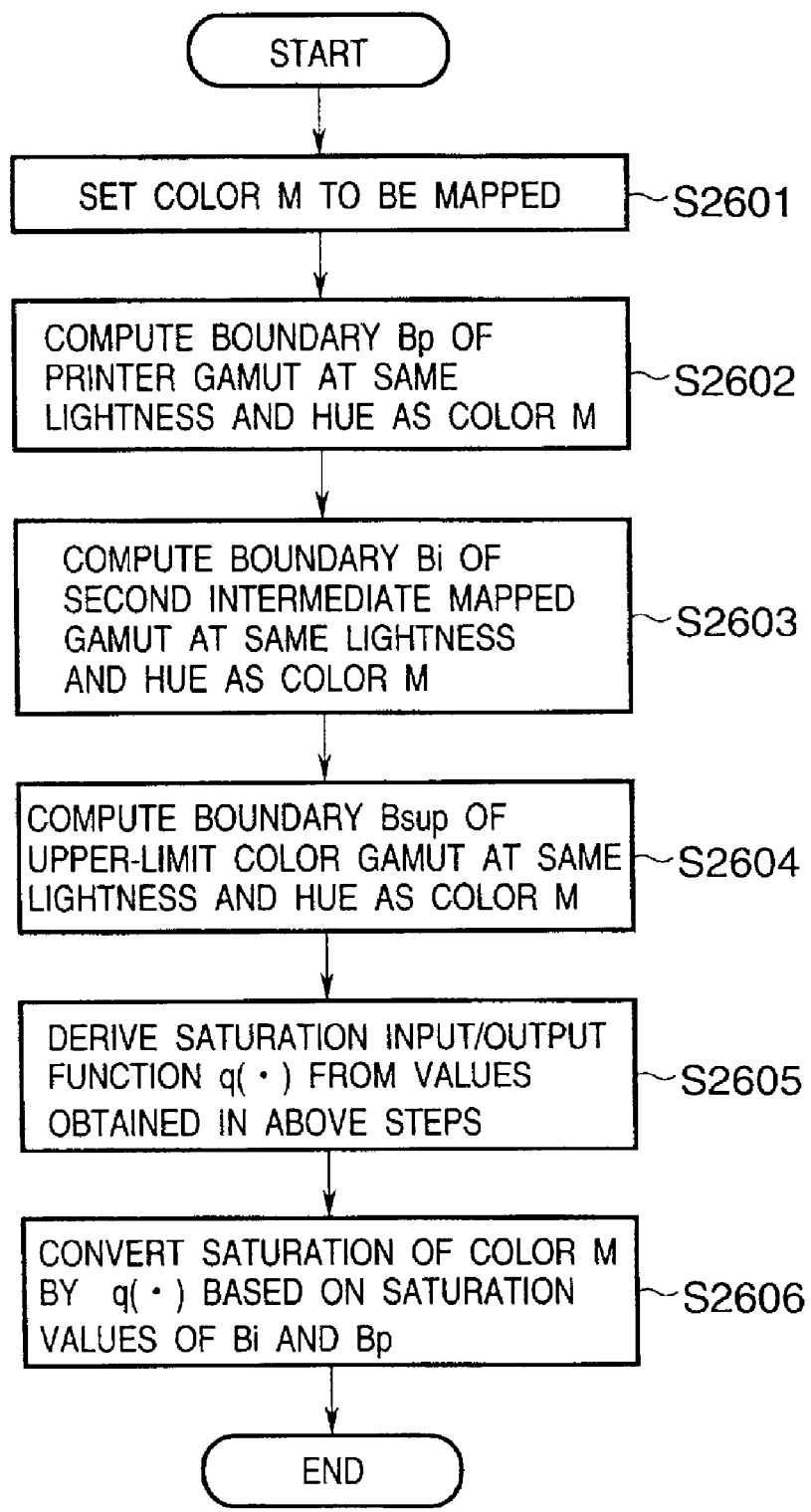
FIG. 49 is a flow chart showing the operation of a gamut correction unit 2211.
Figure 50:
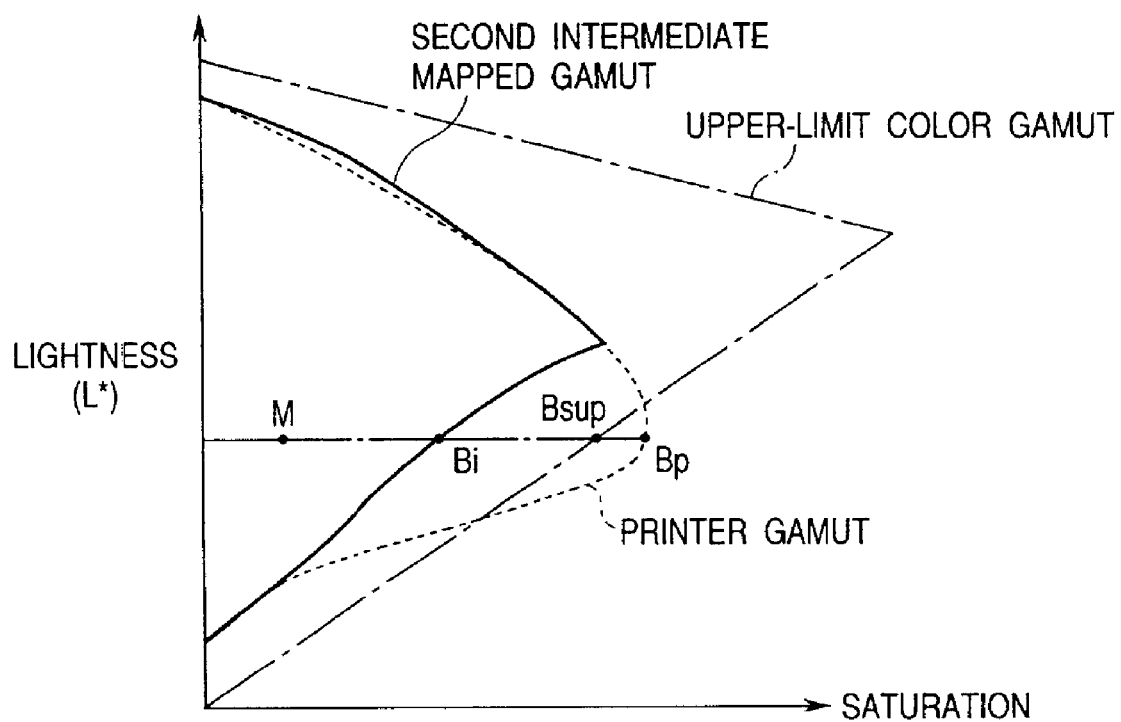
FIG. 50 is a graph showing the spatial relationship among colors obtained in steps S2601 to S2604 shown in FIG. 49.

The operation of the gamut correction unit 2211 will be described below with reference to the flow chart in FIG. 49. The gamut correction unit 2211 has a correction function of mapping a gamut in a reduced scale in addition to a correction function of mapping a gamut in an enlarged scale. The gamut correction unit 2211 sets color M to be mapped in step S2601. This color M is the one in the second intermediate mapped gamut. Boundary Bp of the printer gamut at the same lightness and hue as those of color M is computed in step S2602, and boundary Bi of the second intermediate mapped gamut at the same lightness and hue as those of color M is computed in step S2603. Furthermore, in step S2604 boundary Bsup of an upper-limit color reproductive range at the same lightness and hue as those of color M is computed. The upper-limit color reproductive range is a limitation range that designates the use upper limit of the printer gamut, and is computed and stored in advance by the gamut correction unit 2211. FIG. 50 shows the relationship among these colors M, Bp, Bi, and Bsup. Note that the solid curve represents the second intermediate gamut, the one-dashed chain curve the upper-limit color reproductive range, and the broken curve the printer gamut in FIG. 50.

Subsequently, in step S2605 an input/output function q(·) that implements mapping for gamut correction is derived from colors Bp, Bi, and Bsup computed in the above steps. If Cp represents the saturation of color Bp, Ci that of color Bi, Csup that of color Bsup, and Cmax=min[Cp, Csup], the input/output function q(·) is derived to satisfy:

carrier of q(·) is [0, Ci]
q(0)=0
q(Ci)=Cmax
q'(0)=1
q'(Ci)=γ, γ: γ>0
q'(x)≠0, x: 0≦x≦Ci γ is a value for controlling the enlargement/compression ratio of saturation correction near the maximum saturation, and is automatically determined. If Ci>Cp, γ<1 and mapping by the input/output function q(·) is compression. On the other hand, if Ci≦Cp, γ≧1 and mapping by the input/output function q(·) is expansion. In the eleventh embodiment, a C2-continuous spline function of third order is used as the input/output function q(·). A merit of using the C2-continuous spline function of third order is that the input/output function q(·) can be uniquely determined from the conditions at the end point independently of the number of knots. Furthermore, since the input/output function is smoothly defined, a suppression effect of pseudo edges is expected.

Figure 51A:
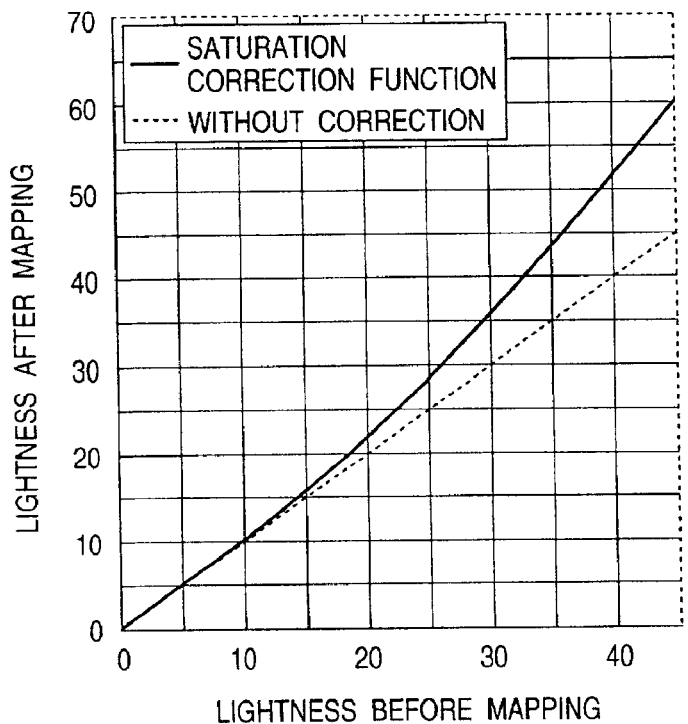
FIGS. 51A and 51B are graphs showing examples of an input/output function q(·) that implements nonlinear mapping of saturation components.
Figure 51B:
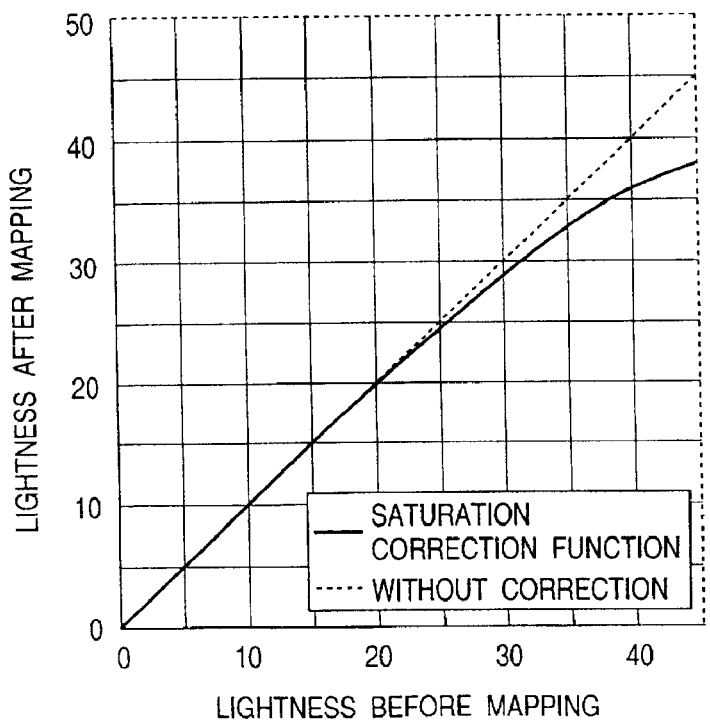

FIGS. 51A and 51B show examples of the input/output function q(·) in the eleventh embodiment. FIG. 51A shows a case Ci≦Cp, and mapping is expansion. FIG. 51B shows a case Ci>Cp, and mapping is compression.

Finally, in step S2606 saturation of color M is converted using the input/output function q(·) computed in step S2605. If Corg represents the saturation of color M, and Cmod the converted saturation, Cmod=q(Corg).

With the aforementioned mapping of the gamut correction unit 2211, the second intermediate mapped gamut shown in the graph in FIG. 38 is mapped into the mapped gamut shown in the graph in FIG. 39. In FIG. 39, the solid curve represents the mapped gamut, the one-dashed chain curve the second intermediate mapped gamut, and the broken curve the printer gamut.

In this manner, according to the eleventh embodiment, gamut mapping that absorbs any difference between the monitor and printer gamut shapes can be implemented. Furthermore, since an abrupt variation in rate of change in color is prevented in advance in each mapping, grayscale information of an output image is preserved, generation of pseudo edges can be prevented, and preferred image reproduction can be realized.

Also, a vivid output image with high contrast can be reproduced at the upper limit of the performance of an output device.

In each of the above embodiments, the monitor gamut is mapped into the printer gamut. Also, the techniques explained the above embodiments can be applied to gamut mapping in combinations of other devices.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for mapping an input color of an input color gamut to an output color of an output color gamut, said method comprising the steps of:

inputting an input color signal of the input color gamut, which includes a signal indicating brightness and a signal indicating tincture; and mapping the signal indicating brightness and the signal indicating tincture on the basis of the input and output color gamuts, wherein the mapping maps the signal indicating brightness using a mapping condition which is computed in accordance with highlight portions of the input and output color gamuts, and increases a degree of mapping of the highlight portion compared to middle lightness, and wherein the mapping condition is given by a piecewise function.

2. The method according to claim 1, wherein the piecewise function uses a continuous spline function of first order or higher.

3. The method according to claim 1, wherein the mapping condition is computed in accordance with dark portions of the input and output color gamuts.

4. The method according to claim 1, wherein the mapping maps the signal indicating tincture using a mapping condition which is computed in accordance with high-saturation portions of the input and output color gamuts at a predetermined hue, and increases a degree of mapping of the high-saturation portion compared to a low-saturation portion.

5. The method according to claim 1, wherein the mapping condition is adjustable according to a user instruction.

6. An image processing method for mapping an input color of an input color gamut to an output color of an output color gamut, said method comprising the steps of:

inputting an input color signal of the input color gamut, which includes a signal indicating brightness and a signal indicating tincture; and mapping the signal indicating brightness and the signal indicating tincture on the basis of the input and output color gamuts, wherein the mapping maps the signal indicating tincture using a mapping condition which is computed in accordance with high-saturation portions of the input and output color gamuts at a predetermined hue, and increases a degree of mapping of the high-saturation portion compared to a low-saturation portion, and wherein the mapping condition is given by a piecewise function.

7. The method according to claim 6, wherein the piecewise function uses a continuous spline function of first order or higher.

8. The method according to claim 6, wherein the mapping condition is computed in accordance with high-saturation portions of the input and output color gamuts at a brightness and hue of the input color.

9. The method according to claim 6, wherein the mapping condition is adjustable according to a user instruction.

10. An image processing method for mapping an input color of an input color gamut to an output color of an output color gamut, said method comprising the steps of:

executing a first mapping process for the input color gamut in accordance with the input and output color gamuts; and executing a second mapping process for a mapped color gamut obtained by the first mapping process in accordance with the mapped color gamut and output color gamut, wherein the first mapping process is a process for compressing a color gamut, and the second mapping process is a process for expanding the color gamut.

11. The method according to claim 10, wherein the second mapping process performs a mapping process that pertains to brightness and then performs a mapping process that pertains to saturation.

12. The method according to claim 10, wherein the second mapping process performs the enlargement process in accordance with a limit value computed from the input color gamut.

13. The method according to claim 10, wherein the first mapping process maps the input color into the output color gamut by performing adjustment processes of lightness, hue, and saturation of an input color of the input color gamut.

14. A computer program product comprising a computer readable medium comprising computer program code, for an image processing method for mapping an input color of an input color gamut to an output color of an output color gamut, said method comprising the steps of:
inputting an input color signal of the input color gamut, which includes a signal indicating brightness and a signal indicating tincture; and
mapping the signal indicating brightness and the signal indicating tincture on the basis of the input and output color gamuts,
wherein the mapping maps the signal indicating brightness using a mapping condition which is computed in accordance with highlight portions of the input and output color gamuts, and increases a degree of mapping of the highlight portion compared to middle lightness, and
wherein the mapping condition is given by a piecewise function.

15. A computer program product comprising a computer readable medium comprising computer program code, for an image processing method for mapping an input color of an input color gamut to an output color of an output color gamut, said method comprising the steps of:
inputting an input color signal of the input color gamut, which includes a signal indicating brightness and a signal indicating tincture; and
mapping the signal indicating brightness and the signal indicating tincture on the basis of the input and output color gamuts,
wherein the mapping maps the signal indicating tincture using a mapping condition which is computed in accordance with high-saturation portions of the input and output color gamuts at a predetermined hue, and increases a degree of mapping of the high-saturation portion compared to a low-saturation portion, and
wherein the mapping condition is given by a piecewise function.

16. A computer program product comprising a computer readable medium comprising computer program code, for an image processing method for mapping an input color of an input color gamut to an output color of an output color gamut, said method comprising the steps of:
executing a first mapping process for the input color gamut in accordance with the input and output color gamuts; and
executing a second mapping process for a mapped color gamut obtained by the first mapping process in accordance with the mapped color gamut and output color gamut,
wherein the first mapping process is a process for compressing a color gamut, and the second mapping process is a process for expanding the color gamut.

17. An image processing apparatus for mapping an input color of an input color gamut to an output color of an output color gamut, comprising:
inputting section, arranged to input an input color signal of the input color gamut, which includes a signal indicating brightness and a signal indicating tincture; and
a mapping section, adapted to map the signal indicating brightness and the signal indicating tincture on the basis of the input and output color gamuts,
wherein the mapping maps the signal indicating brightness using a mapping condition which is computed in accordance with highlight portions of the input and output color gamuts, and increases a degree of mapping of the highlight portion compared to middle lightness, and
wherein the mapping condition is given by a piecewise function.

18. An image processing apparatus for mapping an input color of an input color gamut to an output color of an output color gamut, comprising:
an inputting section, arranged to input an input color signal of the input color gamut, which includes a signal indicating brightness and a signal indicating tincture; and
mapping section, adapted to map the signal indicating brightness and the signal indicating tincture on the basis of the input and output color gamuts,
wherein the mapping maps the signal indicating tincture using a mapping condition which is computed in accordance with high-saturation portions of the input and output color gamuts at a predetermined hue, and increases a degree of mapping of the high-saturation portion compared to a low-saturation portion, and
wherein the mapping condition is given by a piecewise function.

19. An image processing apparatus for mapping an input color of an input color gamut to an output color of an output color gamut, comprising:
a first mapping section, adapted to execute a first mapping process for the input color gamut in accordance with the input and output color gamuts; and
a second mapping section, adapted to execute a second mapping process for a mapped color gamut obtained by the first mapping process in accordance with the mapped color gamut and output color gamut,
wherein the first mapping process is a process for compressing a color gamut, and the second mapping process is a process for expanding the color gamut.

* * * * *

UNITED STATES PATENT AND TRADEMARK OFFICE
CERTIFICATE OF CORRECTION

| | |
|---|---|
| PATENT NO. | : 7,116,441 B1 |
| APPLICATION NO. | : 09/467984 |
| DATED | : October 3, 2006 |
| INVENTOR(S) | : Hirochika Matsuoka |

It is certified that error appears in the above-identified patent and that said Letters Patent is hereby corrected as shown below:

On Title Page
[54] TITLE

Title: "SIGNAL PROCESSING APPARATUS IMAGE PROCESSING APPARATUS AND THEIR METHODS" should read --SIGNAL PROCESSING APPARATUS, IMAGE PROCESSING APPARATUS AND THEIR METHODS--.

SHEET 26

Figure 28, "RANG" (both occurrences) should read --RANGE--.

COLUMN 1

Line 1, "APPARATUS" should read --APPARATUS,--.
    Line 16, "A computer" should read --In a computer--.

COLUMN 2

Line 5, "situation," should read --situations,--.

COLUMN 9

Line 35, "tot he" should read --to the--.

COLUMN 22

Line 14, "f())=1" should read --f(0)=1--.

COLUMN 23

Line 4, "very" should read --much--.
    Line 63, "tion. Upper-limit" should read --tion. ¶ Upper-limit--.

COLUMN 24

Line 40, "Bsup" should read --$B_{sup}$--.
    Line 43, "Bsup." should read --$B_{sup}$.--.
    Line 46, "Bsup," should read --$B_{sup}$,--; and
        "represent" should read --represents--.
    Line 48, "Bsup," should read --$B_{sup}$,--.

UNITED STATES PATENT AND TRADEMARK OFFICE
CERTIFICATE OF CORRECTION

PATENT NO. : 7,116,441 B1
APPLICATION NO. : 09/467984
DATED : October 3, 2006
INVENTOR(S) : Hirochika Matsuoka It is certified that error appears in the above-identified patent and that said Letters Patent is hereby corrected as shown below:

COLUMN 31

Line 50, "explained the" should read --explained in the--.

COLUMN 34

Line 7, "inputting" should read --an inputting--
Line 31, "mapping" should read --a mapping--.

Signed and Sealed this

Tenth Day of April, 2007

JON W. DUDAS
*Director of the United States Patent and Trademark Office*